United States Patent
Sato et al.

[11] Patent Number: 6,021,305
[45] Date of Patent: Feb. 1, 2000

[54] SHEET ORIGINAL CONVEYING APPARATUS FOR DUPLEX COPYING

[75] Inventors: Chikara Sato, Hachioji; Masakazu Hiroi, Kawasaki; Akimaro Yoshida, Yokohama; Katsuya Yamazaki, Toride; Yasuo Fukazu, Abiko; Tomohito Nakagawa, Kashiwa; Takayuki Fujii; Yuzoh Matsumoto, both of Toride, all of Japan

[73] Assignee: Canon Kabushiki Kaisha, Tokyo, Japan

[21] Appl. No.: 08/939,684

[22] Filed: Sep. 29, 1997

[30] Foreign Application Priority Data

Sep. 30, 1996 [JP] Japan ................................. 8-258739
Dec. 4, 1996 [JP] Japan ................................. 8-324396

[51] Int. Cl.⁷ .................................................. G03G 15/00
[52] U.S. Cl. .......................... 399/374; 271/3.05; 271/225; 271/902
[58] Field of Search .................................. 399/367, 370, 399/373, 374, 368; 271/225, 902, 184–186, 3.01, 3.05, 3.08

[56] References Cited

U.S. PATENT DOCUMENTS

| | | | |
|---|---|---|---|
| 4,278,344 | 7/1981 | Sahay | 399/374 |
| 4,544,148 | 10/1985 | Kitajima et al. | |
| 5,016,061 | 5/1991 | Tashiro et al. | 399/374 |
| 5,105,225 | 4/1992 | Honjo et al. | |
| 5,119,145 | 6/1992 | Honjo et al. | 399/371 |
| 5,203,554 | 4/1993 | Suzuki | 271/10.05 |
| 5,351,112 | 9/1994 | Naito et al. | |
| 5,552,859 | 9/1996 | Nakagawa et al. | |
| 5,579,083 | 11/1996 | Naito et al. | |
| 5,656,187 | 8/1997 | Miyamoto et al. | |
| 5,671,917 | 9/1997 | Choho et al. | |
| 5,754,934 | 5/1998 | Kamezaki et al. | 399/373 |

FOREIGN PATENT DOCUMENTS 4-116071  4/1992  Japan.

*Primary Examiner*—Robert Beatty
*Attorney, Agent, or Firm*—Fitzpatrick, Cella, Harper & Scinto

[57] ABSTRACT

The present invention provides an original conveying apparatus in which originals stacked on an original tray are separated one by one by a separation unit to be conveyed to a reading portion for reading an image, and then the read original is discharged. An original travel direction reverse path is disposed between the separation unit and the reading portion, a face turn-over path is provided for turning over the original discharged from the reading portion and for directing it to the reading portion again, and there is a control unit for continuously effecting, for the respective original, a first image reading mode in which the travel direction of the original is reversed in the original travel direction reverse path without turning over the front and rear faces of the original before the original is conveyed to the reading portion and then the image is read, and a second image reading mode in which the original is turned over in the original travel direction reverse path after the first image of the original was read at the reading portion.

11 Claims, 45 Drawing Sheets

HALF SIZE ONE-FACE ORIGINAL CONVEY MODE

LARGE SIZE ONE-FACE ORIGINAL CONVEY MODE

HALF SIZE BOTH-FACE ORIGINAL CONVEYANCE

FULL SIZE BOTH-FACE ORIGINAL CONVEYANCE

ORIGINAL CONVEYANCE IN COPYING OF
MANUAL INSERTED ORIGINAL

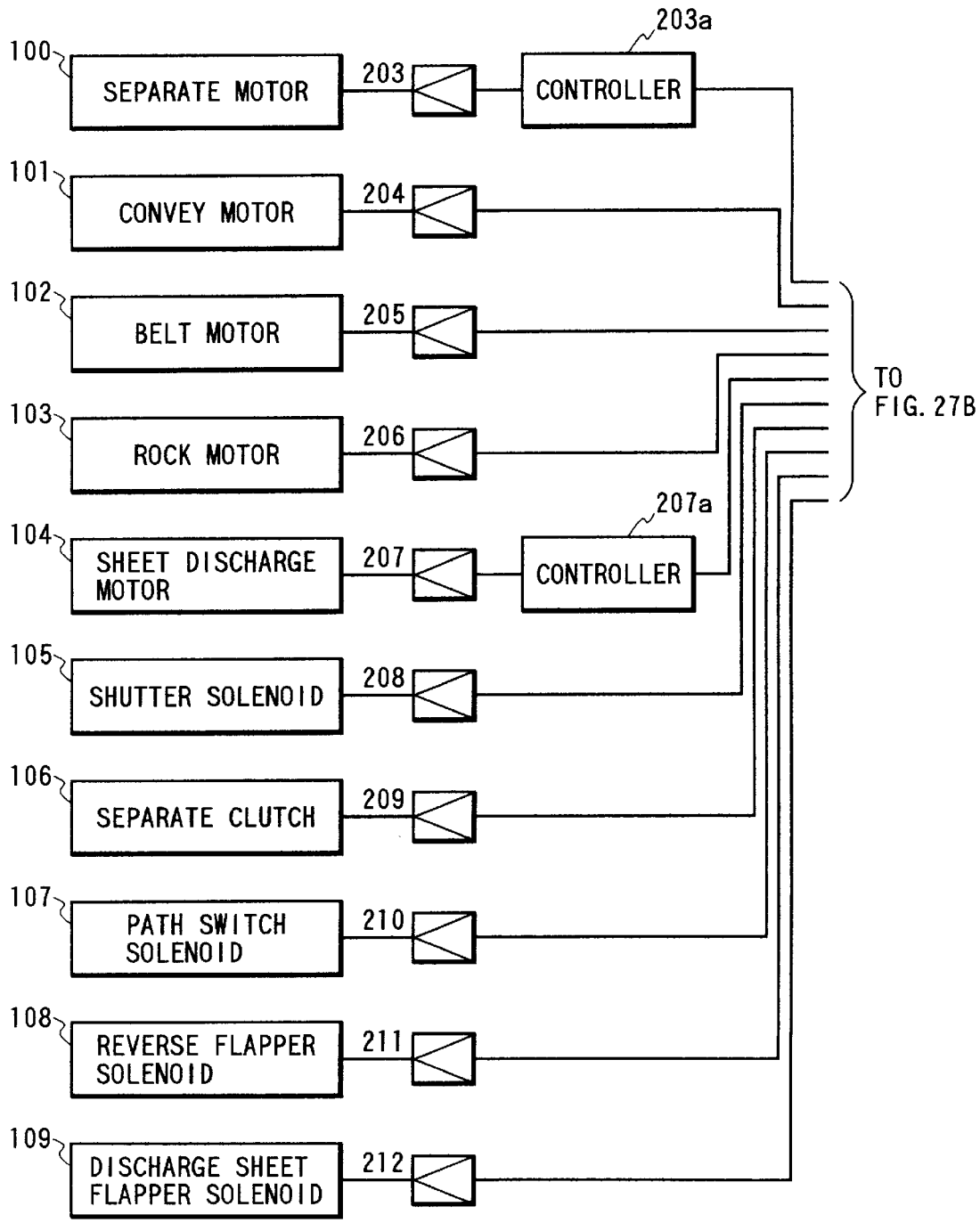

| FIG. 35A |
| FIG. 35B |

FIG. 36A
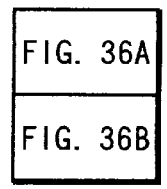
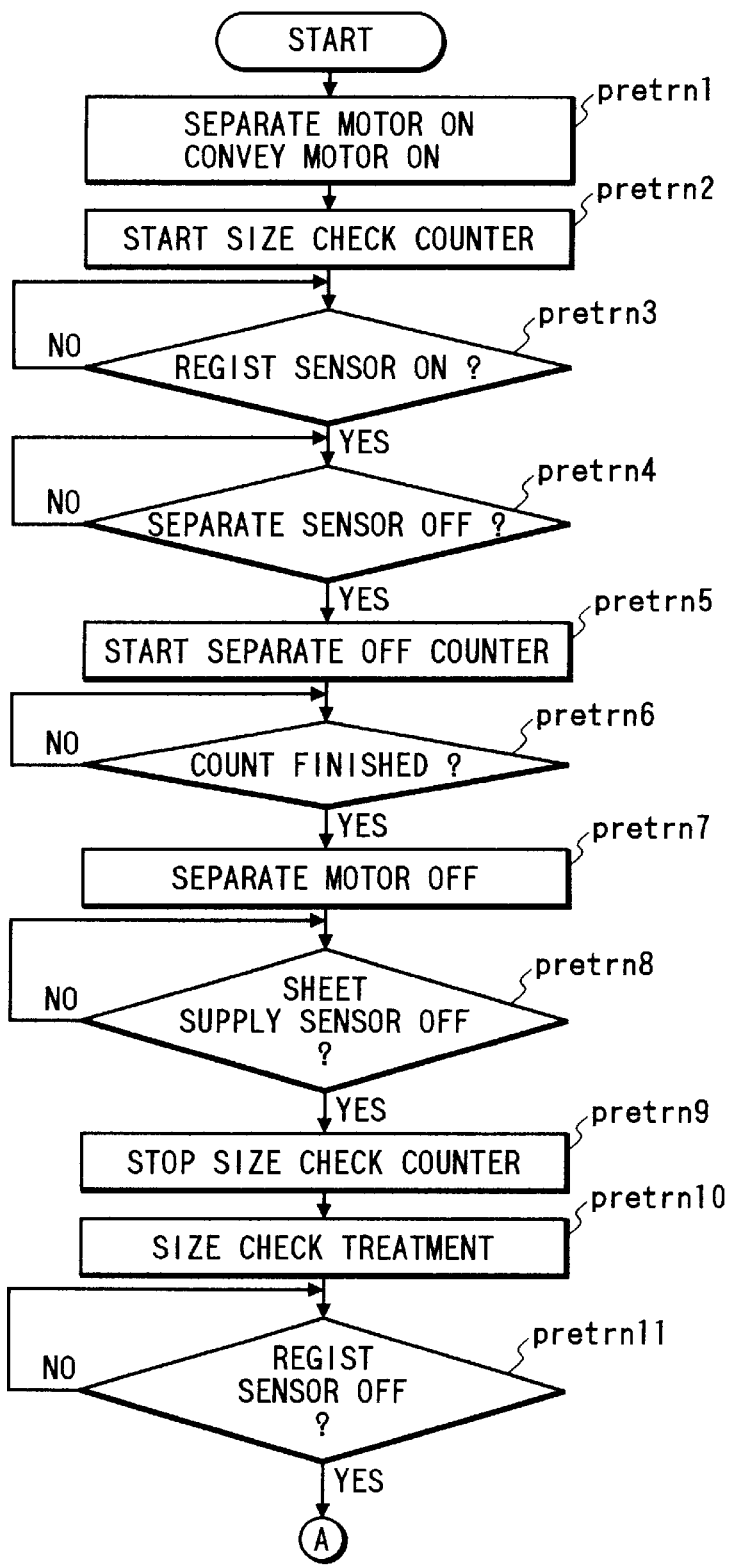

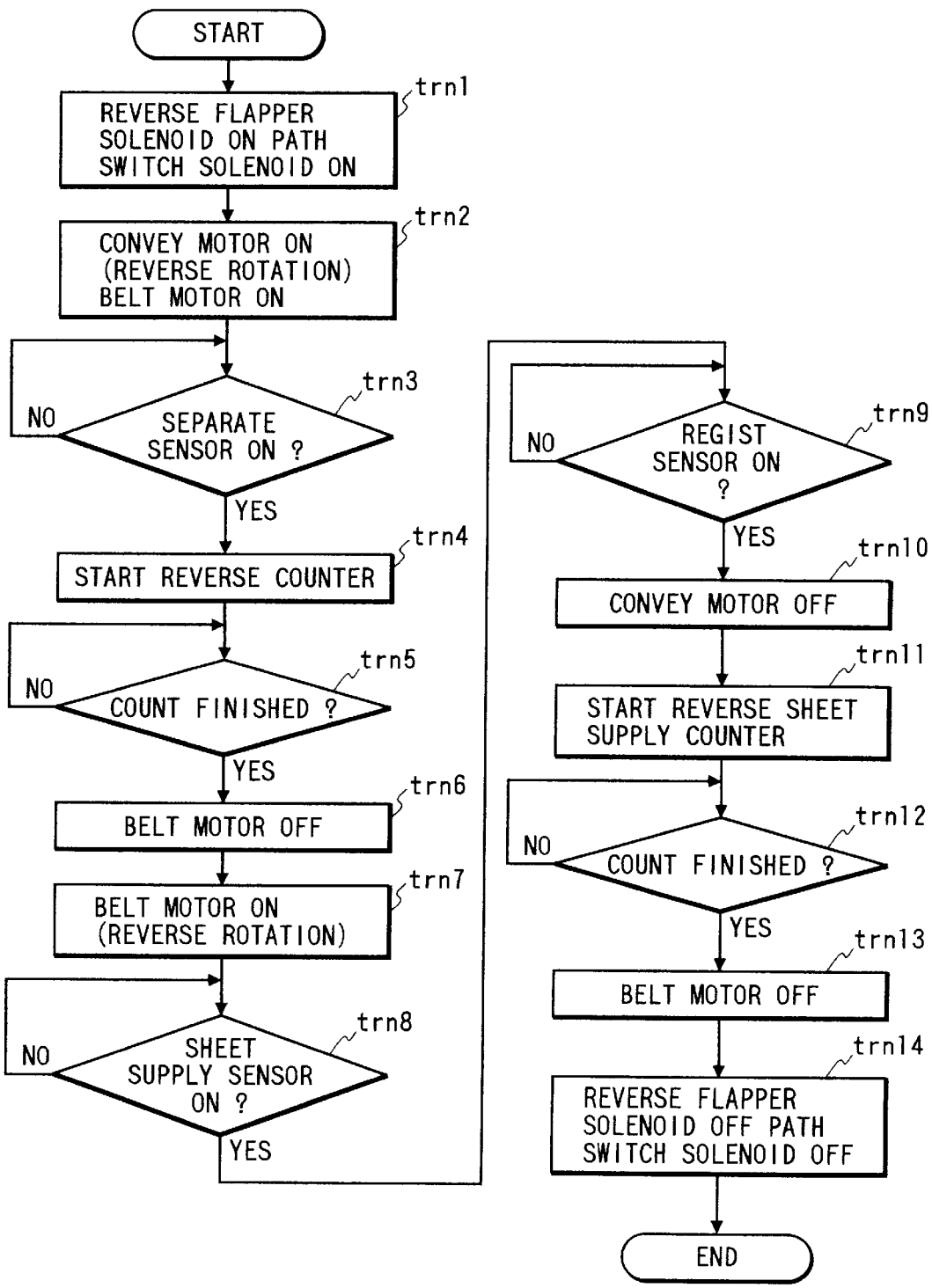

SHEET ORIGINAL CONVEYING APPARATUS FOR DUPLEX COPYING

BACKGROUND OF THE INVENTION

1. Field of the Invention

The present invention relates to a sheet original conveying apparatus in which a sheet original is conveyed to a reading position and the sheet original conveyed to the reading position reverses its travel direction and it is turned over from a front face to a rear face.

2. Related Background Art

In the past, sheet conveying apparatuses in which a sheet is conveyed and is turned over or reversed the faces thereof have been used for conveying an original in an image forming apparatus of a copying machine, and various kinds of sheet conveying apparatuses have been proposed (hereinafter, a sheet conveying apparatus used for conveying the original is referred to as "original conveying apparatus").

Now, an example of a conventional original conveying apparatus will be briefly explained.

Such an original conveying apparatus is designed so that:
  (i) both-face imaged originals stacked on an original tray (sheet stacking means) are successively conveyed to an image reading position,
  (ii) thereafter, the original is turned over by an original reverse means and then is conveyed to the image reading position,
  (iii) an image on a second surface of the original is read,
  (iv) then, the original from the image reading position is turned over by the original reverse means and then is conveyed to the image reading position again,
  (v) an image on a first surface of the original is read, and
  (vi) the original is discharged from the image reading position.

When the above-mentioned treatments (i) to (vi) are completed regarding a single original, the treatments (i) to (vi) are repeated regarding a succeeding original, thereby reading the images on all of the both-face imaged originals.

Another original conveying apparatus is disclosed in Japanese Patent Application Laid-Open No. 4-116071.

As shown in FIG. 43A, this apparatus has an original tray (sheet stacking means) 504 on which a plurality of originals are stacked, and a platen 510 defining an original reading position is disposed below the original tray. At the right of the original tray 504, there are disposed a sheet convey means (not shown), convey paths 501, 502 and a convey path (sheet reverse means) 503 so that, after the originals stacked on the original tray 504 are separated one by one, the separated original is conveyed to the convey paths 501, 502, . . . . Further, the convey path 503 is communicated with the platen 510, and a flapper disposed at a junction between the convey paths 502 and 503 serves to switch the paths 502, 503 from one to the other. On the other hand, another convey path communicated with the original tray 504 is formed at the left of the platen 510 so that the original on the platen 510 can be returned to the original tray 504.

In this apparatus, when the sheet convey means is driven, the original stacked on the original tray are separated one by one, and the separated original is conveyed to the convey paths 501, 502. When a trail end of the original passes through the flapper 506, the flapper 506 is switched toward the convey path 503, as a result that the original is conveyed to the platen 510 in the reversed condition. When the original is rested on the platen, an image on a second surface of the original is read, and then, the original is returned to the original tray 504 through a convey path. Incidentally, the flapper 506 is returned to its initial position after the trail end of the original leaves the flapper.

Regarding a succeeding original, similar to the preceding original, after an image on a second surface of the original is read, the original is returned to the original tray 504. Further, the read image on the second surface of the original is transferred onto a transfer sheet (not shown), and the transfer sheets on which the images were formed are stacked on an intermediate tray. When the reading of the images of the second surfaces of all originals is completed, in a similar manner, the originals stacked on the original tray 504 are supplied one by one from the lowermost one, and the supplied original is turned over and then is conveyed onto the platen 510. Then, an image on a first surface of the original is read. Incidentally, the read image of the first surface is transferred onto the other surface of the corresponding transfer sheet re-supplied from the intermediate tray.

By the way, in the firstly mentioned conventional apparatus, since the original is once set at the reading position, then is returned without the reading, then is turned over, then is set on the reading position again, and then is read (image of second surface). So, it takes a long time to read the image, and, thus, very long time is required for reading all of the originals.

In the secondly mentioned apparatus, since the images on one surfaces of all originals are read and then the images on the other surfaces of all originals are read, a circulating path for circulating the originals (more specifically, convey paths 502, 503 for turning over the originals from the original tray 504 and for conveying the turned-over original onto the platen 510, and a convey path for returning the original from the platen 510 to the original tray 504) is required. Thus, the apparatus becomes complicated and expensive.

SUMMARY OF THE INVENTION

An object of the present invention is to provide a sheet original conveying apparatus which can reduce time of continuous treatment regarding conveyance and reverse of an original.

Another object of the present invention is to provide an image forming apparatus which can reduce an image reading time for reading a both-face imaged original.

The other object of the present invention is to provide a sheet original conveying apparatus which is compact, simple and cheap.

To achieve the above objects, according to the present invention, there is provided an original conveying apparatus in which originals stacked on an original tray are separated one by one by a separation means, a separated original is conveyed to a reading portion for reading an image, and a read original is discharged. It comprises an original travel direction reverse path disposed between the separation means and the reading portion; a turn-over or reverse path for turning over the original discharged from the reading portion and for directing the turned-over original to the reading portion again; and a control means for continuously effecting, for the respective original, a first image reading mode in which the travel direction of the original is reversed in the original travel direction reverse path before the original is conveyed to the reading portion and then the image reading is effected and a second image reading mode in which the original is turned over in the original travel direction reverse path after the image reading of the original was effected at the reading portion and then the image reading is effected.

The present invention may provide an original conveying apparatus in which originals stacked on an original tray are separated one by one by a separation means. It comprises a first convey path for a first convey mode in which a travel direction of a separated original is reversed in a first reverse path before the original is conveyed to a reading portion for reading an image of the original and the reversed original is conveyed to the reading portion; and a second convey path for a second convey mode in which the original discharged from the reading portion is turned over in a second reverse path and the turned-over original is conveyed to the reading portion again, and wherein the first and second reverse are commonly used in part.

The original travel direction reverse path may direct the original to the reading portion after the original is switched back.

According to the present invention, since the original is firstly turned over and the turned-over original is conveyed to the reading portion, the image reading time can be shortened.

Further, since the first and second surfaces of the respective original are read continuously, the apparatus can be operated at high speed.

BRIEF DESCRIPTION OF THE DRAWINGS

FIG. 37 is a flow chart of reverse treatment;

DETAILED DESCRIPTION OF THE PREFERRED EMBODIMENTS

The present invention will now be explained with reference to the accompanying drawings.

Explanation of Apparatus

Figure 1:
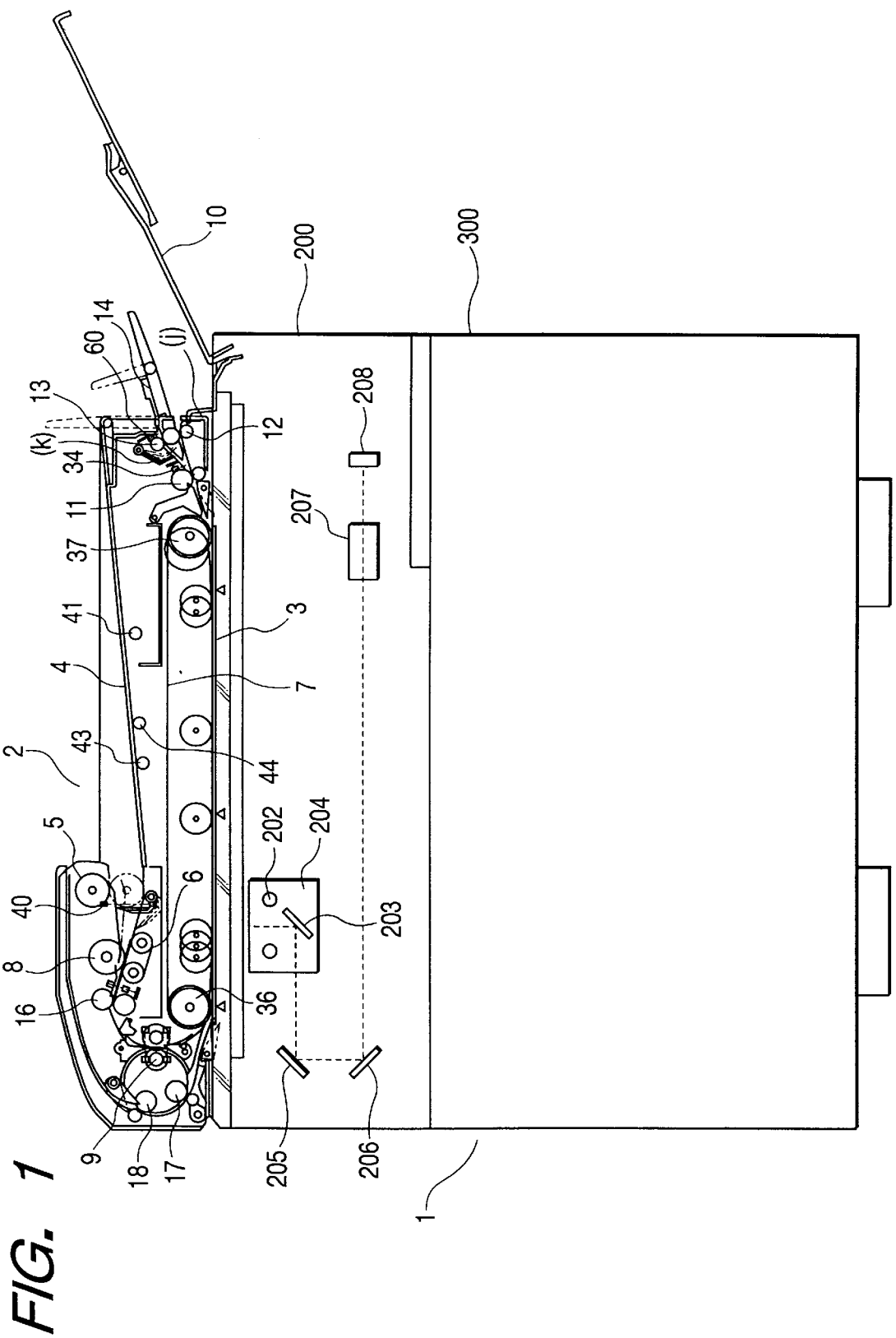
FIG. 1 is a sectional view of an image forming apparatus having an original conveying apparatus according to the present invention.

In FIG. 1, an ADF (automatic document feeder) 2 as an original conveying apparatus according to the present invention includes an original tray 4 provided at its upper part, and a wide belt 7 mounted around a drive roller 36 and a turn roller 37 and provided at its lower part. Originals P rested on the original tray are successively separated one by one from uppermost one, and the separated original is conveyed onto a platen glass (platen) 3 defining a reading position of a copying machine 1.

The wide belt 7 is urged against the platen 3 and serves to position the original sent from the original tray 4 at a predetermined position on the platen 3 and to discharge the original P on the platen 3 onto a sheet discharge tray 10. The (both-face imaged) originals are rested on the tray 4 in a page order from first page (second page), third page (fourth page), . . . .

The copying machine 1 includes an image input portion (referred to as "reader portion" hereinafter) 200 and an image output portion (referred to as "printer portion" hereinafter) 300. The reader portion 200 serves to optically read image information recorded on the original P, photoelectrically convert the read information into image data and input the image data and comprises the above-mentioned platen 3, a scanner unit 204 including a lamp 202 and a mirror 203, mirrors 205, 206, a lens 207 and an image sensor 208. The printer portion 300 is constituted by a conventional image forming means having a construction which will be described later.

Incidentally, the present invention can be applied to a reading apparatus obtained by combining the reader portion 200 with the original conveying apparatus. Further, the copying machine may include the original conveying apparatus.

Explanation of Construction of Original Tray

A pair of width regulating plates are provided on the original tray 4 for sliding movement in a width-wise direction of the sheet original P so that lateral edges of the sheet original P rested on the original tray 4, thereby ensuring the stable supply of the sheet original P. A rotatable stopper 21 is provided at an end of the original tray 4 so that the sheet originals P set on the original tray 4 is regulated by the (protruded) stopper 21 not to advance in a downstream direction (FIG. 4).

Explanation of Sensor on Tray

Figure 4:
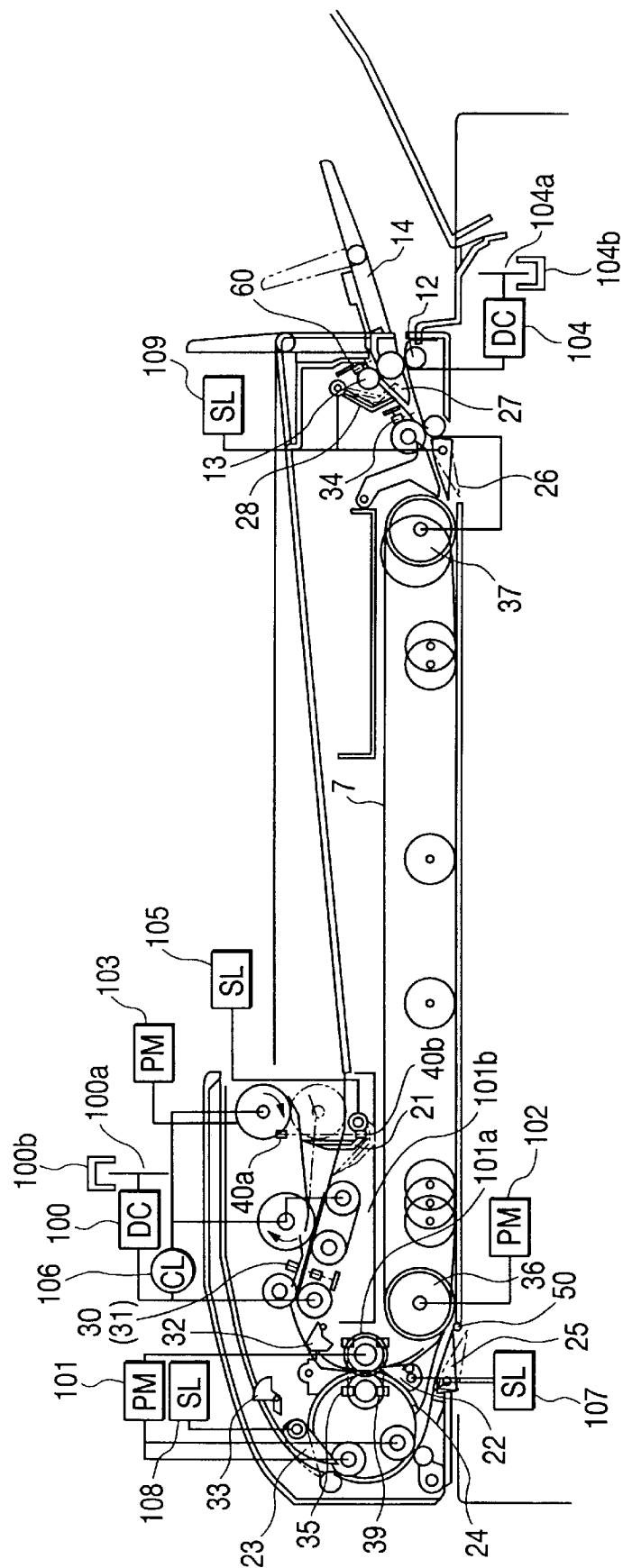
FIG. 4 is a view showing a drive system of the original conveying apparatus according to the present invention.

An original set detection sensors (optical sensors of permeable type) 40a, 40b for detecting the fact that the sheet original stack P is set on the tray are disposed in the vicinity of the stopper 21 at an upstream side thereof (FIG. 4). Further, an original trail end detection sensor (optical sensor of reflection type) 41 (FIG. 1) for judging whether the set original is a half size original or not is disposed at an intermediate position of the original tray 4. This sensor is spaced apart from the stopper 21 by 225 mm so that, when a large size original is set, a trail end thereof is detected by the sensor.

A last original detection sensor (optical sensor of reflection type) 43 is disposed at an intermediate position between the sensors 40 and the sensor 41 and serves to judge whether the original being conveyed is a last original or not. Further, an original width detection sensor 44 for detecting a width of the original stack P set on the original tray 4 by detecting the position of the width regulating plate is disposed below the original tray 4.

Explanation of Separation Portion

Figure 5:
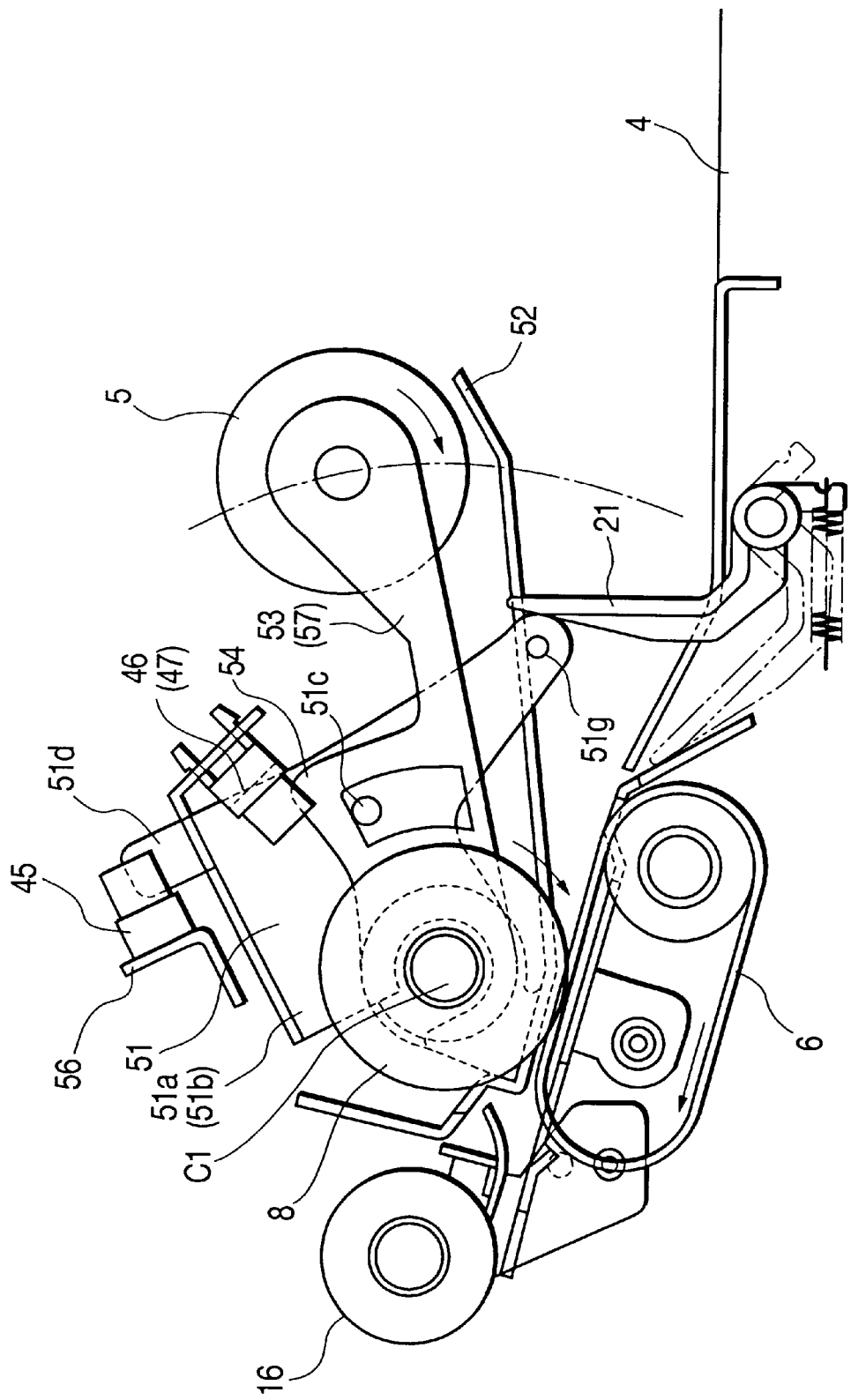
FIGS. 5, 6, 7 and 8 are enlarged views of a separation portion of the original conveying apparatus according to the present invention in FIG. 1.

As shown in FIG. 5, above the original tray 4, rock arms 53 (57) is regulated by an arm shaft 51c supported by front and rear support plates 51a, 51b of a lift/lower arm 51 pivotable around a rotary shaft c1 of a separation/convey roller 8, and a sheet supply roller 5 is provided at free end portions of the rock arms 53. As shown in FIG. 5 (home position), the sheet supply roller 5 is normally regulated by the shaft 51c to be retarded to a retard position above upper separation plates 52 (regulated by pins 51g), so that the sheet supply roller does not interfere with the original setting operation. The arm 51 is positioned as shown and controlled by a motor 103 in a manner which will be described later.

Figure 8:
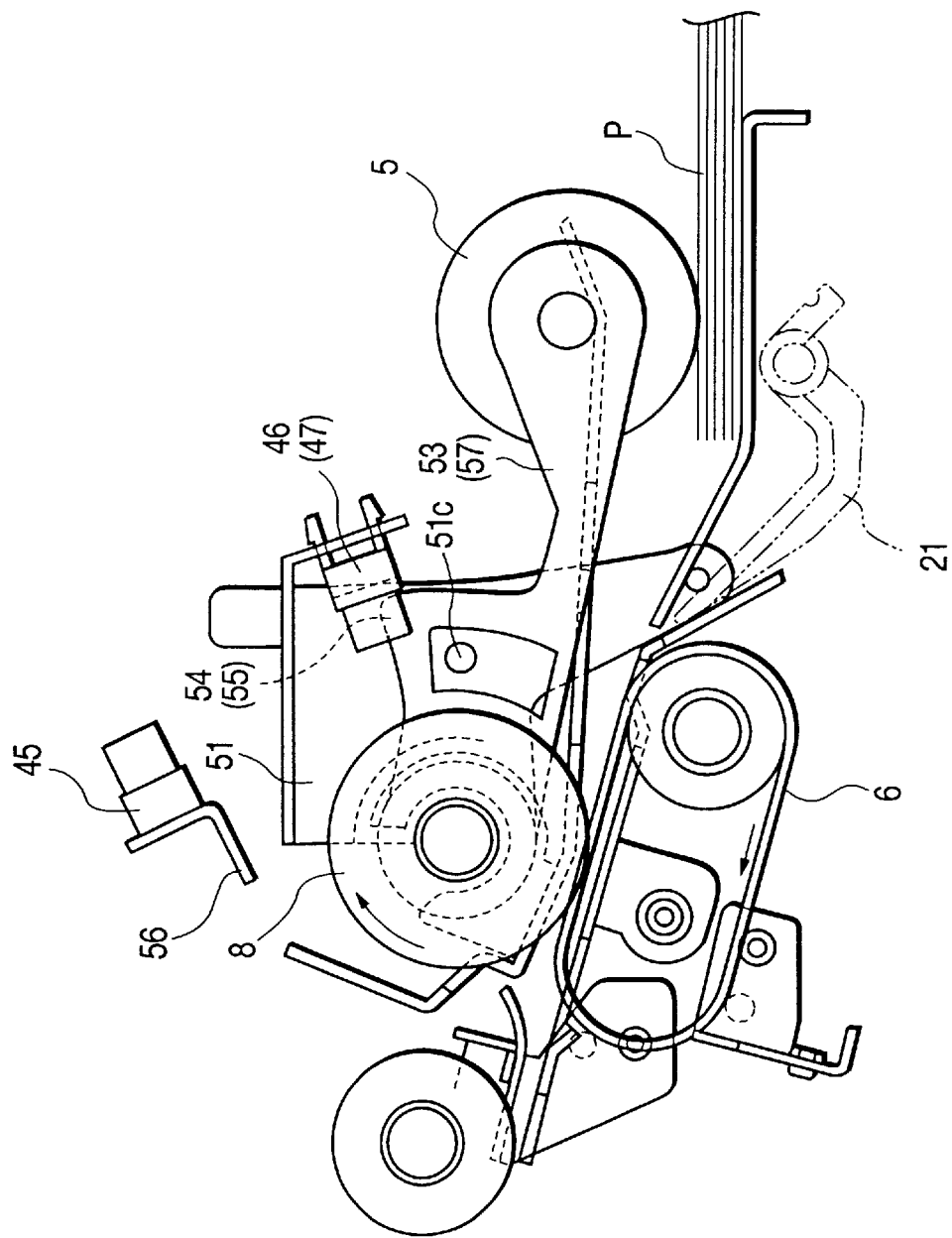
Figure 9:
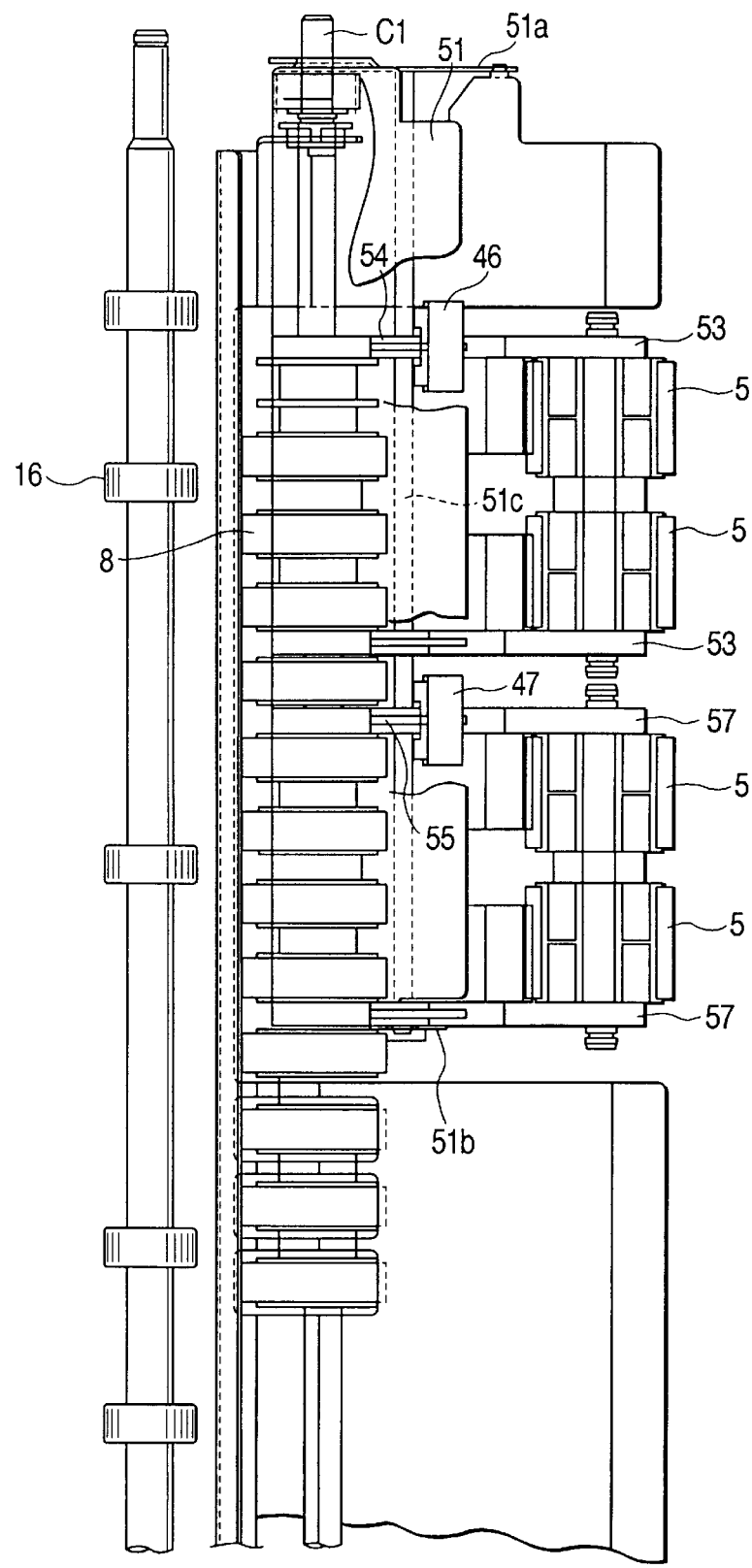
FIG. 9 is a plan view of the original conveying apparatus.
Figure 10A:
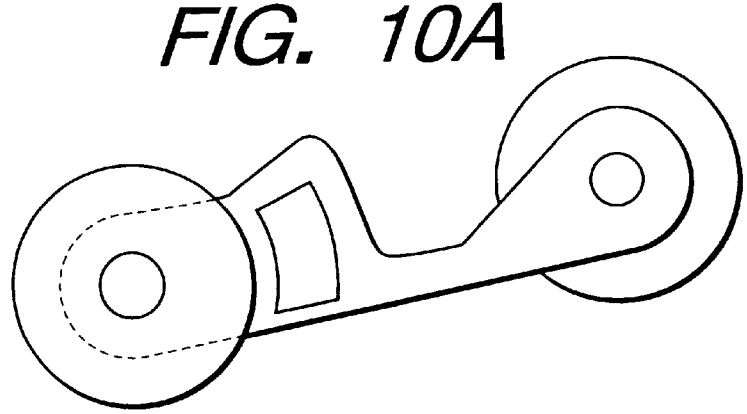
FIGS. 10A, 10B and 10C are explanatory views showing main parts of the original conveying apparatus.
Figure 10B:
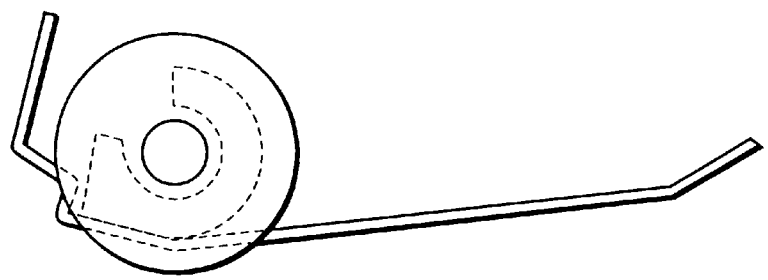
Figure 10C:
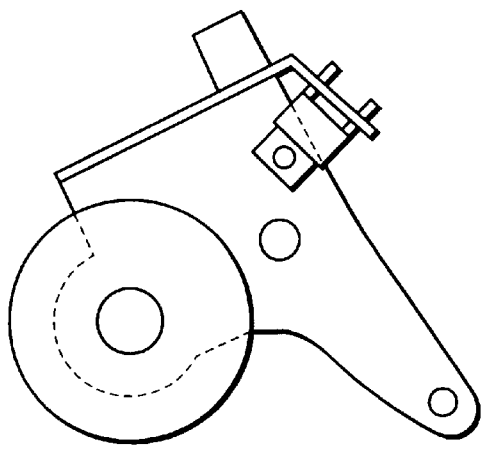

FIG. 9 is a plan view of the separation portion. The lift/lower arm 51 can be rotated around the rotary shaft c1 between the home position shown in FIG. 5, and a position shown in FIG. 6. As mentioned above, the sheet supply roller 5 is provided at the free end portions of the rock arms 57, 53 pivotable around the rotary shaft C1. The rock arms 57, 53 are lowered by their own weights as the lift/lower arm 51 is lowered so that the sheet supply roller 5 is contacted with the uppermost original in the original stack P and is stopped there (position shown in FIG. 8). In this condition, when the sheet supply roller 5 is rotated, the originals are successively conveyed from the uppermost one. The upper separation plates 52 are stopped as shown in FIG. 6 by stoppers (not shown).

As shown in FIG. 8, at the time when the sheet supply roller 5 is contacted with the original stack, the arm shaft 51c which supported the rock arms 57, 53 is separated from the rock arms. In this case, since the lift/lower arm 51 continues to lower, the relative position between the rock arms 57, 53 and the lift/lower arm 51 is changed. The changed amount is detected by first and second rock arm flags 54, 55 which forms parts of the rock arms 57, 53, and first and second rock position sensors 46, 47 attached to the lift/lower arm 51. When the detection is effected, the lift/lower arm 51 is stopped. In this condition, the rock arms 57, 53 and the sheet supply roller 5 affect their weights on the original stack P, thereby applying the stable original supplying force to the sheet original P.

Figure 6:
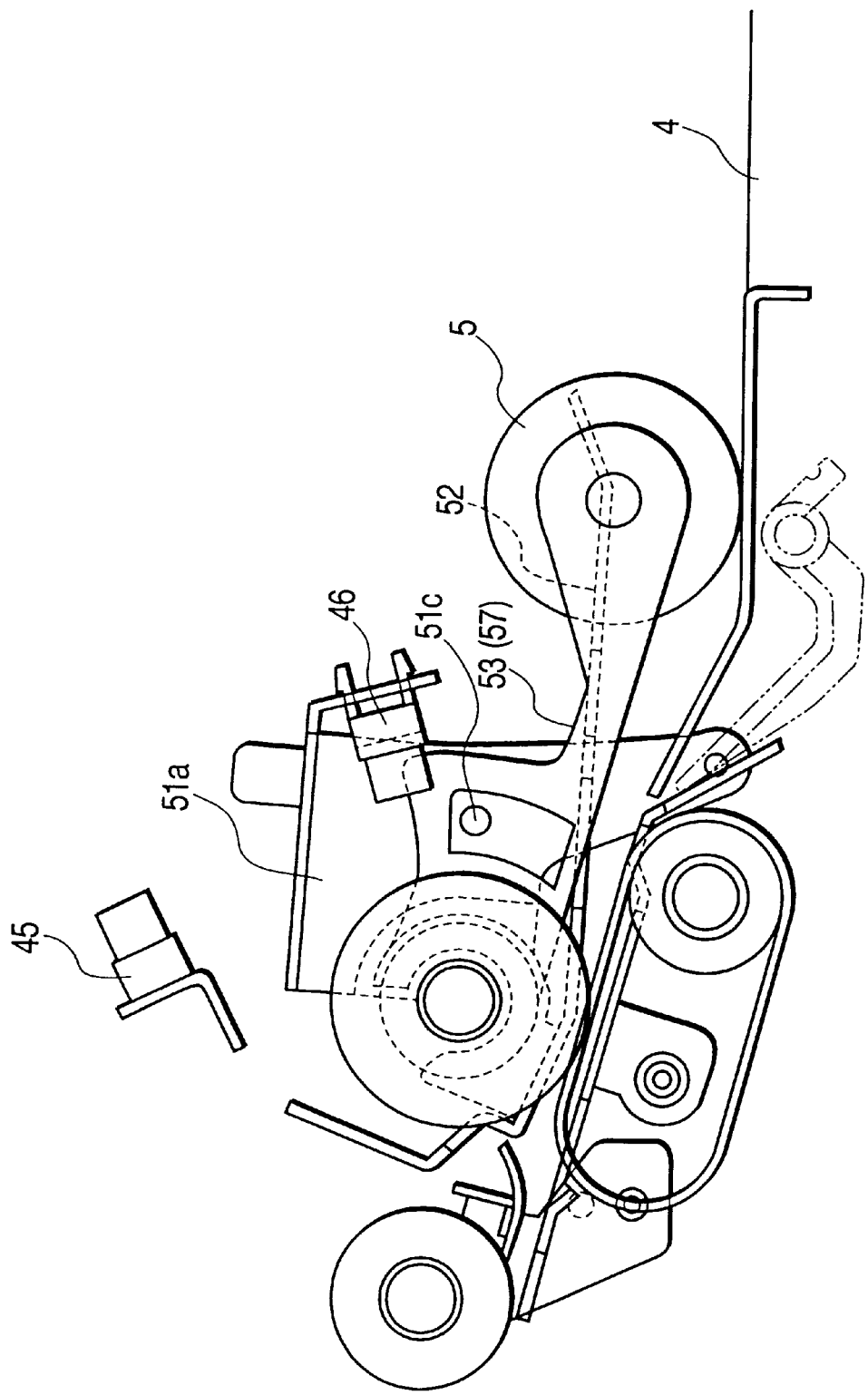

The lift/lower arm 51 is driven by the motor (stepping motor) 103 so that it can assume any position (FIG. 7) between the position shown in FIG. 5 and the position shown in FIG. 6.

Above the separation portion, a sheet supply roller home sensor (optical sensor of permeable type) 45 is attached to a fixed support plate 56 so that, when a sensor light path of the sheet supply roller home sensor 45 is blocked by a lift/lower arm flag 51d provided on the lift/lower arm 51, the fact that the lift/lower arm 51 is positioned at a home position (waiting position) is detected.

Figure 7:
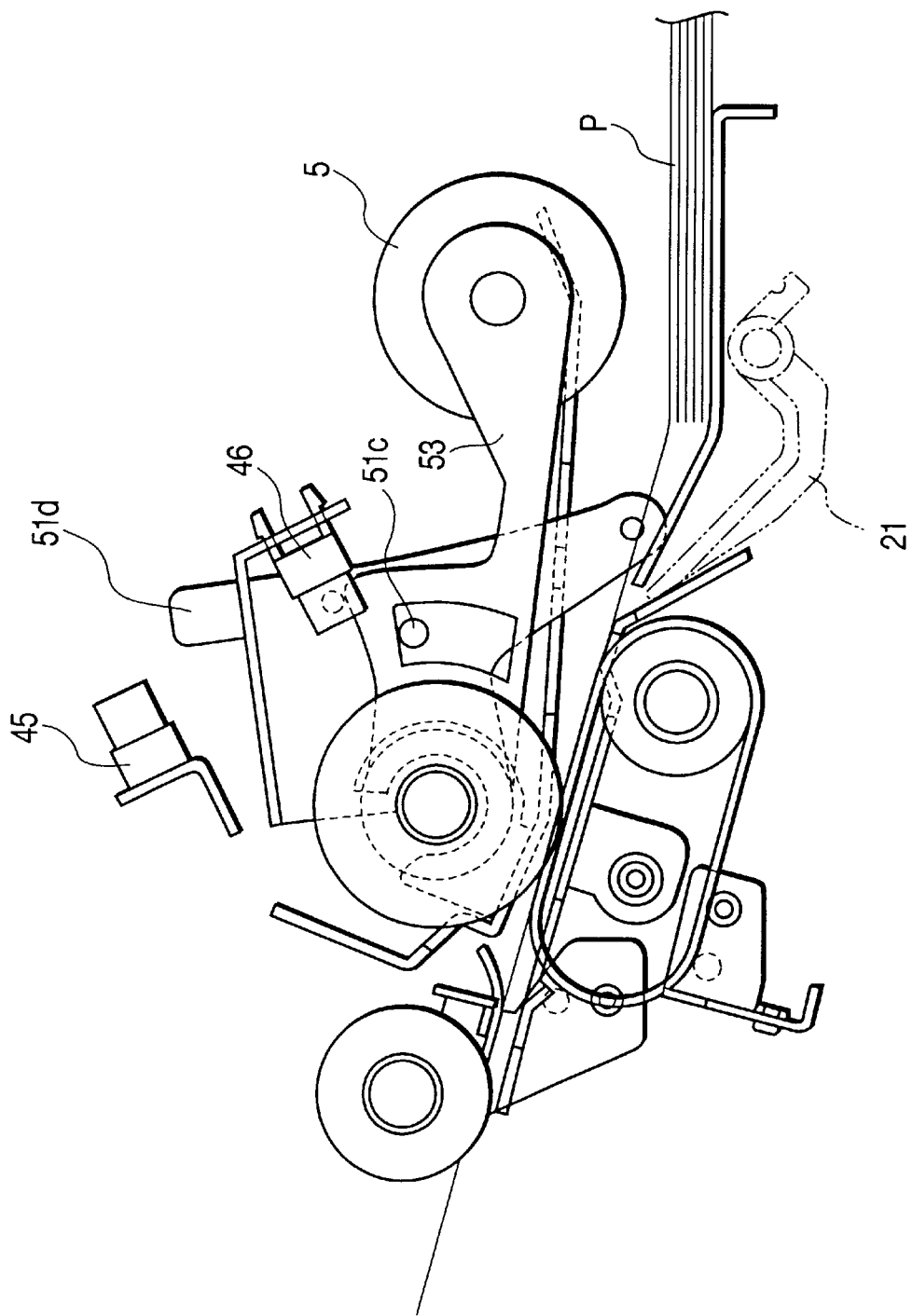

As mentioned above, the first and second rock position sensors 46, 47 are attached to the lift/lower arm 51 for movement together with the lift/lower arm and can detect the first and second rock arm flags 54, 55 extending downwardly from the rock arms 53, 57. The condition shown in FIG. 7 is a waiting position in a continuous original supply mode. Since the rock arms 57, 53 are not required to be returned to the home position (condition shown in FIG. 5), they are controlled so that the sheet supply roller 5 is stopped at a waiting position where the sheet supply roller is spaced apart from the original stack by a minimum distance (above 3 to 5 mm).

With the arrangement as mentioned above, the shifting amount of the sheet supply roller 5 can be minimized to reduce the vibration upon contacting with the sheet stack P, thereby contributing to the improvement of the sheet supplying ability. At the same time, the sheet supply starting time for the succeeding original can be reduced, thereby permitting the sheet supply control with smaller sheet-to-sheet distance.

If the sheet (original) supplying operation is started while bounding the sheet supply roller 5 due to the shock caused upon contacting with the sheet stack P, the pressure balance of the sheet supply roller acting on the sheet original P is worsened to frequently cause the skew-feed of the original. However, as shown in FIG. 9, since a plurality of sheet roller portions of the sheet supply roller 5 are suspended independently to easily equalize to the sheet original stack P, the sheet supplying ability can be improved.

The separation portion including a conventional separation belt 6 and the separation/convey roller 8 is disposed at a downstream side of the stopper 21 in the original conveying direction. By rotating these elements 6, 8 in directions shown by the arrows in FIG. 8, the original separating operation is effected.

Explanation of Convey Paths

Figure 3:
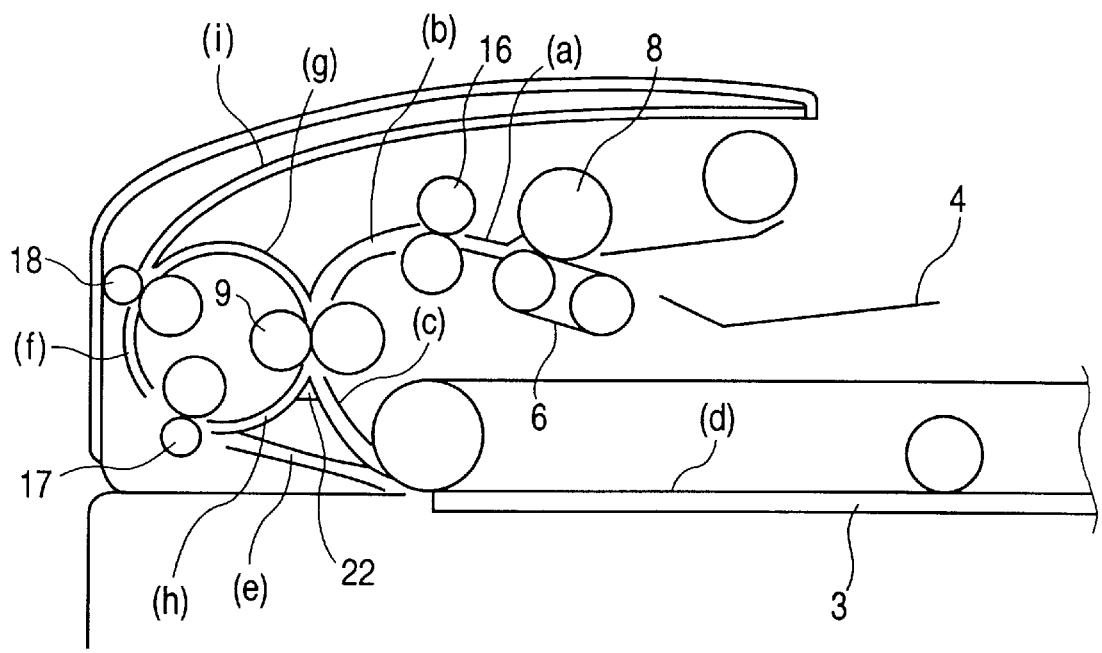
FIG. 3 is an explanatory view showing paths of the original conveying apparatus according to the present invention.

As shown in FIG. 3, arcuate original supply paths (a), (b), (c) are disposed between the original tray 4 and the platen 3, and the arcuate (downwardly curved) original supply path (c) is connected to a convey path (d) on the platen 3. Thus, the original P can be directed from the tray onto the platen 3.

Reverse or turn over supply paths (h), (f), (i) extends from the original supply path (b) so that, before the original is conveyed to the platen 3, the original can be turned over or reversed the front face and rear face thereof. The original reversed in the reverse supply paths (h), (f), (i) is switched back and is conveyed onto the platen 3 through an original supply/discharge convey path (e).

An original reverse path (g) is branched from the reverse supply path (f) and is connected to the original supply path (b) so that, by utilizing the convey paths (e), (f), (g), (c), the original on the platen 3 can be switched back to be reversed and returned to the platen 3 again.

After the image reading of the original on the platen 3 is finished, the original is discharged onto the sheet discharge tray 10 through the convey path (d) on the platen 3 and an original discharge path (j). As shown in FIG. 1, at the right side of the ADF 2, there is provided an open/close manual insertion original tray 14 by which an original (single original) P can be supplied to the platen 3 through a manual insertion convey path (h).

Explanation of Roller Arrangement

The original separated at the separation portion is conveyed in the downstream direction by the separation/convey roller 8 through the original convey path (a). A first sheet supply roller 16 is disposed between the original supply paths (a) and (b) and serves to correct the skew-feed of the original sent from the separation portion 6, 8.

The separation/convey roller 8 is provided with a one-way clutch mechanism for reducing the convey load when the original is pulled from the separation portion by the first sheet supply roller 16.

A second sheet supply roller 9 is disposed at a junction between the original supply paths (b), (c) and the original reverse path (g), and the second sheet supply roller 9 serves to form a loop in the original P to prevent the skew-feed of the original P. First and second reverse rotation rollers 17, 18 are disposed in the reverse supply paths (h), (f), (i) to convey the original P along the loop-shaped reverse path.

A manual insertion sheet supply roller 13 is disposed at the right side of the ADF 2 and serves to supply the original set on the manual insertion original tray 14 from right to left. A pair of manual insertion regist rollers 11 are disposed between the manual insertion sheet supply roller 13 and the platen 3 to form a loop in the manually inserted original, thereby preventing the skew-feed of the original.

The pair of manual insertion regist rollers 11 also serve to aid the discharge of the original from the platen 3. A pair of sheet discharge roller 12 disposed in the original discharge path (j) serve to discharge the original P onto the sheet discharge tray 10.

Explanation of Flappers in Paths

A reverse supply flapper 22 is disposed at a downstream side of the second sheet supply roller 9 and serves to switch between the original supply path (c) and the reverse supply path (h). When the original P is conveyed to the reverse supply path (h), (f), (i), the flapper 22 is positioned at a position shown by the solid line, and, when the original P is conveyed to the original supply paths (c), (d), the flapper 22 is pivoted to a position shown by the dot and chain line.

A reverse flapper 23 is disposed at a downstream side of the second reverse rotation roller 18 and serves to switch between the reverse supply path (i) and the original reverse path (g). When the original P sent through the original supply path (b) and the reverse supply path (h) is reversed, the reverse flapper 23 is positioned at a position shown by the solid line, and, when the original P from the platen 3 is reversed through the original supply/discharge path (e), the reverse supply path (f) and the original reverse path (g), the flapper 23 is pivoted to a position shown by the dot and chain line.

A one-way flapper (to which Myler is attached) 24 is disposed at a junction between the reverse supply path (h) and the original supply/discharge path (e) at an upstream side and in the vicinity of the first reverse rotation roller 17. The one-way flapper serves as a guide when the original P is conveyed from the reverse supply path (h) to the reverse supply path (f) and prevents the original P from entering back into the reverse supply path (h) when the original P is conveyed the platen 3 from the reverse supply paths (g), (f) through the original supply/discharge path (e).

A supply/discharge flapper 25 driven in synchronous with the reverse supply flapper 22 is disposed at a side of the original supply/discharge path (e) near the platen 3. The flapper 25 is positioned at a position shown by the solid line to prevent the tip end of the original entering into the platen 3 from striking against the end of the platen 3 when the original P is conveyed from the original supply/discharge path (e) to the platen 3. When the original P is conveyed from the platen 3 to the original supply/discharge path (e), the flapper 25 is pivoted to a positioned shown by the dot and chain line to receive the original from the platen 3.

A sheet discharge flapper 26 is disposed between the right end of the platen 3 and the pair of manual insertion regist rollers 11. The flapper 26 is positioned at a position shown by the solid line to prevent the tip end of the original entering into the platen 3 from striking against the end of the platen 3 when the original P is conveyed from the manual insertion convey path (h) to the platen 3. When the original P is discharged from the platen 3 to the original discharge path (j), the flapper 26 is pivoted to a position shown by the dot and chain line to receive the original from the platen 3.

A one-way manual insertion flapper 27 is disposed at a junction between the original discharge path (j) and a manual insertion convey path (k) and serves to prevent the original from entering into the manual insertion convey path (k) when the original P is discharged from the platen 3. A manual insertion shutter 28 is disposed in the vicinity of the manual insertion sheet supply roller 13 at a downstream side thereof and serves to prevent the original set on the manual insertion original tray 14 from entering into the pair of manual insertion regist rollers 11 while the read original P is being discharged. In this case, a conveying force is selected to be smaller sufficient to permit the slip between the original and the manual insertion sheet supply roller 13.

Sensor Arrangement in Paths

A separation sensor (optical sensor of permeable type) 30 is disposed between the separation/convey roller 8 and the first sheet supply roller 16 and serves to detect the original P conveyed by the separation/convey roller 8. A skew-feed detection sensor (optical sensor of permeable type) 31 is disposed at the same position as the separation sensor 30 in the conveying direction but spaced apart from the separation sensor 30 in a thrust direction by a predetermined distance. The sensor 31 cooperates with the separation sensor 30 to detect a skew-feed amount of the conveyed original.

A mixed stack detection sensor 32 for detecting the original P by flag movement is disposed in the vicinity of the first sheet supply roller 16 at a downstream side thereof. This sensor cooperates with the sensors on the original tray 4 to detect the fact that originals having different sizes are stacked on the original tray 4 during the conveyance of the original.

A sheet supply sensor (optical sensor of permeable type) 35 is disposed in the vicinity of the second sheet supply roller 9 at an upstream side thereof and serves to detect the original P passed through either the original supply paths (a), (b), (c) or the original reverse path (g). A regist sensor (optical sensor of permeable type) 39 is disposed at a downstream side of the sheet supply roller 9 and serve to control the stop position of the original P by detecting the trail end of the original P.

A reverse sensor (optical sensor of permeable type) 50 is disposed in the original supply/discharge path (e) and serves to detect the original discharged from the platen 3 or the original P entering into the platen 3. A reverse detection sensor 33 for detecting the original P by flag movement is disposed in the reverse supply path (i) and serves to detect the fact that the original P is directed to the reverse supply path (i) by switching the reverse flapper.

A manual insertion regist sensor (optical sensor of permeable type) 34 is disposed in the vicinity of the pair of manual insertion regist rollers 11 at a downstream side thereof in an original discharging direction and serves to detect the original from the manual insertion convey path (k) and the original P discharged from the platen 3 to the original discharge path (j). A manual insertion original detection sensor 60 for detecting the original P by flag movement is disposed at the side of the manual insertion sheet supply roller 13 near the manual insertion original tray 14 and serves to detect the fact that the original is set on the manual insertion original tray 14.

Explanation of Drive System

Next, a drive system of the original conveying apparatus 2 according to the present invention will be explained with reference to FIG. 4. FIG. 4 shows a drive system including motors and solenoids for driving the convey rollers and the flappers.

A separation motor 100 is a DC brush motor which is PLL-controlled in the illustrated embodiment. A clock plate 100a having a plurality of slits is provided on a motor shaft of the separation motor 100. A separation clock sensor (optical sensor of permeable type) 100b cooperates with the slits to generate clock pulses proportional to the number of revolutions of the motor when the separation motor 100 is rotated. The separation motor 100 rotates the separation/convey roller 8 and the separation belt 6 of the separation portion in the directions shown by the arrows. A driving force of the separation motor is also transmitted to the sheet supply roller 5 through a separation clutch 106.

A reversible convey motor 101 is constituted by a stepping motor in the illustrated embodiment. The convey motor 101 drives the second sheet supply roller 9, and the first and second reverse rotation rollers 17, 18.

A clock plate 101a having a plurality of slits is provided on a motor shaft of a driven roller portion of the second sheet supply roller 9. A reverse clock sensor (optical sensor of permeable type) 101b cooperates with the slits to generate clock pulses when the convey motor 101 is rotated. When the original P is conveyed by the second sheet supply roller 9, if slip is generated, a slip amount can be measured the number of clock pulses of the second sheet supply roller 9 and the number of drive clock pulses of the convey motor 101.

A reversible belt motor 102 is constituted by a stepping motor in the illustrated embodiment. The belt motor 102 drives the drive roller 36 for driving the wide belt 7, and the rotation of the drive roller 36 is transmitted to the turn roller 37 through the wide belt 7. A driving force is transmitted to the turn roller 37 to the pair of regist rollers 11 so that the convey speed of the original on the platen 3 becomes equal to the conveying speed of the regist rollers 11.

A reversible rock motor 103 is constituted by a stepping motor in the illustrated embodiment. The rock motor 103 drives the lift/lower arm 51 for the sheet supply roller.

A sheet discharge motor 104 is constituted by a DC motor of FG servo control type in the illustrated embodiment. A clock plate 104a having a plurality of slits is provided on a motor shaft of the sheet discharge motor 104. A sheet discharge clock sensor (optical sensor of permeable type) 104b cooperates with the slits to generate clock pulses proportional to the number of revolutions of the motor when the sheet discharge motor 104 is rotated. A driving force of the sheet discharge motor 104 is transmitted to the sheet discharge roller 12 and the manual insertion sheet supply roller 13.

A stopper solenoid 105 serves to drive the stopper 21 provided at the sheet supply end of the original tray 4. When the solenoid is in an OFF condition, the stopper 21 is positioned at a position shown by the solid line, and, when the solenoid is turned ON, the stopper 21 is pivoted to a position shown by the dot and chain line. A separation clutch 106 serves to transmit the driving force of the separation motor 100 to the sheet supply roller 5, separation belt 6 and separation/convey roller 8.

A path switch solenoid 107 serves to drive the reverse supply flapper 22 and the sheet discharge flapper 25. When the flapper is in an OFF condition, the reverse supply flapper 22 and the sheet discharge flapper 25 are positioned at positions shown by the solid lines, and when the solenoid is turned ON, the reverse supply flapper 22 and the sheet discharge flapper 25 are pivoted to positions shown by the dot and chain lines.

A reverse flapper solenoid 108 serves to drive the reverse flapper 23. When the solenoid is in an OFF condition, the reverse flapper 23 is positioned at a position shown by the solid line, and, when the solenoid is turned ON, the reverse flapper 23 is pivoted to a position shown by the dot and chain line. A sheet discharge flapper solenoid 109 serves to drive the sheet discharge flapper 26 and the manual insertion shutter 28. When the solenoid is in an OFF condition, the sheet discharge flapper 26 and the manual insertion shutter 28 are positioned at positions shown by the solid lines, and, when the solenoid is turned ON, the sheet discharge flapper 26 and the manual insertion shutter 28 are pivoted to positions shown by the dot and chain lines.

Explanation of Reading Positions

Figure 11:
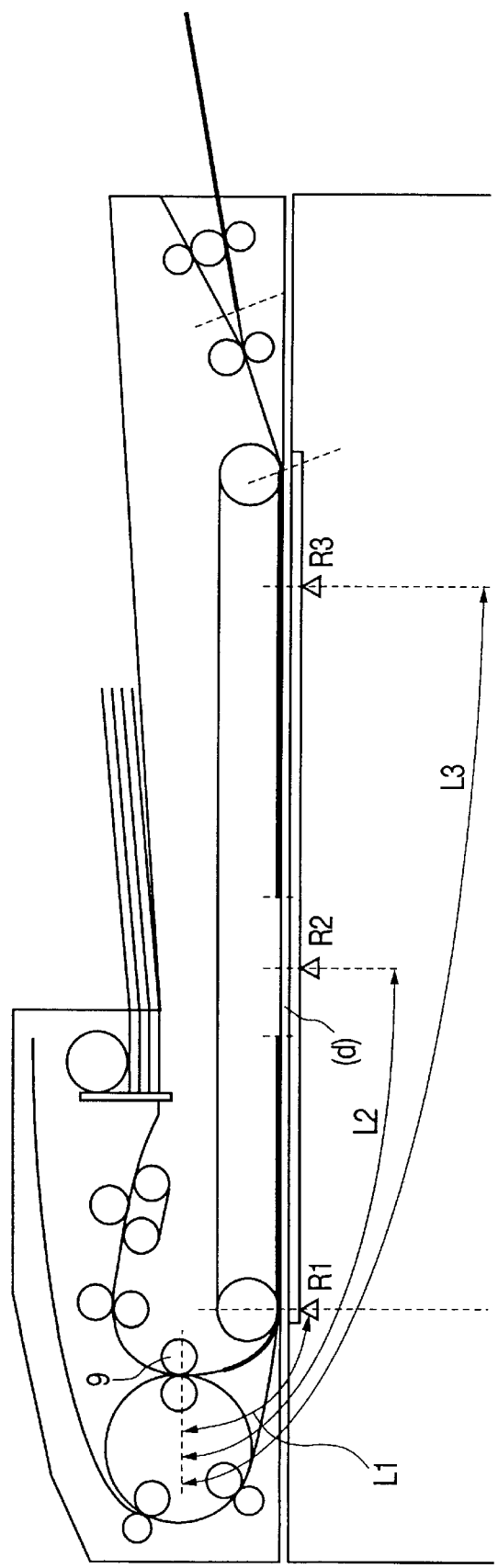
FIGS. 11 and 12 are views for explaining an original reading position.

FIG. 11 shows original reading positions on the platen 3. In accordance with the original convey mode and the size of the original to be conveyed, a reading position R1, R2 or R3 is used. The reading position R1 is used in the both-face original mode, and, the image on the original rested on the platen in alignment with this position is read by the scanning operation of the scanner of the copying machine 1 (fixed-reading mode). The reading position R2 is used for reading a half size original in the one-face original mode. In this position, the scanner of the copying machine 1 is fixed and the image on the original is read while being conveyed (flow-reading mode). The reading position R3 is used for reading a large size original and a half size original in the one-face original mode. Also in this position, the scanner of the copying machine 1 is fixed and the image on the original is read while being conveyed (flow-reading mode).

In FIG. 11, L1 denotes a distance from a nip of the second sheet supply roller 9 to the position R1, L2 denotes a distance from the nip of the second sheet supply roller 9 to the position R2, and L3 denotes a distance from the nip of the second sheet supply roller 9 to the position R3.

Figure 12:
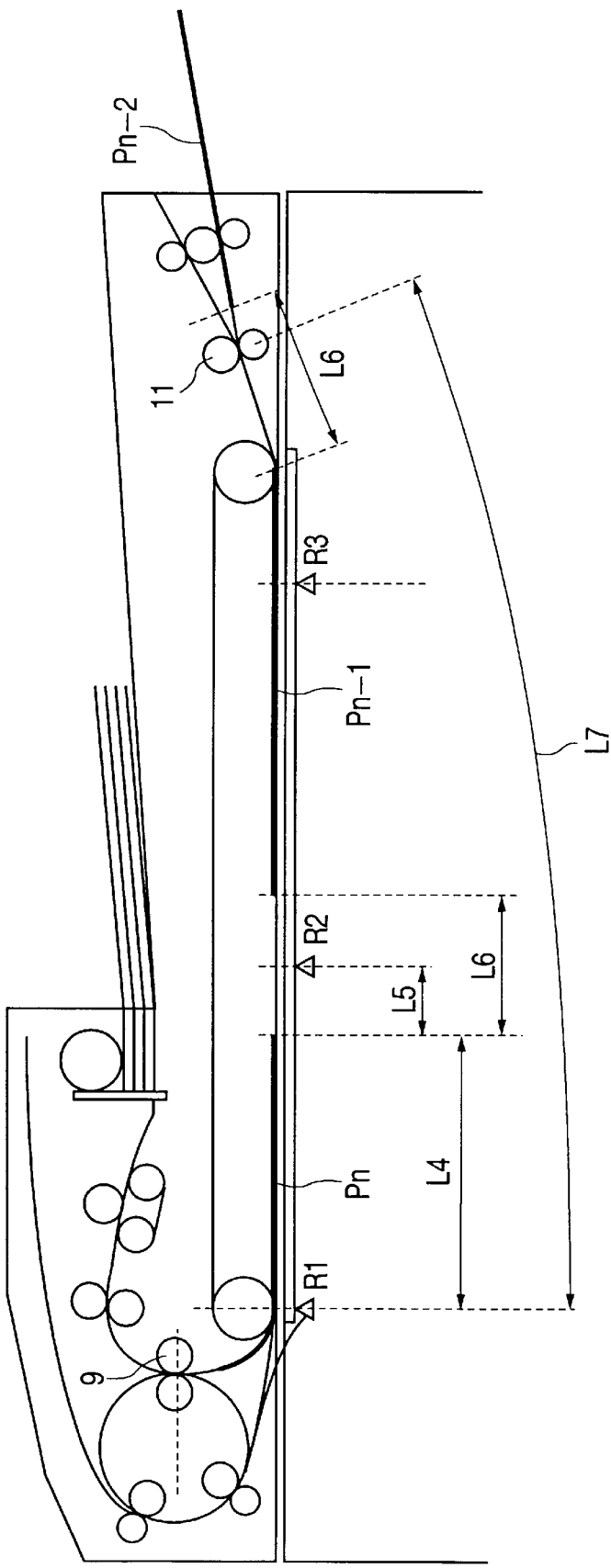

In FIG. 12, L4 denotes a distance from the first image tip R1 to a waiting stop position of the half size original rested on the platen 3 at the left side thereof, L5 denotes a distance from the tip end of the original stopped at the waiting position to the second image tip R2, L6 denotes a distance from the trail end of the preceding original to the tip end of the succeeding original (original interval), and L7 denotes a distance from the first image tip R1 to a nip between the manual insertion regist rollers 11.

When it is assumed that the length of the half size original in the conveying direction is Lph, since the stop position of the half size original is controlled to satisfy relations L7<(L4+2×L6+Lph) and L2>(L5−Lph), as shown in FIG. 12, even when the originals $P_n$, $P_{n-1}$ are stopped on the platen 3, the trail end of the preceding original $P_{n-2}$ leaves the nip between the manual insertion regist rollers 11 and the trail end of the waiting original $P_n$ leaves the nip of the second sheet supply roller 9.

Next, the operation of the original conveying apparatus will be explained.

Explanation of Separating Operation

When the original stack on the original tray 4 is detected by the original set sensor 40, a pre-separating operation is started. The sheet supply roller 5 is lowered and is contacted with the original stack. In the following explanation, the originals are designated by P1, P2, P3, . . . successively from the uppermost one. Further, when the page order of the original is not specified, the original is designated by P.

After the copying condition is inputted at an operation portion of the copying machine, when a start key is depressed, the detection of the original size is effected by the sensors on the platen. Further, the stopper 21 is attracted by the solenoid to open or release the travelling path for the original stack, with the result that the supplying force acting on the original stack successively supplies the originals from the uppermost original P1 toward the downstream side. The separation portion comprised of the separation/convey roller 8 and the separation belt 6 is disposed at the downstream side of the stopper 21, and, the originals P are separated one by one by rotating the roller 8 and the belt 6 in the directions shown by the arrows. The separated original is conveyed toward the downstream side.

The skew-feed of the original P left from the separation portion is detected by the separation sensor 30 and the skew-feed sensor 31. Then, the original is conveyed by the first sheet supply roller 16. When the original is conveyed by the first sheet supply roller 16, the sheet supply roller 5 is lifted, and, then, the separation clutch 106 is turned OFF to disconnect the driving force from the separation belt 6 and the separation/convey roller 8, thereby stopping these elements 6, 8. Since the separation/convey roller 8 is provided with the one-way clutch, the separation/convey roller 8 is rotatingly driven by the movement of the original P being conveyed.

The original P is conveyed only by the first sheet supply roller 16 until the tip end of the original abuts against the nip of the second sheet supply roller 9 (which is now stopped). At that point, the skew-feed is corrected in a conventional manner. After the skew-feed is corrected, the first and second sheet supply rollers 16, 9 are rotated simultaneously. Synchronous speed control is effected so that the convey speed of the first sheet supply roller 16 becomes equal to the convey speed of the second sheet supply roller 9.

Since the subsequent operations differ from each other in accordance with the original convey modes, the operation in each mode will be explained.

Half Size One-face Original Convey Mode

FIGS. 13A to 13C and FIGS. 14A and 14B schematically show a flow of the original in the one-face original convey mode.

When the one-face original convey mode is used, since the path switch solenoid 107 is turned OFF, the original supply path (c) can be used, and the preceding original P1 is conveyed to the platen 3 through the original supply path (c). The conveying speed of the wide belt 7 is controlled to become equal to the conveying speed of the second sheet supply roller 9 before the preceding original P1 enters onto the platen 3.

Figure 13A:
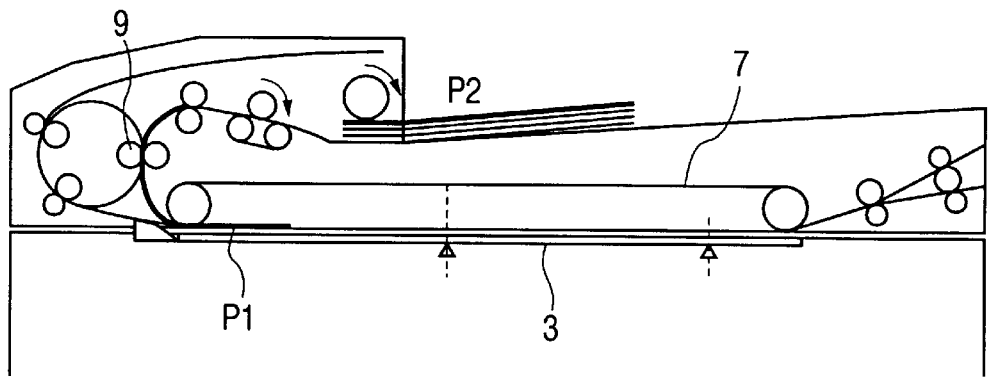
FIGS. 13A, 13B, 13C, 14A and 14B are views showing a flow of a half size original in a one-face original conveying mode.

When the trail end of the preceding original P1 leaves the nip of the sheet supply roller 5, the sheet supply roller 5 is lowered again for preparation for the supplying operation for the succeeding original P2. When the trail end of the preceding original P1 leaves the nip of the first sheet supply roller 16, the separation clutch 106 is turned ON, the supplying operation for the succeeding original P2 by means of the sheet supply roller 5 is started. This condition is shown in FIG. 13A.

Figure 13B:
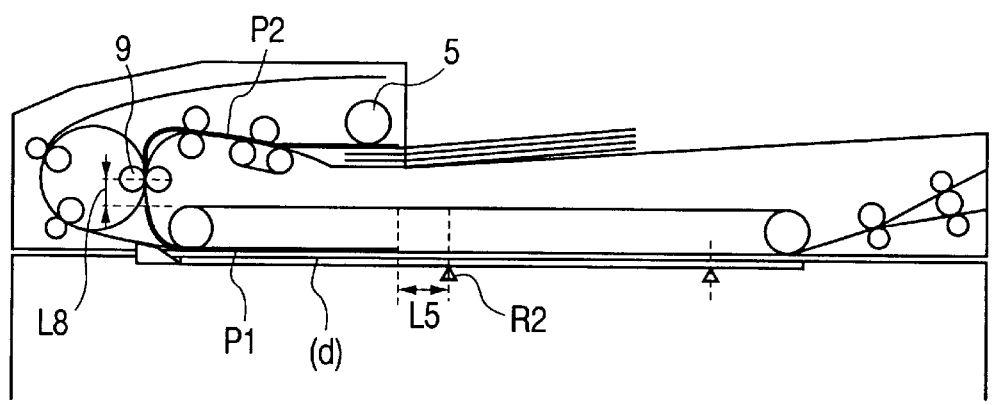

When the trail end of the preceding original P1 leaves the nip of the second sheet supply roller 9, the second sheet supply roller 9 is stopped. The succeeding original P2 is accelerated after the start of the supplying operation therefor so that the succeeding original reaches the sheet supply sensor 35 at the time when the second sheet supply roller 9 is stopped. When the sheet supply sensor 35 is turned ON by the succeeding original, the skew-feed correction control is effected, as is in the preceding original P1. In this case, the preceding original P1 has already entered into the convey path (d) on the platen 3. As a result, the preceding original P1 is conveyed only the wide belt 7, and, when the trail end of the preceding original is advanced from the sheet supply sensor 35 by a predetermined distance, the preceding original is stopped temporarily (FIG. 13B).

In this case, it is controlled so that a distance between the tip end of the original P1 and the second reading position R2 becomes L5. Further, a distance L8 between the trail end of the original P1 and the nip of the second sheet supply roller 9 is represented by the following equation:

$$L8=L2-L5-\text{(original size in the conveying direction)}$$

Where, L2 is a distance from the second image tip position R2 to the nip of the second sheet supply roller 9. This distance (L8) is selected to have a plus value (i.e., the trail end of the original P1 has left the nip of the second sheet supply roller).

Simultaneously with the above temporary stop, a convey completion signal is outputted to the copying machine, and, input of a convey start signal is waited. This condition is shown in FIG. 13B.

When the convey start signal 121 is received and the skew-feed correction control for the succeeding original P2 is completed, the wide belt 7 is driven to convey the preceding original P1 at a speed equal to an image forming speed. When the distance (original interval) between the trail end of the preceding original P1 and the tip end of the succeeding original P2 becomes a predetermined value, the second sheet supply roller 9 is driven to convey the succeeding original at the image forming speed similar to the preceding original P1.

The start timing and acceleration of the second sheet supply roller 9 are controlled so that, when the conveying speed of the wide belt 7 becomes the same as that of the second sheet supply roller 9, the original interval becomes L6.

When the preceding original P1 reaches the second image tip position R2, an image tip reach signal 122 is outputted.

When the copying machine 1 receives this signal, the image reading for the preceding original P1 is started.

Figure 13C:
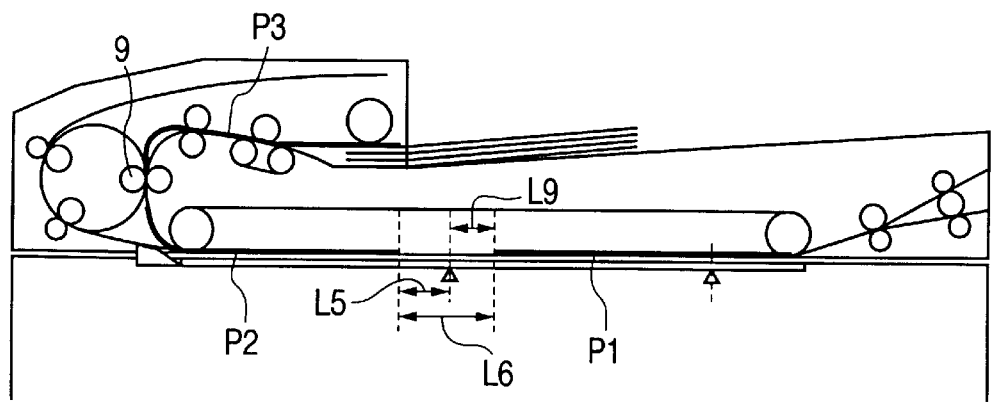

FIG. 13C shows a condition after the image reading for the preceding original P1 is finished. In this condition, the original P1 was stopped after it was conveyed by a predetermined distance (L9) after the completion of the reading. In this case, the succeeding original P2 is stopped at a position spaced apart from the second image tip position R2 by the distance L5, and a further succeeding original P3 is waiting at the second sheet supply roller 9 while forming a loop for correcting the skew-feed.

Figure 14A:
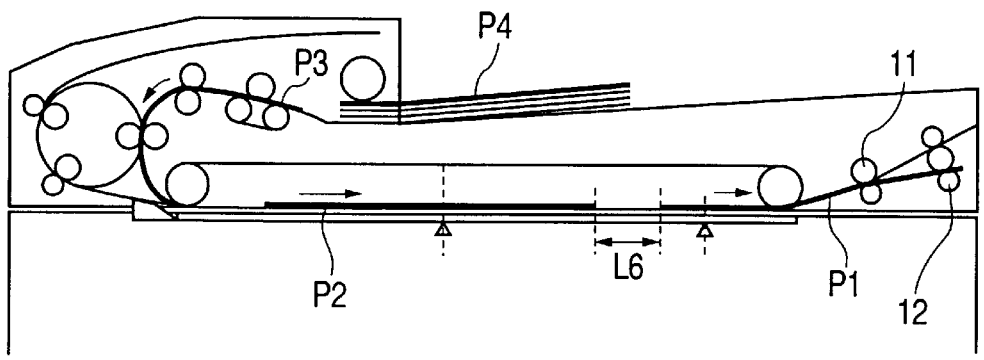

In this condition, when the convey start signal 120 is inputted from the copying machine 1, the image formation for the original P2 is effected. FIG. 14A shows positions of originals in the paths while the original P2 is being read. In this condition, the original P1 is conveyed by the wide belt 7, manual insertion regist rollers 11 and sheet discharge rollers 12. In this case, it is selected so that the conveying speed of the wide belt 7 becomes the same as the conveying speed of the manual insertion regist rollers 11 and the conveying speed of the sheet discharge rollers 12 becomes equal to or slightly faster that the conveying speed of the wide belt 7.

Figure 14B:
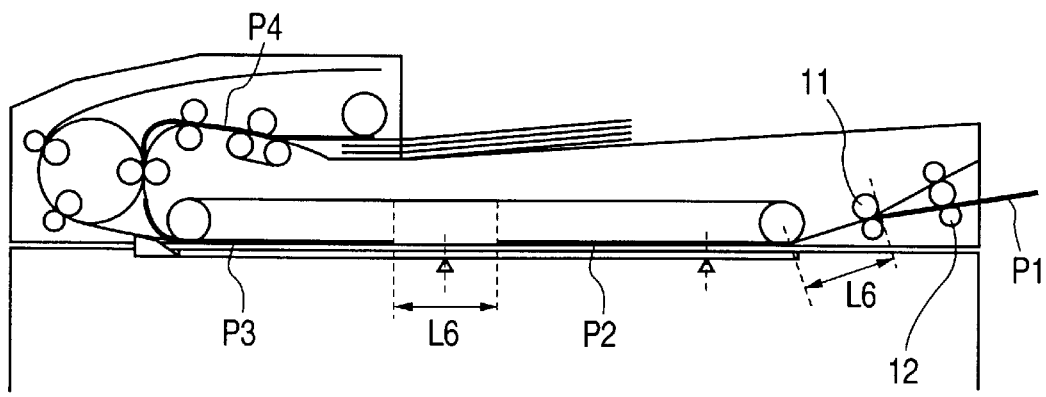

FIG. 14B shows a condition after the image reading for the succeeding original P2 is finished. In this condition, since the wide belt 7 is stopped after the image reading, the succeeding originals P2, P3 are stopped on the platen 3. Since the trail end of the preceding original P1 has already left the nip between the manual insertion regist rollers 11, the preceding original P1 is conveyed only by the sheet discharge rollers 12 to be discharge onto the sheet discharge tray 10.

Large Size One-face Original Convey Mode

FIGS. 15A and 15B and FIGS. 16A and 16B schematically show a flow of the large size original in the one-face original convey mode.

Figure 15A:
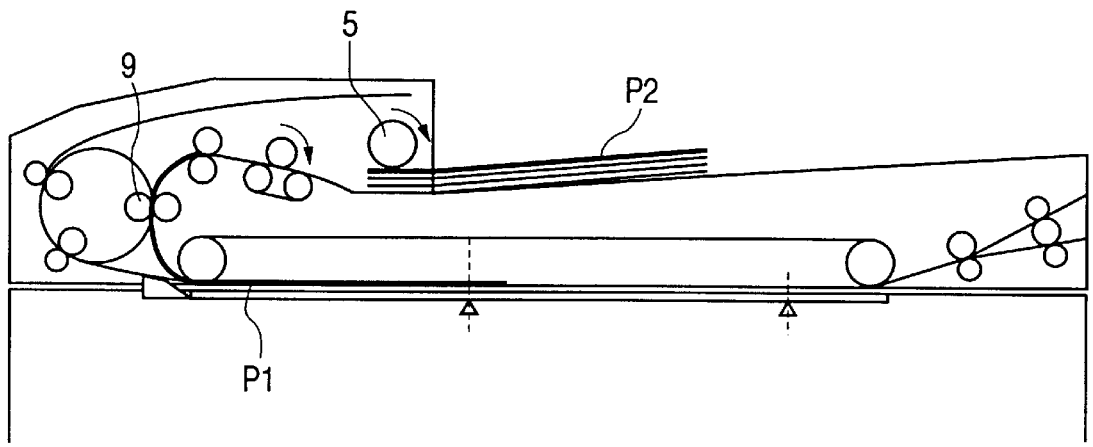
FIGS. 15A, 15B, 16A and 16B are views showing a flow of a large size original in a one-face original conveying mode.

As is in the small size (half size) original in the one-face original convey mode, since the path switch solenoid 107 is turned OFF, the original supply path (c) can be used, and the preceding original P1 is conveyed to the platen 3 through the original supply path (c). When the trail end of the preceding original P1 leaves the nip of the sheet supply roller 5, the sheet supply roller 5 is lowered again for preparation for the supplying operation for the succeeding original P2. When the trail end of the preceding original P1 leaves the nip of the first sheet supply roller 16, the separation clutch 106 is turned ON, the supplying operation for the succeeding original P2 by means of the sheet supply roller 5 is started. This condition is shown in FIG. 15A.

When the trail end of the preceding original P1 leaves the nip of the second sheet supply roller 9, the second sheet supply roller 9 is stopped. The succeeding original P2 is accelerated after the start of the supplying operation therefor so that the succeeding original reaches the sheet supply sensor 35 at the time when the second sheet supply roller 9 is stopped. When the sheet supply sensor 35 is turned ON by the succeeding original, the skew-feed correction control is effected, as is in the preceding original P1. In this case, the preceding original P1 has already entered into the convey path (d) on the platen 3. As a result, the preceding original P1 is conveyed only the wide belt 7, and, when the trail end of the preceding original is advanced from the sheet supply sensor 35 by a predetermined distance, the preceding original is stopped temporarily.

In this case, a distance between the tip end of the original P1 and the third reading position R3 becomes L5, as is in the half size original control. Further, a distance L10 between the trail end of the original P1 and the nip of the second sheet supply roller 9 is represented by the following equation:

$$L10 = L3 - L5 - \text{(original size in the conveying direction)}$$

Where, L3 is a distance from the third image tip position R3 to the nip of the second sheet supply roller 9. This distance (L10) is selected to have a plus value (i.e., the trail end of the original P1 has left the nip of the second sheet supply roller).

Figure 15B:
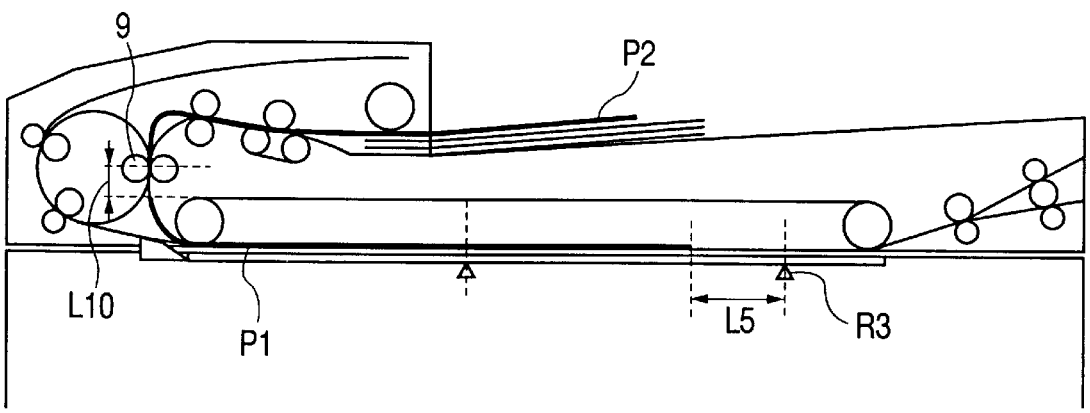

Simultaneously with the above temporary stop, the convey completion signal 120 is outputted to the copying machine, and, input of the convey start signal 121 is waited. This condition is shown in FIG. 15B.

When the convey start signal 121 is received and the skew-feed correction control for the succeeding original P2 is completed, the wide belt 7 is driven to convey the preceding original P1 at a speed equal to the image forming speed. When the preceding original P1 reaches the third image tip position R3, the image tip reach signal 122 is outputted. When the copying machine 1 receives this signal, the image reading for the preceding original P1 is started.

Figure 16A:
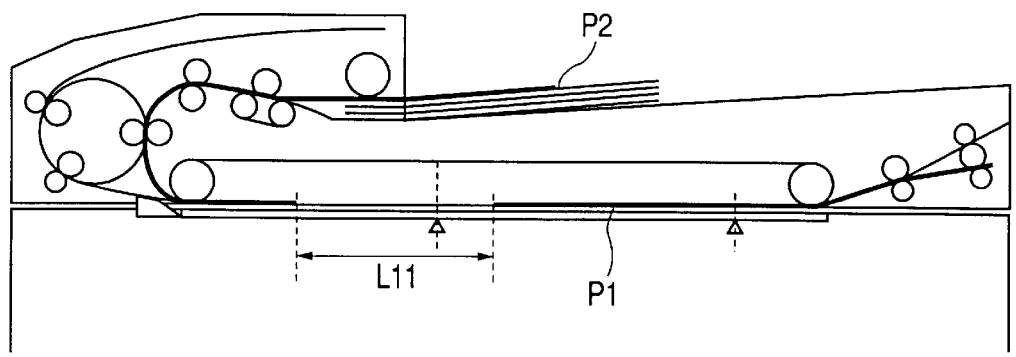

When the distance (original interval) between the trail end of the preceding original P1 and the tip end of the succeeding original P2 becomes a predetermined value, the second sheet supply roller 9 is driven to convey the succeeding original at the image forming speed similar to the preceding original P1. In this case, the start timing and acceleration of the second sheet supply roller 9 are controlled so that, when the conveying speed of the wide belt 7 becomes the same as that of the second sheet supply roller 9, the original interval becomes L11. This condition is shown in FIG. 16A.

Figure 16B:
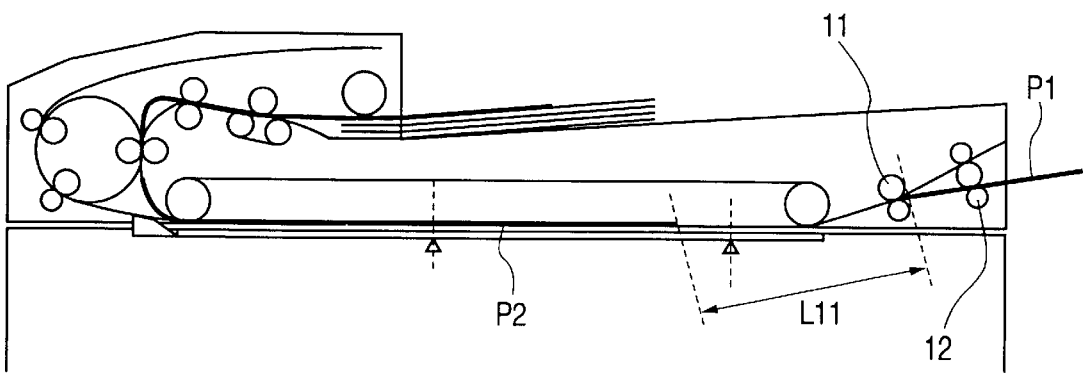

FIG. 16B shows a condition after the image reading for the preceding original P1 is finished. In this condition the succeeding original P2 was stopped on the platen 3. Since the original interval L11 is selected to becomes greater than a distance from the tip end of the succeeding original P2 to the nip between the manual insertion regist rollers 11, when the succeeding original P2 is stopped, since the trail end of the preceding original P1 has already left the nip between the manual insertion regist rollers 11, the preceding original P1 is discharged only by the sheet discharge rollers 12.

Conveyance in Half Size Both-face Original Convey Mode

FIGS. 17A, 17B, 18A, 18B, 19A, 19B, 20A and 20B schematically show a flow of the original in the both-face original convey mode. Incidentally, the conveying speed of the second sheet supply roller 9 and the conveying speed of the wide belt 7 are controlled to be the same as each other, except for a special case.

Figure 17A:
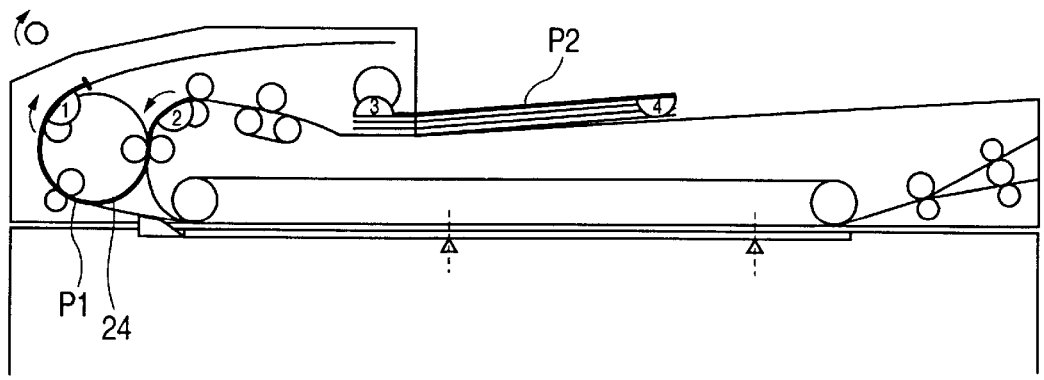
FIGS. 17A, 17B, 18A, 18B, 19A, 19B, 20A and 20B are views showing a flow of a half size original in a both-face original conveying mode.

When the both-face original convey mode is used, the reverse supply flapper 22 and the reverse flapper 23 are initially positioned at the positions shown by the solid lines in FIG. 3, and the original P1 is directed toward the reverse supply paths (h), (f), (i) (FIG. 17A).

Figure 17B:
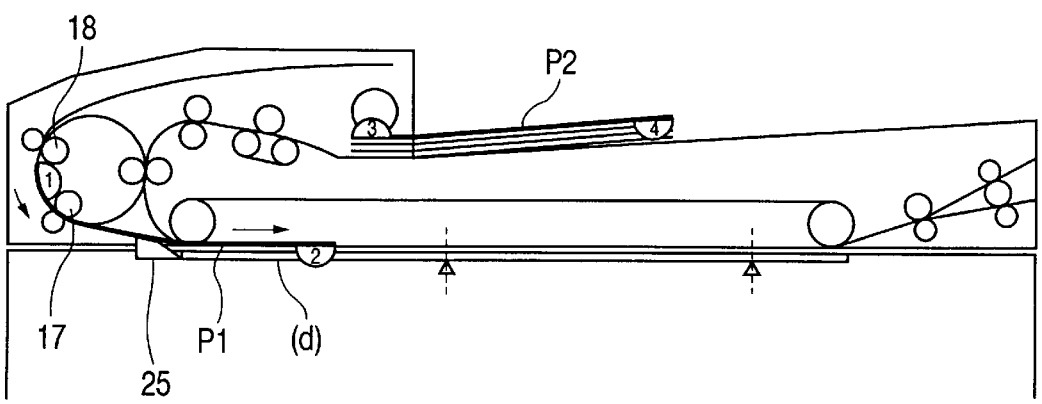

When the trail end of the original P1 leaves the one-way flapper 24, the rollers 17, 18 are rotated reversely to convey the original P1 in the reverse direction. Since the supply/discharge flapper 25 is positioned at the position shown by the solid line in FIG. 4, the original P1 conveyed in the reverse direction is directed to the convey path (d) on the platen 3 (FIG. 17B).

Figure 18A:
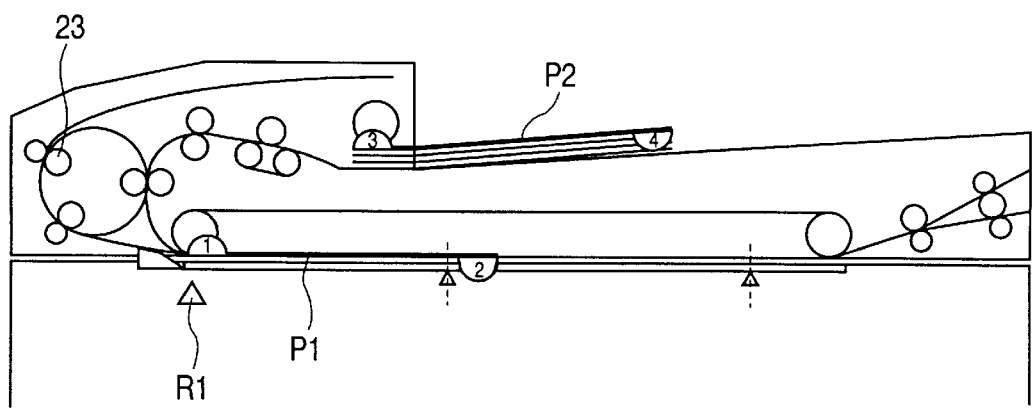

When the original is conveyed by a predetermined distance after the trail end (in the conveying direction) of the original is detected by the reverse sensor 50, the wide belt 7 is stopped, and the original P1 is set at the image tip position R1 in the fixed-reading mode (FIG. 18A). The second surface of the original is read by the scanner.

Figure 18B:
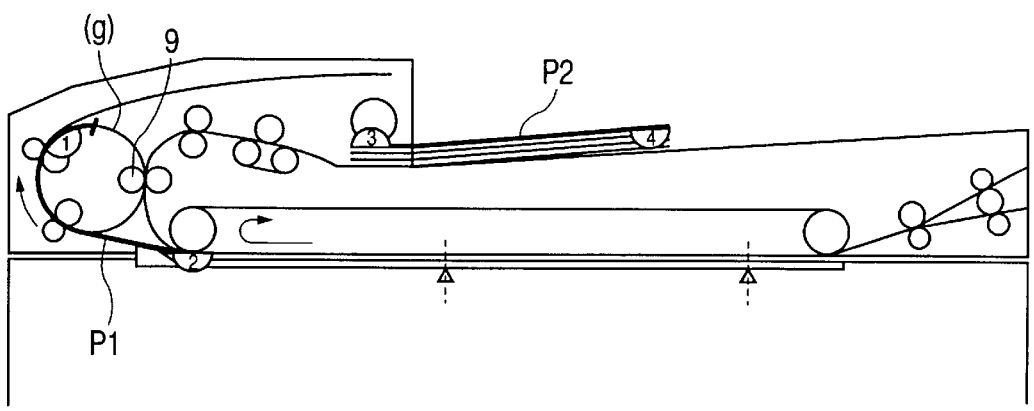

Since the path switch solenoid 107 is turned OFF at a time nearly when the setting of the original P1 is completed, the reverse sheet supply flapper 22 and the supply/discharge flapper 25 are pivoted to the positions shown by the dot and chain lines in FIG. 4. When the scanning of the second surface of the original P1 by the scanner of the copying machine 1 is completed, the wide belt 7 is rotated in the reverse direction to convey the original into the original supply/discharge path (e). At the same time when the wide belt 7 is rotated in the reverse direction, since the reverse flapper 23 is pivoted to the position shown by the dot and chain line in FIG. 3, the original is directed into the original reverse path (g) (FIG. 18B).

When the original is conveyed by a predetermined distance after the tip end of the original is detected by the reverse sensor 50, the wide belt 7 is stopped temporarily and then is rotated in the normal direction (from the reverse direction). It is controlled so that the conveying speed of the second sheet supply roller 9 becomes the same as the conveying speed of the wide belt 7 when the tip end of the reversed original enter into the convey path (d) on the platen 3.

When the trail end of the preceding original P1 leaves the nip of the second sheet supply roller 9, the second sheet supply roller 9 is stopped for waiting the succeeding original P2.

Although the preceding original P1 is conveyed only by the wide belt 7, when the original is conveyed by a predetermined distance after the trail end of the original is detected by the sheet supply sensor 35, the wide belt is stopped, thereby setting the original at the image tip position in the fixed-reading mode. The first surface of the original is read by the scanner. Further, the separating operation for the succeeding original P2 is started at a time nearly when the trail end of the preceding original is detected by the sheet supply sensor 35, and the skew-feed is corrected by the second sheet supply roller 9 in the conventional manner.

Figure 19A:
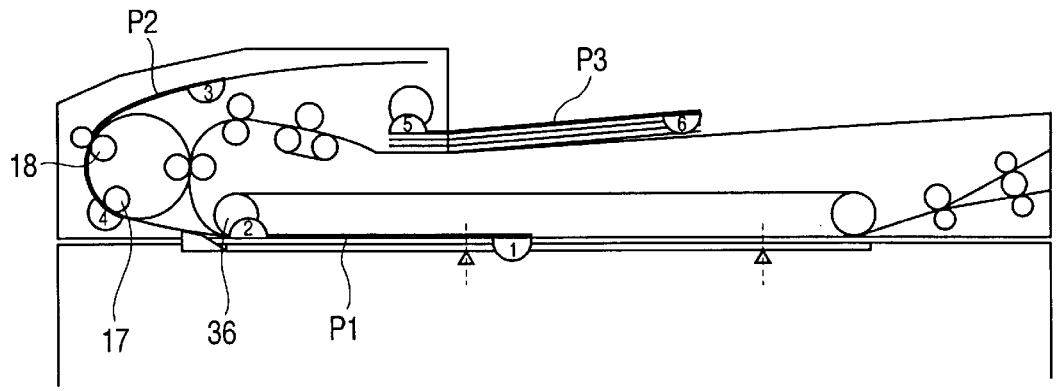
Figure 19B:
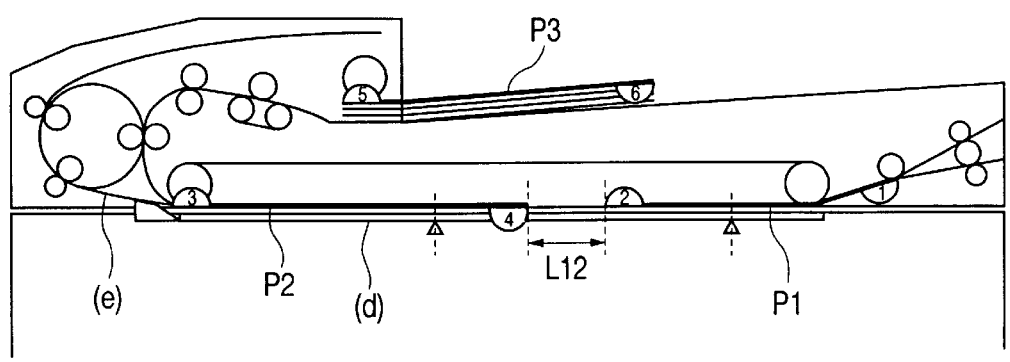

During the scanning of the first surface of the original by the scanner of the copying machine 1, the reverse operation for the succeeding original P2 is completed, and the succeeding original is waiting in a condition that the tip end portion of the succeeding original is nipped by the first reverse rotation roller 17 (FIG. 19A). When the scanning of the first surface of the preceding original P1 is completed, the reverse of the first and second reverse rotation rollers 17, 18 and the normal rotation of the wide belt 7 are started, with the result that the preceding original P1 and the succeeding original P2 are rested on the platen 3 in a spaced relation with a predetermined original interval (L12) (FIG. 19B).

When the scanning of the second surface of the succeeding original by the scanner of the copying machine 1 is completed, as is in the preceding original P1, the reverse operation for the succeeding original P2 is started to convey the preceding original P1 and the succeeding original P2 toward the reverse supply path (e). Since the proper original interval L12 is maintained, the belt is stopped temporarily while the preceding original P1 is in the convey path (d) on the platen 3, and, thereafter, the rotational direction of the wide belt 7 is switched, thereby conveying the preceding original P1 and the succeeding original P2 toward the sheet discharge rollers 12. The preceding original P1 and the succeeding original P2 are stopped in a condition shown in FIG. 20A, and the scanning of the first surface of the original P2 is started. An original-to-original distance in this case becomes L13 (this distance may be controlled to be L12). Further, in this case, the succeeding original P3 is waiting in a condition that the tip end portion of the succeeding original is nipped by the first reverse rotation roller 17, as is in the original P2 shown in FIG. 19A.

Figure 20A:
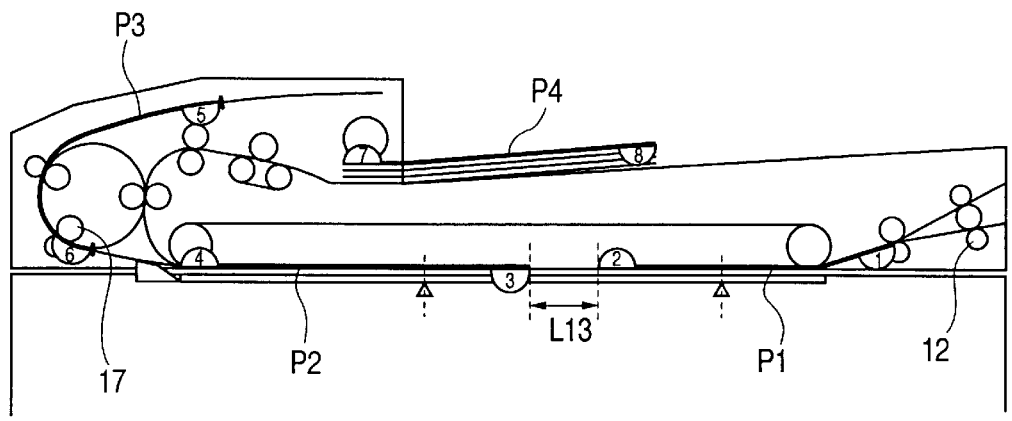
Figure 20B:
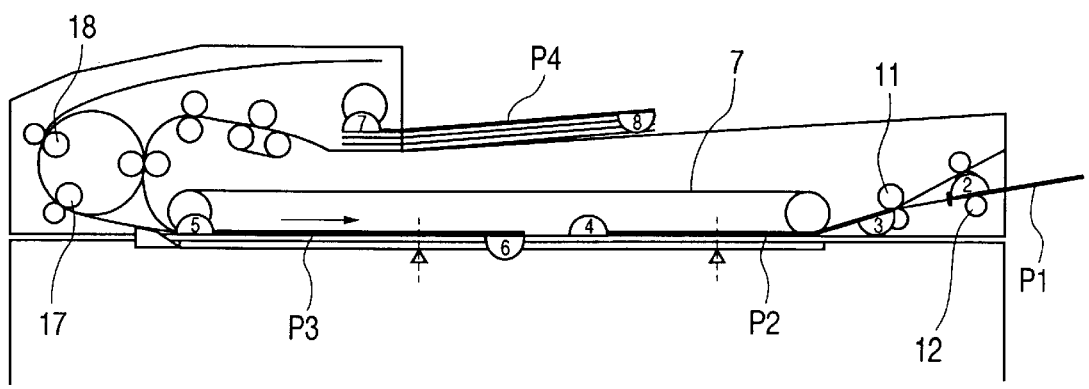

When the scanning of the first surface of the original P2 is finished, the reverse of the first and second reverse rotation rollers 17, 18, the normal rotation of the wide belt 7 and the rotation of the sheet discharge rollers 12 are started, thereby conveying the succeeding original P3, the original P2 (the reading thereof is completed) and the original P1 simultaneously. When the wide belt 7 is stopped and the setting of the second surface of the succeeding original P3 is finished, since the trail end of the preceding original P1 leaves the nip between the manual insertion regist rollers 11, the preceding original P1 is conveyed only by the sheet discharge rollers 12 to be discharged onto the sheet discharge tray 10 (FIG. 20B). This can be achieved by selecting the original-to-original distance to L13.

The above-mentioned operations are repeated continuously. When the scanning of the first surface of the last original $P_n$ is finished, the last original $P_n$ and the last-but-one original $P_{n-1}$ are rested on the platen 3, and these originals are discharged at once.

Conveyance in Full Size Both-face Original Convey Mode

FIGS. 21A, 21B, 22A, 22B, 23A, 23B and 24 schematically show a flow of the full size original in the both-face original convey mode. Incidentally, the conveying speed of the second sheet supply roller 9 and the conveying speed of the wide belt 7 are controlled to be the same as each other, except for a special case.

Figure 21A:
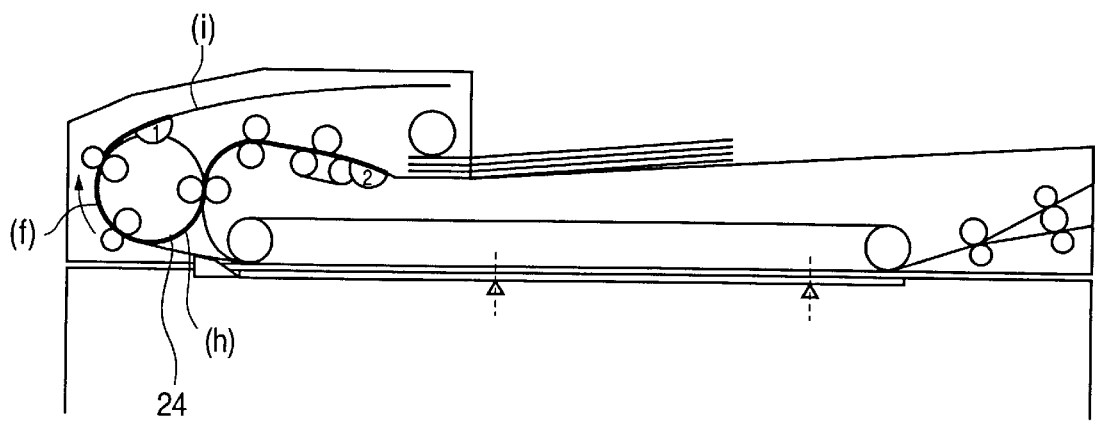
FIGS. 21A, 21B, 22A, 22B, 23A, 23B and 24 are views showing a flow of a large size original in a both-face original conveying mode.

When the both-face original convey mode is used, the reverse supply flapper 22 and the reverse flapper 23 are initially positioned at the positions shown by the solid lines in FIG. 3, and, as shown in FIG. 21A, the original P1 is directed toward the reverse supply paths (h), (f), (i).

Figure 21B:
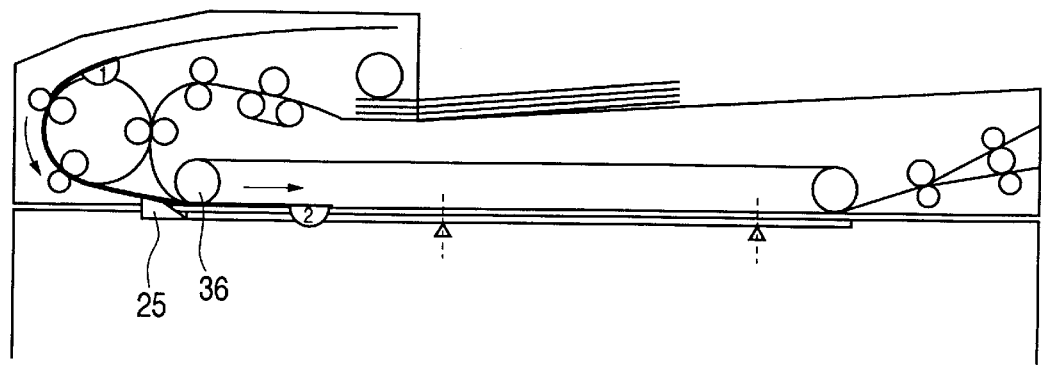

When the trail end of the original leaves the one-way flapper 24, the rollers 17, 18 are rotated reversely to convey the original in the reverse direction. Since the supply/discharge flapper 25 is positioned at the position shown by the solid line in FIG. 4, the original P1 conveyed in the reverse direction is directed to the convey path (d) on the platen 3. This condition is shown in FIG. 21B.

Figure 22A:
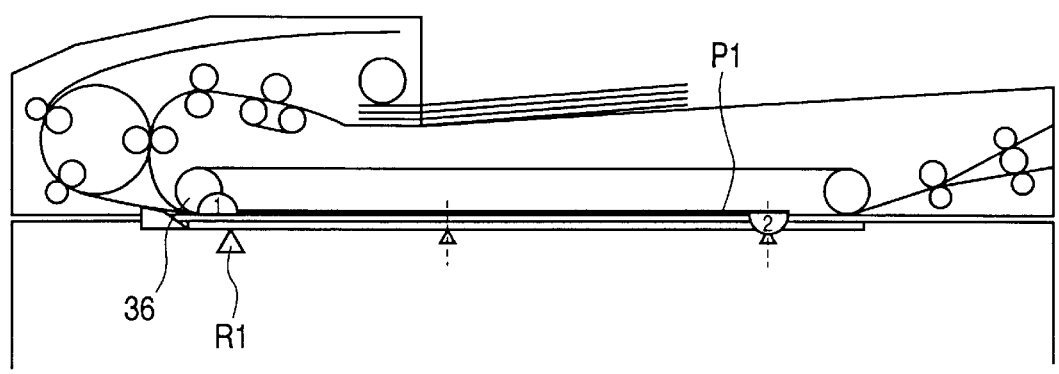

When the original is conveyed by a predetermined distance after the trail end (in the conveying direction) of the original is detected by the reverse sensor 50, the wide belt 7 is stopped, and, as shown in FIG. 22A, the original is set at the image tip position R1 in the fixed-reading mode.

Figure 22B:
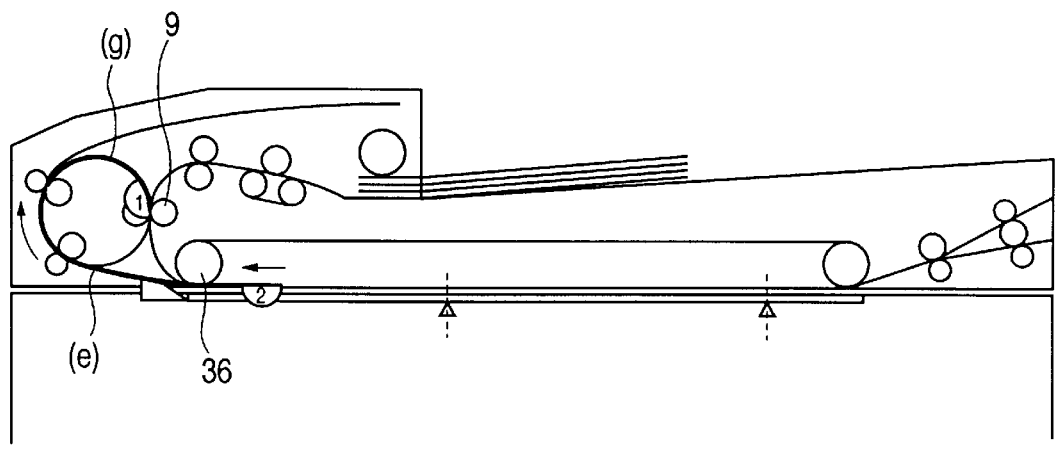

Since the path switch solenoid 107 is turned OFF at a time nearly when the setting of the original is completed, the reverse sheet supply flapper 22 and the supply/discharge flapper 25 are pivoted to the positions shown by the dot and chain lines in FIG. 4. When the scanning of the second surface of the original by the scanner of the copying machine 1 is completed, the wide belt 7 is rotated in the reverse direction to convey the original into the original supply/discharge path (e). At the same time when the wide belt 7 is rotated in the reverse direction, since the reverse flapper 23 is pivoted to the position shown by the dot and chain line in FIG. 4, the original is directed into the original reverse path (g). This condition is shown in FIG. 22B.

When the original is conveyed by a predetermined distance after the tip end of the original is detected by the reverse sensor 50, the wide belt 7 is stopped temporarily and then is rotated in the normal direction (from the reverse direction). It is controlled so that the conveying speed of the second sheet supply roller 9 becomes the same as the conveying speed of the wide belt 7 when the tip end of the reversed original enter into the convey path (d) on the platen 3.

When the trail end of the preceding original leaves the nip of the second sheet supply roller 9, the second sheet supply roller 9 is stopped for waiting the succeeding original.

Although the preceding original P1 is conveyed only by the wide belt 7, when the original is conveyed by a predetermined distance after the trail end of the original is detected by the sheet supply sensor 35, the wide belt is stopped, thereby setting the original at the image tip position R1 in the fixed-reading mode.

Figure 23A:
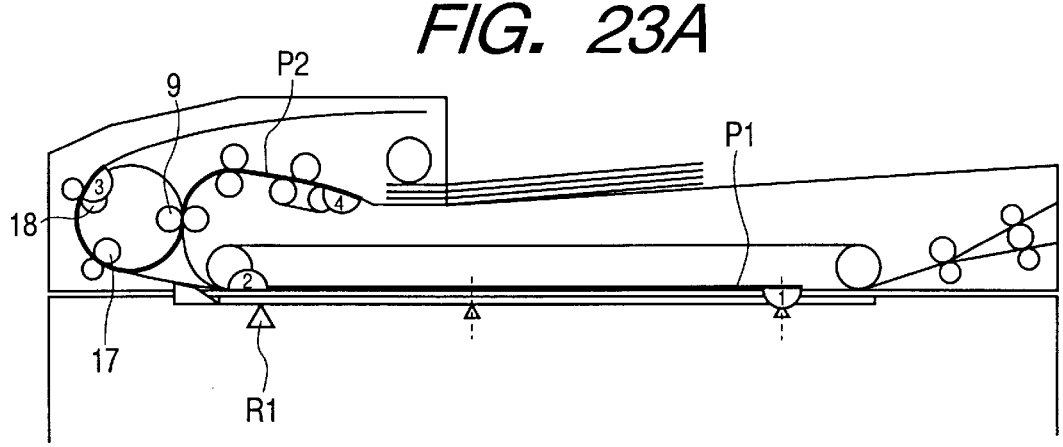

Further, the separating operation for the succeeding original P2 is started at a time nearly when the trail end of the preceding original is detected by the sheet supply sensor 35, and the skew-feed is corrected by the stopped second sheet supply roller 9 in the conventional manner, and, as shown in FIG. 23A, the original P2 is directed to the reverse supply paths (h), (f), (i).

Figure 23B:
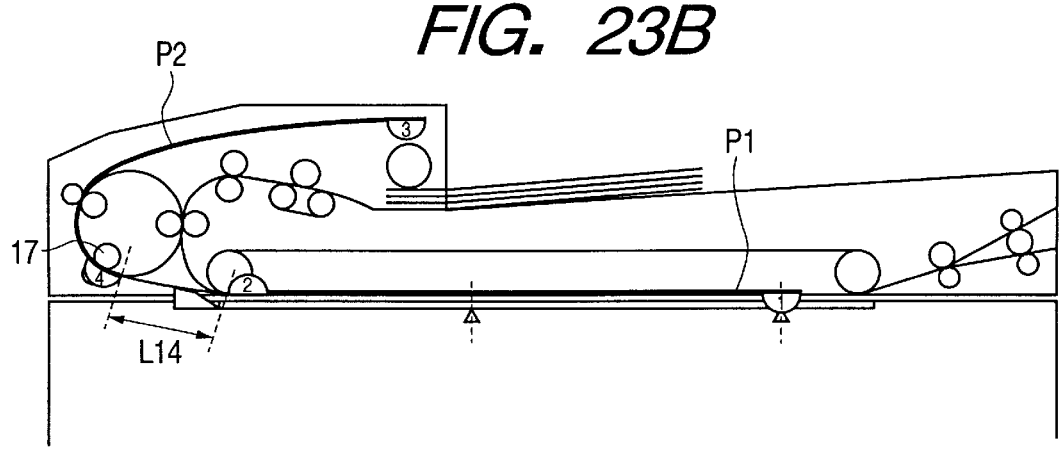

As is in the preceding original P1, during the scanning of the first surface of the original by the scanning of the copying machine 1, the reverse operation for the succeeding original P2 is completed, and, as shown in FIG. 23B, the succeeding original is waiting in a condition that the tip end portion of the succeeding original is nipped by the first reverse rotation roller 17. In this case, it is controlled so that the original interval between the preceding original P1 and the waiting succeeding original P2 becomes L14.

Figure 24:
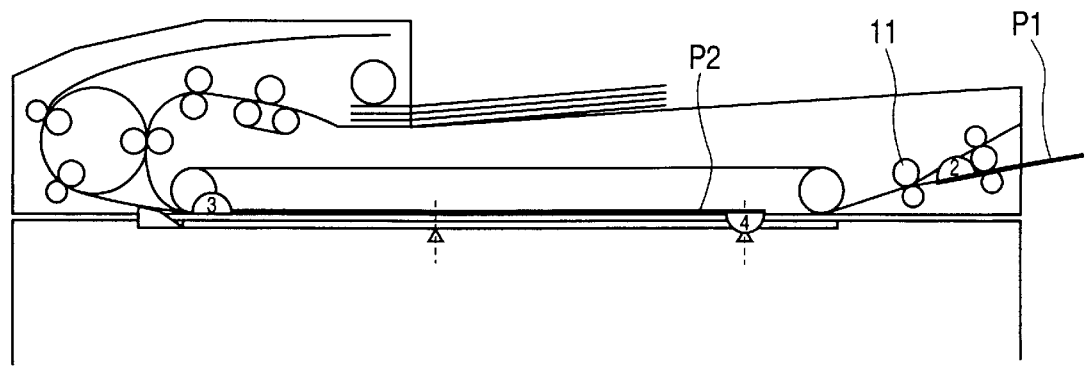
Figure 25A:
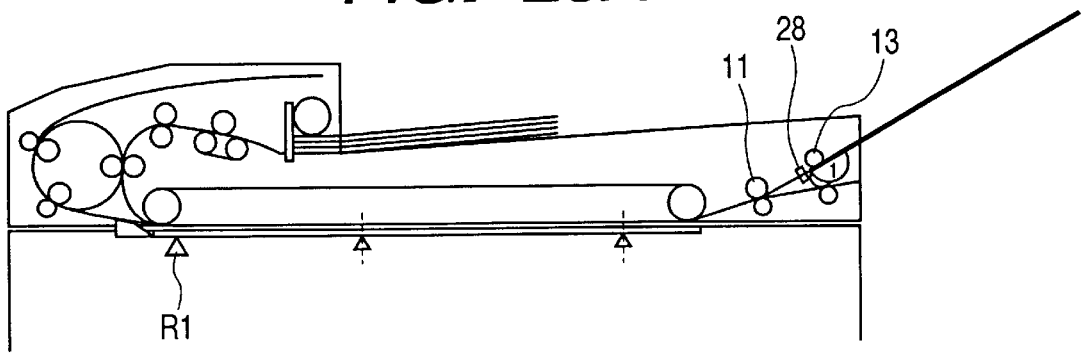
FIGS. 25A, 25B, 26A and 26B are views showing a flow of a manually inserted original.
Figure 25B:
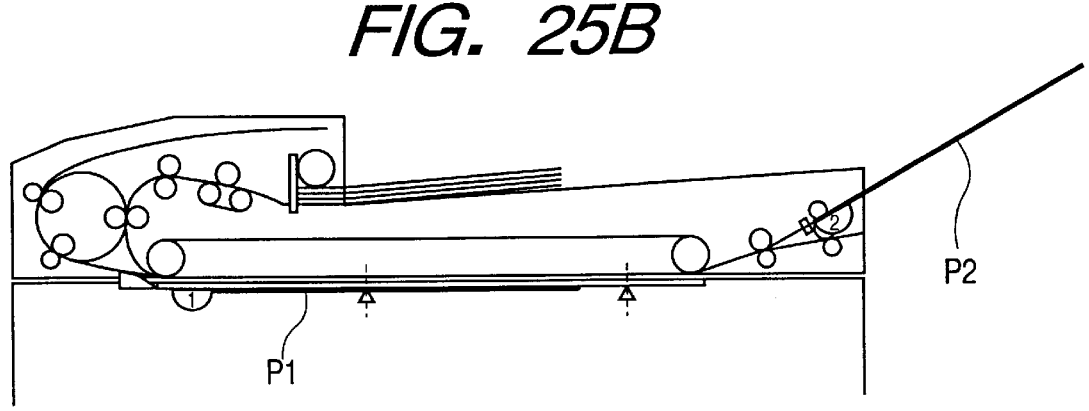

When the scanning of the first surface of the preceding original P1 is completed, the reverse of the first and second reverse rotation rollers 17, 18 and the normal rotation of the wide belt 7 are started, and, as shown in FIG. 24, the value L14 is selected so that, when the succeeding original P2 is rested on the platen 3, the trail end of the preceding original leaves the nip between the manual insertion regist rollers 11.

The above-mentioned operations are repeated continuously up the last original $P_n$.

Original Conveyance in Manual Insertion Original Copy Mode

FIGS. 25A and 25B and FIGS. 26A and 26B show a flow of the original in the manual insertion original convey mode.

When the fact that the original is set is detected by the manual insertion original detection sensor 60, the manual insertion flapper 27 and the manual insertion shutter 28 are shifted to the positions shown by the solid lines in FIG. 4, and the original is conveyed by the manual insertion sheet supply roller 13. After the skew-feed of the original is corrected by the stopped manual insertion regist rollers 11, when the tip end of the original reaches the first image tip position R1, the original is stopped. In this case, the manual insertion flapper 27 and the manual insertion shutter 28 are returned to the positions shown by the dot and chain lines in FIG. 4, thereby permitting the setting of the next original.

Figure 26A:
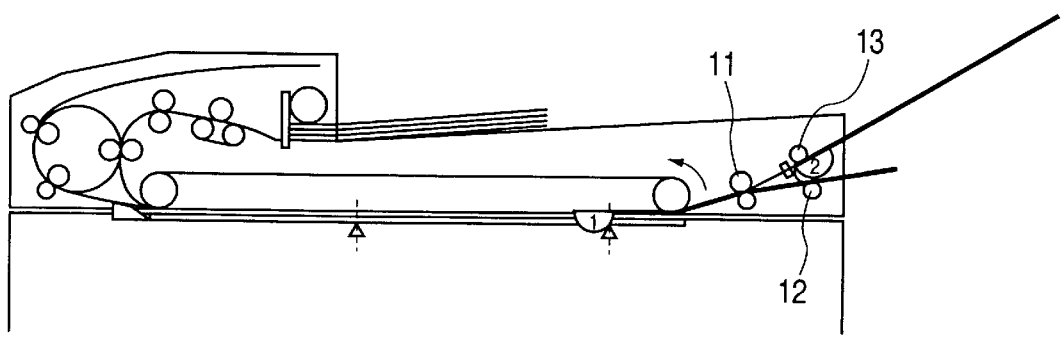
Figure 26B:
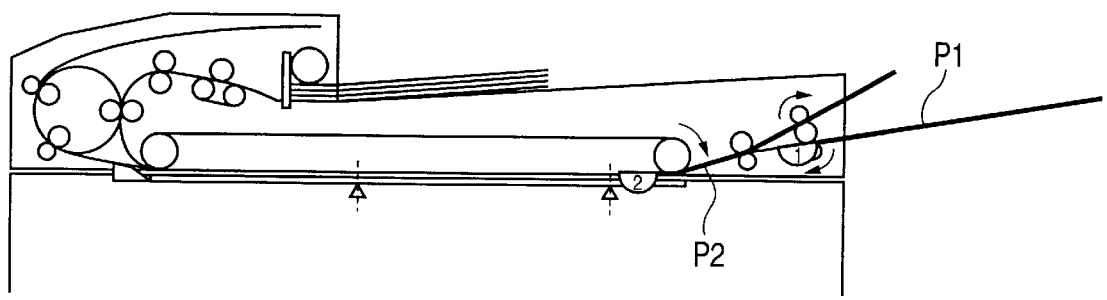

When the scanning of the scanner 204 of the copying machine is finished, by rotating the belt 7 in the reverse direction, the original P1 is discharged toward the sheet discharge rollers 12. By rotating the sheet discharge rollers 12, although the manual insertion sheet supply roller 13 is also rotated, since the tip end of the original P2 is regulated by the manual insertion shutter 28, the manual insertion sheet supply roller 13 is slipped not to advance the original (FIG. 26A).

When the trail end of the original P1 is detected by the manual insertion regist sensor 34, the manual insertion regist rollers 11 are stopped, and the manual insertion flapper 27 and the manual insertion shutter 28 are shifted to the positions shown by the solid lines in FIG. 4. Thereafter, the original P2 is conveyed by the roller 13 toward the manual insertion regist rollers 11 (FIG. 26B), and, after the skew-feed is corrected, the original P2 is rested on the platen 3, as is in the original P1.

Explanation of Block Diagram of Control Circuit

Figure 27B:
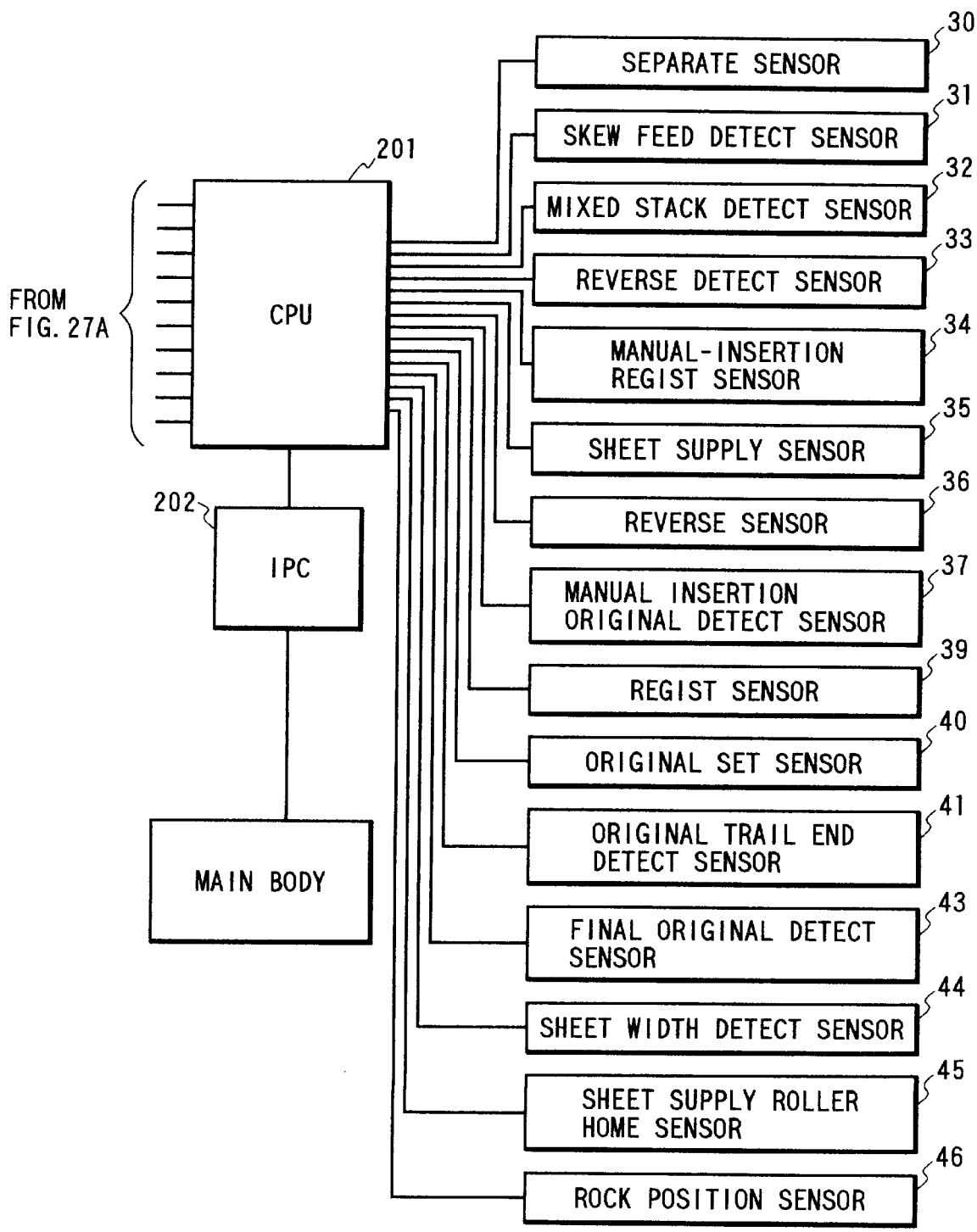
FIG. 27 is comprised of FIGS. 27A and 27B are block diagrams showing circuitry of a control device according to the present invention.

FIGS. 27A and 27B are block diagrams showing circuitry of a control apparatus. The control circuit is constituted mainly by a microprocessor (CPU) 201 having input/output ports connected to drive circuits having various loads and the sensors. Further, the control circuit includes a RAM backed-up by a battery (not shown), and a ROM storing control sequence software. A communication IC 202 serves to control data communication with respect to the copying machine.

In FIG. 27, the separation motor (DC brush motor) 100 is controlled by a driver 203 and a controller 203a, and reference clocks as a reference for the number of revolutions of the motor, and ON/OFF signals are inputted to the controller 203a from the CPU 201. The convey motor (stepping motor) 101 is driven by a stepping motor driver 204. Similarly, the belt motor (stepping motor) 102 is driven by a stepping motor driver 205 with constant current. A phase energizing signal and a motor current control signal are inputted from the CPU 201 to these drivers. The rock motor (stepping motor) 103 is driven by a driver 206 with constant voltage, and the sheet discharge motor (DC brush motor) 104 is controlled by a driver 207 and a FG servo controller 207a.

The motors 100 to 104 are provided with encoders 100a to 104a and detection means 100b to 104b which constitute means for detecting rotational speeds of the motors 100 to 104.

The shutter solenoid 105 is driven by a driver 208. Similarly, the separation clutch 106 is driven by a driver 209, the path switch solenoid 107 is driven by a driver 210, the reverse flapper solenoid 108 is driven by a driver 211, and the sheet discharge flapper solenoid 109 is driven by a driver 212.

The drivers 203 to 212 are controlled by signals from the input/output ports of the CPU 201.

Further, various sensors such as the separation sensor 30, skew-feed detection sensor 31, mixed stack detection sensor 32, reverse detection sensor 33, manual insertion regist sensor 34, sheet supply sensor 35, reverse sensor 36, manual insertion original detection sensor 37, regist sensor 39, original set sensor 40, original trail end detection sensor 41, last original detection sensor 43, sheet width detection sensor 44, sheet supply roller home sensor 45, rock position sensor 46 are connected to the input ports of the CPU 201 to monitor performances of the originals and variable loads in the apparatus.

Main Flow

Figure 28:
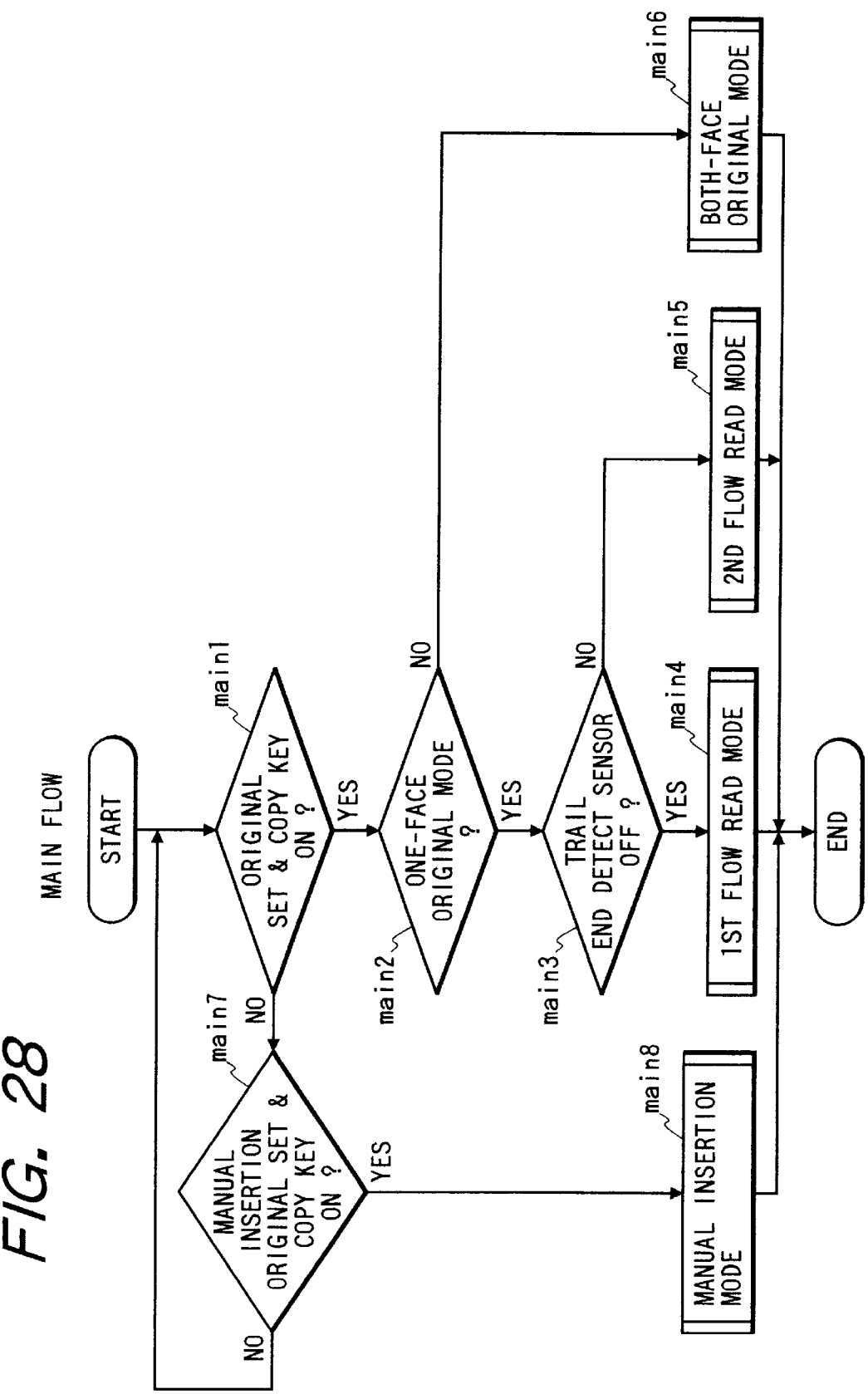
FIG. 28 is a main flow chart.

Next, the operation according to the illustrated embodiment will be explained with reference to a main flow chart shown in FIG. 28.

By detecting the fact that the originals are set on the original tray 4 by the original set detection sensor 40 and by depressing the copy key on the operation portion of the copying machine (not shown), the operation is started (main 1). Then, the copy mode sent from the copying machine is checked (main 2). If it is judged as the one-face original mode, the program goes to a step (main 3), where it is judged whether the original trail end detection sensor 41 is turned OFF or not. If Yes, the program goes to a step (main 4), where a series of copying treatments are performed in a second flow-reading mode (described later), and then the operation is finished. In the step (main 2), if No, the program goes to a step (main 6), where a series of copying treatments are performed in the both-face original mode, and then the operation is finished.

In the illustrated embodiment, while the selection of mode regarding the size of the original was controlled by ON/OFF of the original trail end detection sensor 41 only in the conveying direction, as mentioned above, the selection of mode regarding the size of the original may be controlled by a combination of the original trail end detection sensor 41 and the sheet width detection sensor (original width detection sensor) 44 disposed below the original tray 4.

Further, by detecting the fact that the original is set on the manual insertion original tray by the manual insertion original set detection sensor and by depressing the copy key (main 7), the program goes to a step (main 8), where a series of copying treatments are performed in a manual insertion mode (described later), and then the operation is finished.

First Flow-reading Mode

Figure 29:
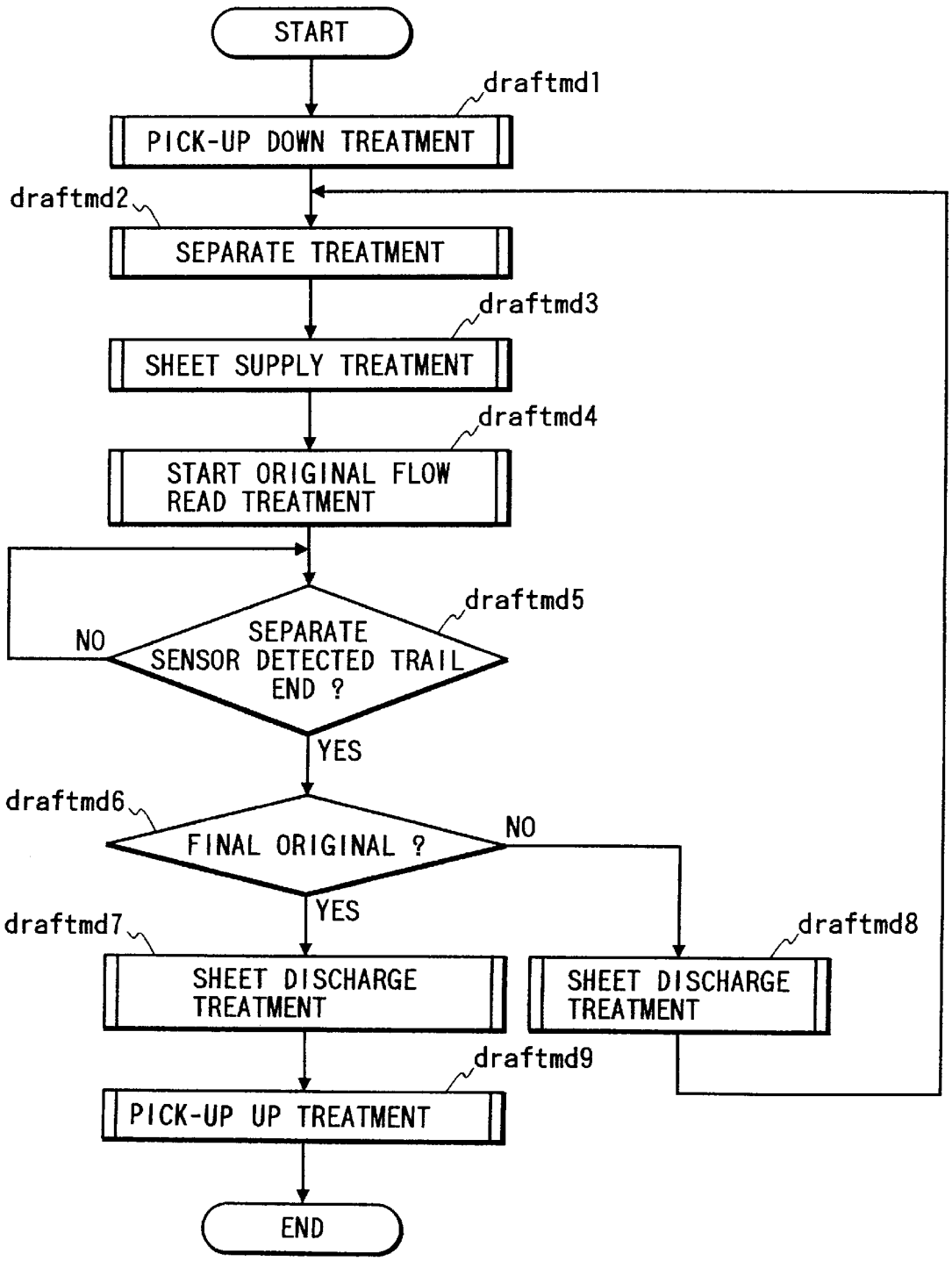
FIG. 29 is a flow chart of a first flow-reading mode.

Next, a first flow-reading mode will be explained with reference to FIG. 29.

A pick-up DOWN treatment (described later) is performed to shift the sheet supply roller 5 onto the sheet stack rested on the original tray 4 (draftmd 1), and, thereafter, a separation treatment (draftmd 2) and a sheet supply treatment (draftmd 3) which will be described later are performed to separate only the uppermost original from the original stack. Then, an original flow-reading treatment in which the image on the original is read while the optical system of the copying machine is fixed at the predetermined position R2 is started (draftmd 4), and, thereafter, it is judged whether the trail end of the original is detected by the separation sensor 30 (draftmd 5). If Yes, it is judged whether the original is the last (final) original or not by the original set detection sensor 40 (draftmd 6). If not the final original, a sheet discharge treatment (described later) is performed to discharge the original onto the sheet discharge tray 10 (draftmd 8), and then, the program is returned to the step (draftmd 2), thereby repeating the treatments. In the step (draftmd 6), if it is judged as the final original, the sheet discharge treatment is performed (draftmd 7), and then, a pick-up UP treatment (described later) is performed to return the sheet supply roller 5 to its upper limit position (draftmd 9). Then, the program is finished.

In this case, when it is assumed that the length of the original in the conveying direction is L' mm, as shown in FIG. 11, the scanner 204 of the copying machine 1 as shown in FIG. 1 is spaced apart from the second sheet supply roller 9 at a downstream side thereof by L' mm or more along the conveying direction in the convey paths (R2 in FIG. 11). The position control of the scanner 204 may be effected by using a stepping motor in a conventional manner or may be effected by using other mechanical stopper.

Second Flow-reading Mode

Figure 30:
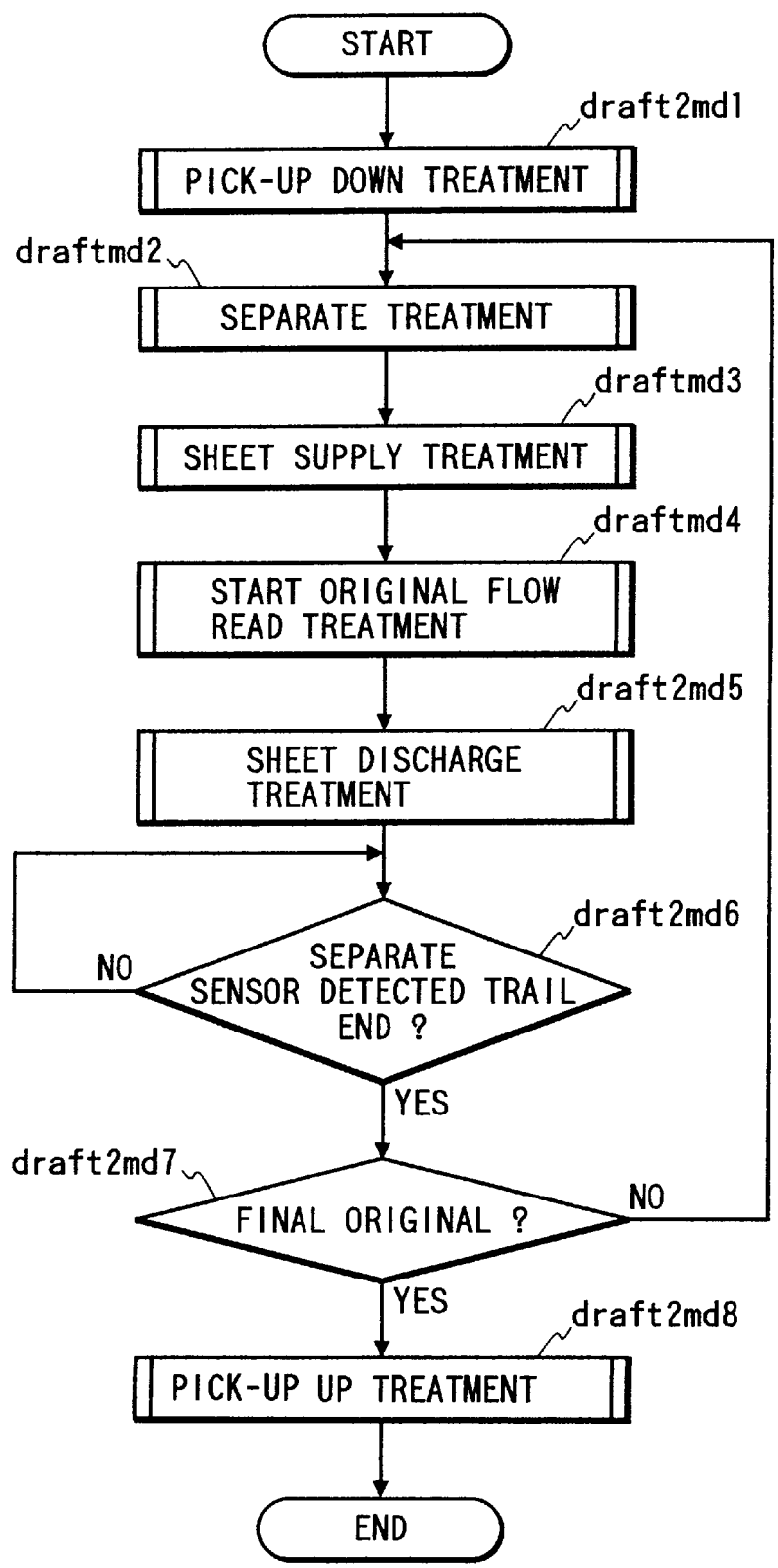
FIG. 30 is a flow chart of a second flow-reading mode.

Next, the second flow-reading mode will be explained with reference to FIG. 30.

A pick-up DOWN treatment (described later) is performed to shift the sheet supply roller 5 onto the sheet stack rested on the original tray 4 (draft2md 1), and, thereafter, a separation treatment (draft2md 2) and a sheet supply treatment (draft2md 3) which will be described later are performed to separate only the uppermost original from the original stack. Then, an original flow-reading treatment in which the image on the original is read while the optical system of the copying machine is fixed at the predetermined position R3 is started (draft2md 4). At the same time, since the fixed position of the optical system is in the vicinity of the sheet discharge portion, a sheet discharge treatment (described later) is performed to discharge the original onto the sheet discharge tray 10 (draft2md 5). Thereafter, it is judged whether the trail end of the original is detected by the separation sensor 30 (draft2md 6). If Yes, it is judged whether the original is the final original or not by the original set detection sensor 40 (draft2md 7). If not the final original, the program is returned to the step (draft2md 2), thereby repeating the treatment.

In the step (draft2md 7), if it is judged as the final original, a pick-up UP treatment (described later) is performed to return the sheet supply roller to its upper limit position (draft2md 8). Then, the program is finished. In this case, the scanner 204 of the copying machine 1 as shown in FIG. 1 is positioned at the position R3 shown in FIG. 11.

Both-face Original Mode

Figure 31:
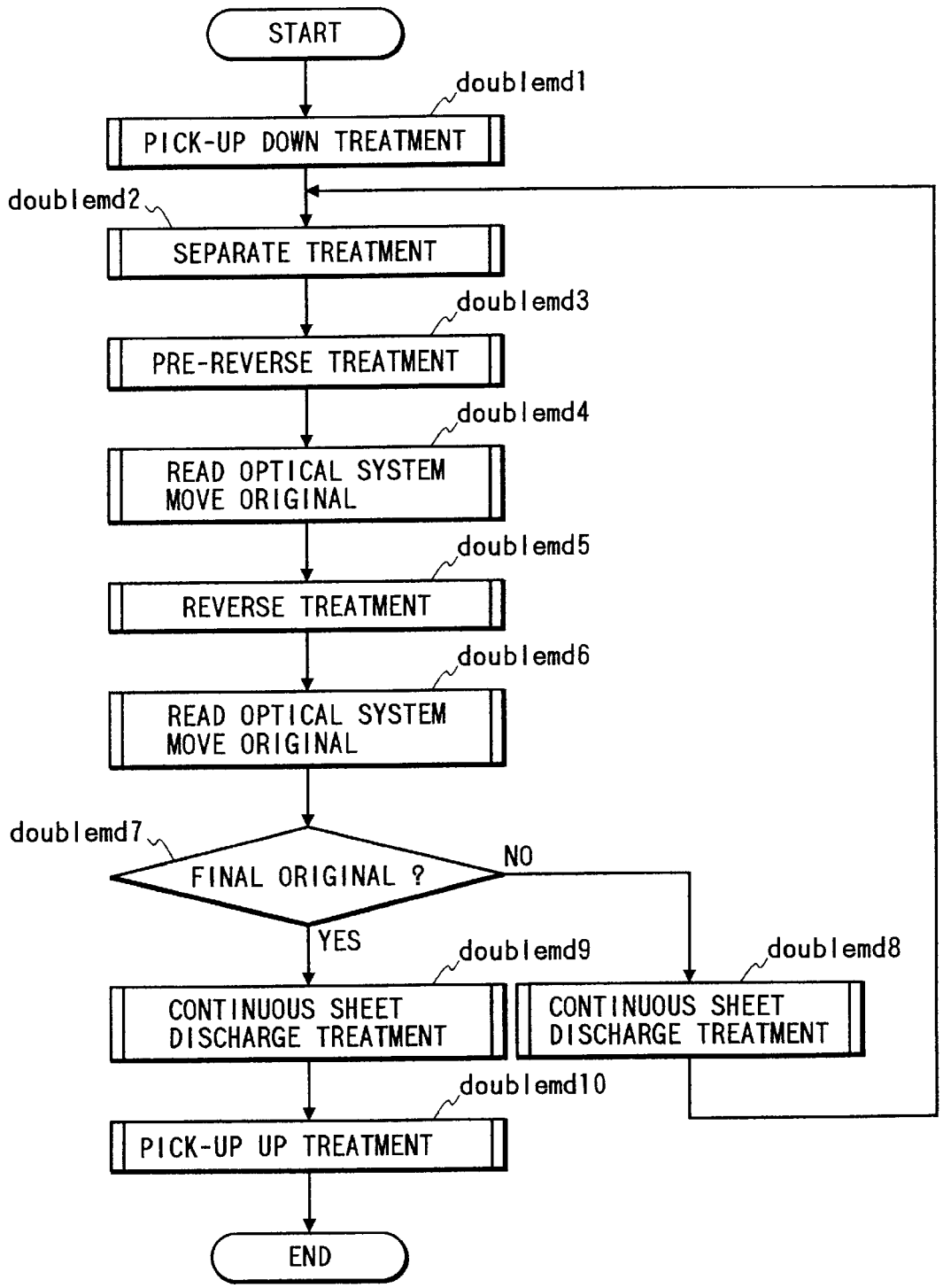
FIG. 31 is a flow chart of a both-face original mode.

Next, the both-face original mode will be explained with reference to FIG. 31.

A pick-up DOWN treatment (described later) is performed to shift the sheet supply roller 5 onto the sheet stack rested on the original tray 4 (doublemd 1), and, thereafter, a separation treatment (described later) is performed to separate only the uppermost original from the original stack (doublemd 2). Then, a pre-reverse treatment (described later) is performed for reversing the separated original to contact the second surface of the original with the platen and to rest the original on the platen at the left end portion thereof (doublemd 3). Thereafter, an optical system moving original flow-reading treatment in which the image on the original is read while moving the optical system of the copying machine is effected (doublemd 4), and then, a reverse treatment is performed to reverse the original again (doublemd 5), and then, the optical system moving original flow-reading treatment is performed again to read the first surface of the original (doublemd 6). While the reading is being effected, it is judged whether the original is the final original or not by the original set detection sensor 40 (doublemd 7). If not the final original, a sheet discharge treatment (described later) is performed to discharge the original onto the sheet discharge tray 10 (doublemd 8), and then, the program is returned to the step (doublemd 2), thereby repeating the treatments. In the step (doublemd 7), if it is judged as the final original, the sheet discharge treatment is performed (doublemd 9), and then, a pickup UP treatment (described later) is performed to return the sheet supply roller to its upper limit position (doublemd 10). Then, the program is finished.

Manual Insertion Mode

Figure 42:
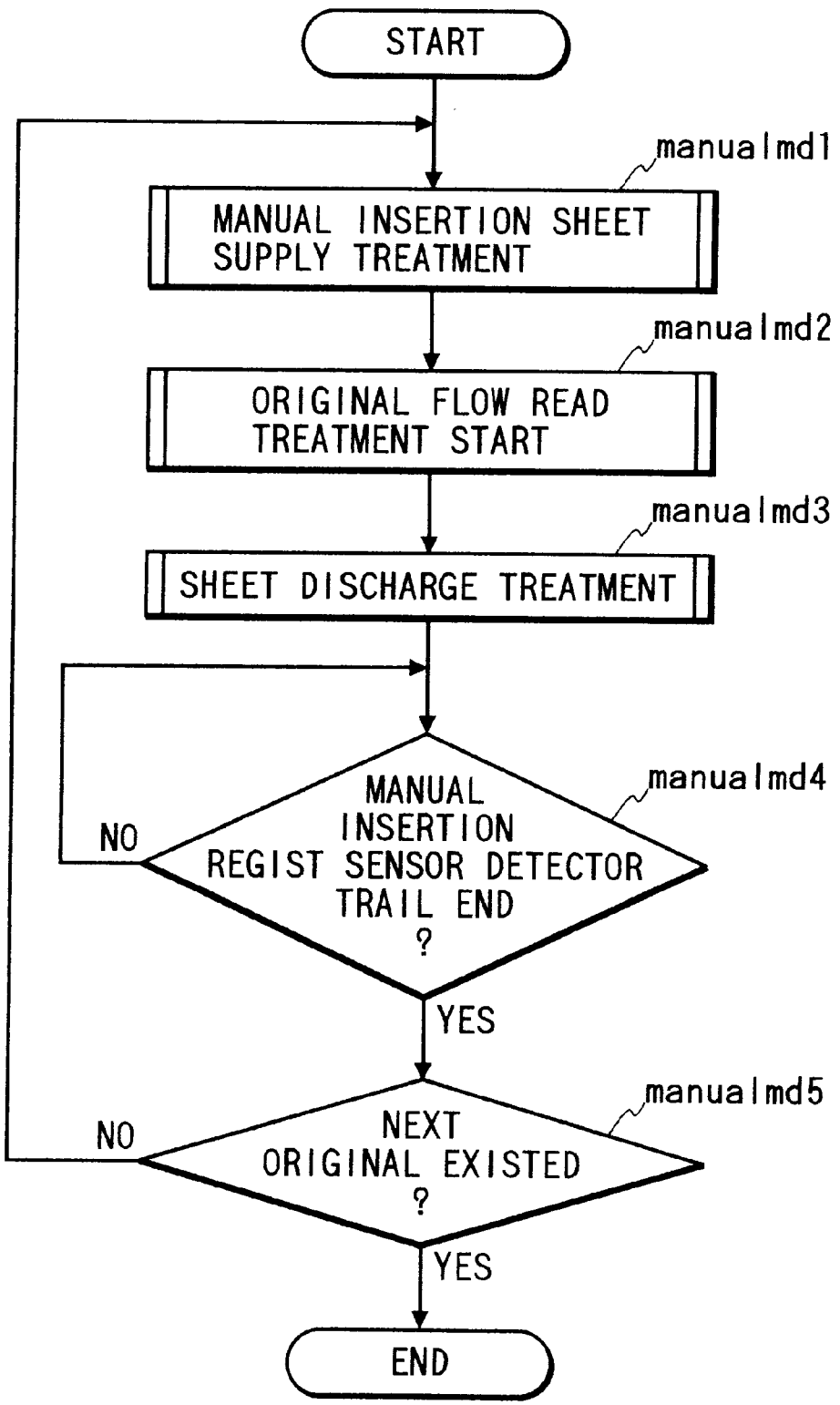
FIG. 42 is a flow chart of a manual insertion original mode.
Figure 43A:
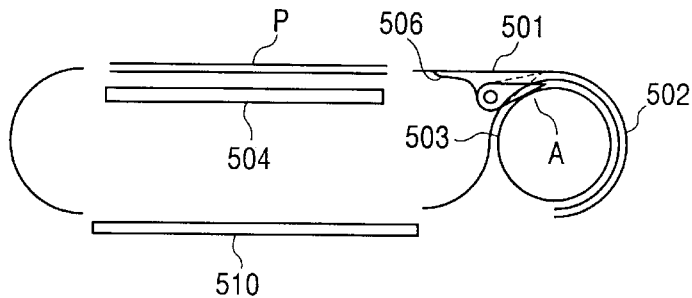
FIGS. 43A, 43B, 43C and 43D are explanatory views showing a conventional technique.
Figure 43B:
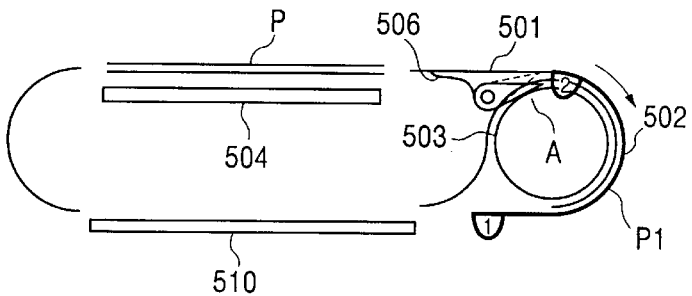
Figure 43C:
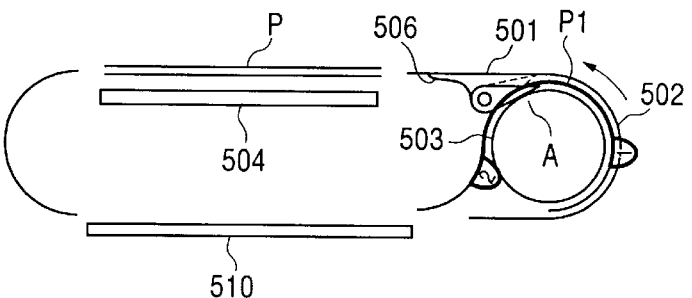
Figure 43D:
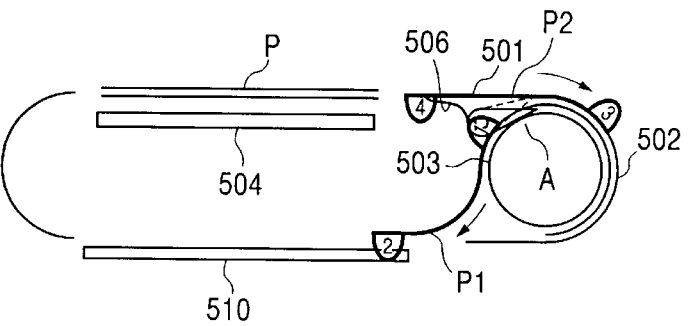

Next, the manual insertion mode will be explained with reference to FIG. 42.

A manual insertion sheet supply treatment is performed to convey the original set on the manual insertion sheet supply portion onto the platen 3 (manualmd 1). Thereafter, an optical system moving original flow-reading treatment in which the image on the original is read while moving the optical system of the copying machine is effected (manualmd 2), and then, a sheet discharge treatment is performed to discharge the original onto the sheet discharge tray 10 (manualmd 3). Thereafter, it is judged whether the trail end of the original is detected by the manual insertion regist sensor (manualmd 4). If Yes, it is judged whether a next original exists by detecting presence/absence of the next original by the manual insertion original set sensor (manualmd 5). If there is the next original, the program is returned to the step (manualmd 1), thereby repeating the treatments. On the other hand, if there is no next original, the manual insertion sheet discharge treatment is effected, and then, the program is ended.

Pick-up DOWN Treatment

Figure 32:
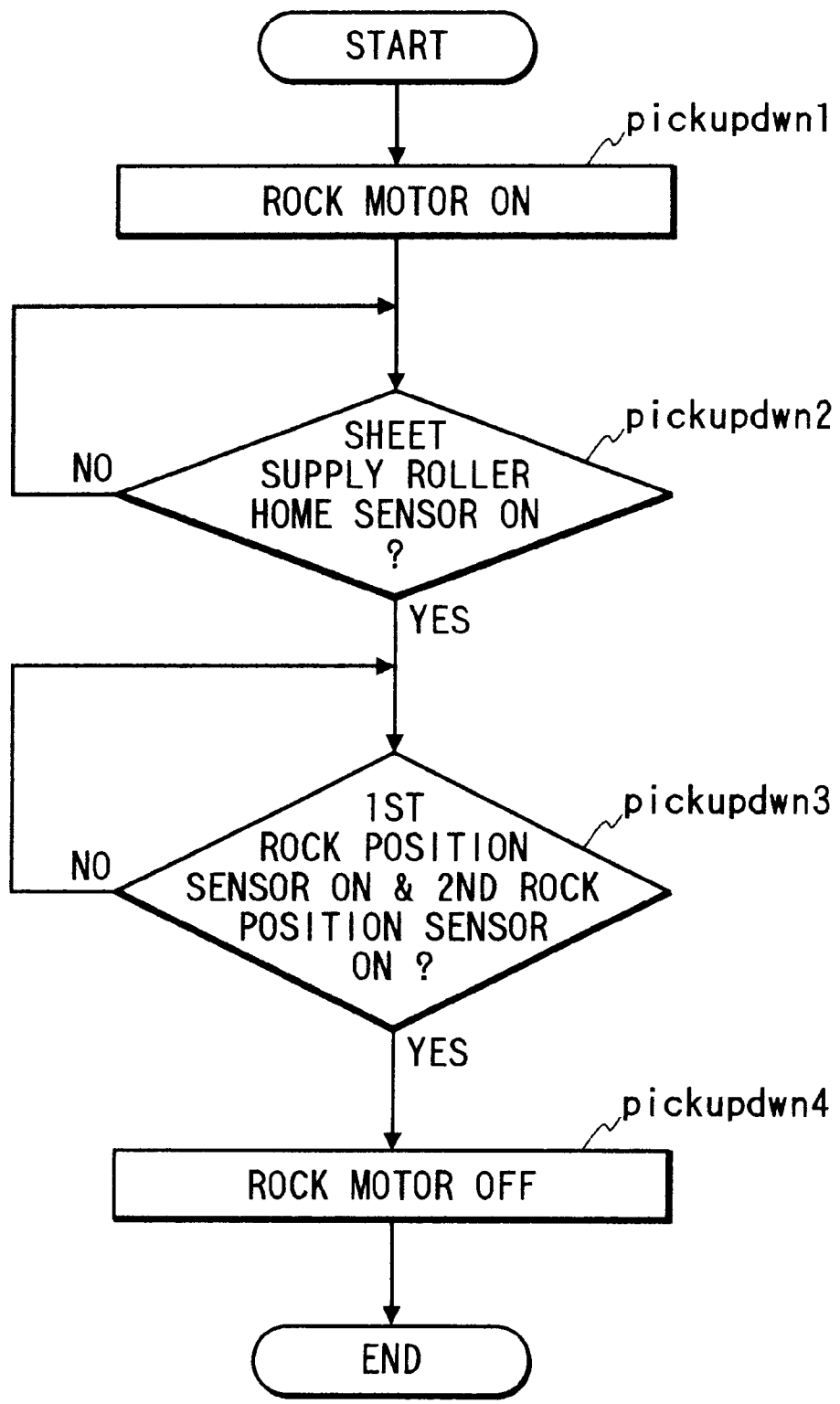
FIG. 32 is a flow chart of sheet supply roller descend control.

Next, the pick-up DOWN treatment will be explained with reference to FIG. 32.

The rock motor 103 is driven to lower the sheet supply roller 5 from the position shown in FIG. 5 (where the sheet supply roller home sensor 45 is ON) onto the original stack rested on the original tray (pickupdown 1), thereby lowering the lift/lower arm 51 and the rock arms 53, 57. After the fact that the sheet supply roller 5 has been lowered is ascertained by OFF of the sheet supply roller home sensor 45 (pickupdown 2), when the fact that the sheet supply roller 5 is rested on the original stack is detected by ON of the first and second rock position sensors 46, 47 (pickupdown 3), the rock motor 103 is stopped (pickupdown 4).

Pick-up UP Treatment

Figure 33:
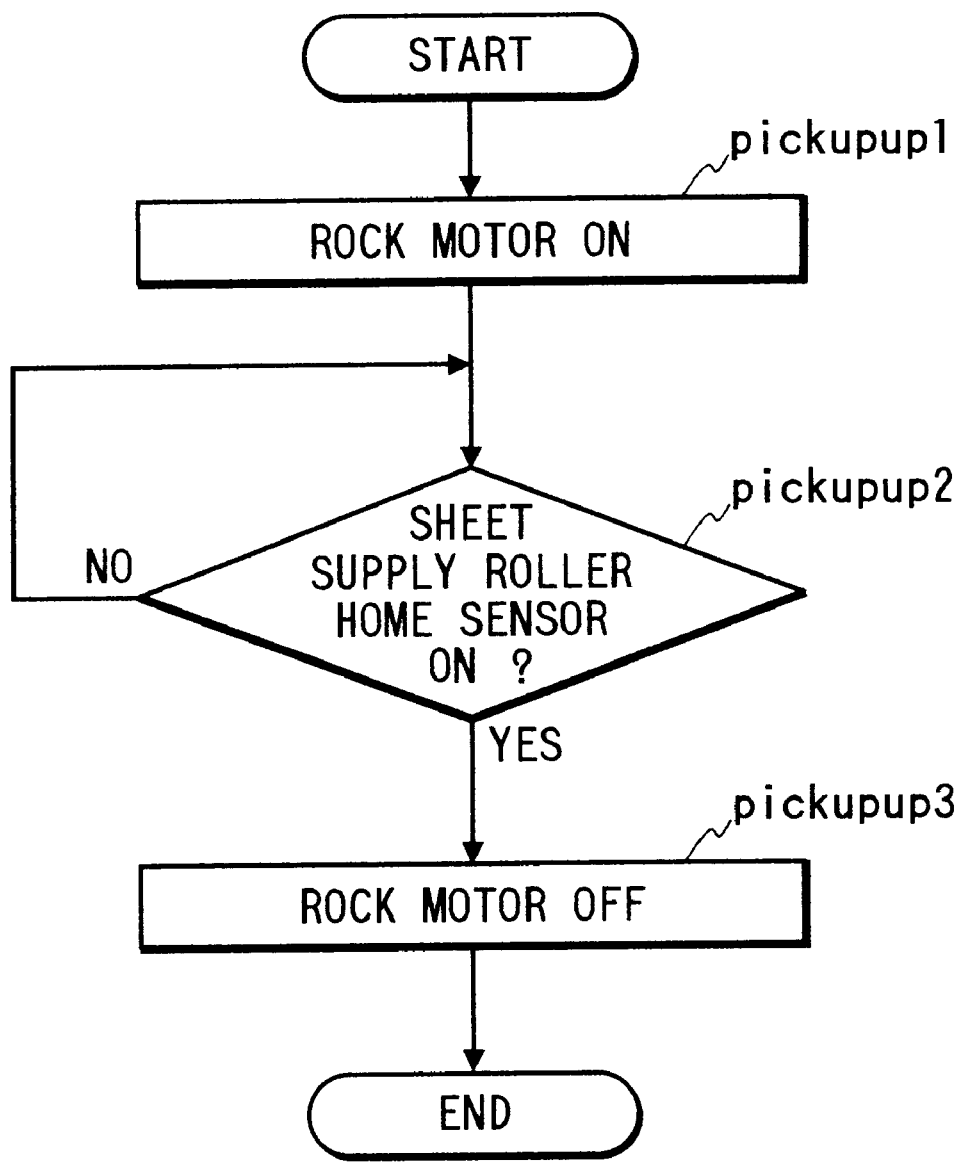
FIG. 33 is a flow chart of sheet supply roller ascend control.

Next, the pick-up UP treatment will be explained with reference to FIG. 33.

The rock motor 103 is driven to lift the sheet supply roller 5 to the position shown in FIG. 5 (pickupup 1). When the fact that the sheet supply roller reaches its upper limit position is detected by ON of the sheet supply roller home sensor 45 (pickupup 2), the rock motor 103 is stopped (pickupup 3). In this case, the rotational direction of the rock motor 103 is opposite to that of the rock motor in the pickup DOWN treatment.

Separation Treatment

Figure 34:
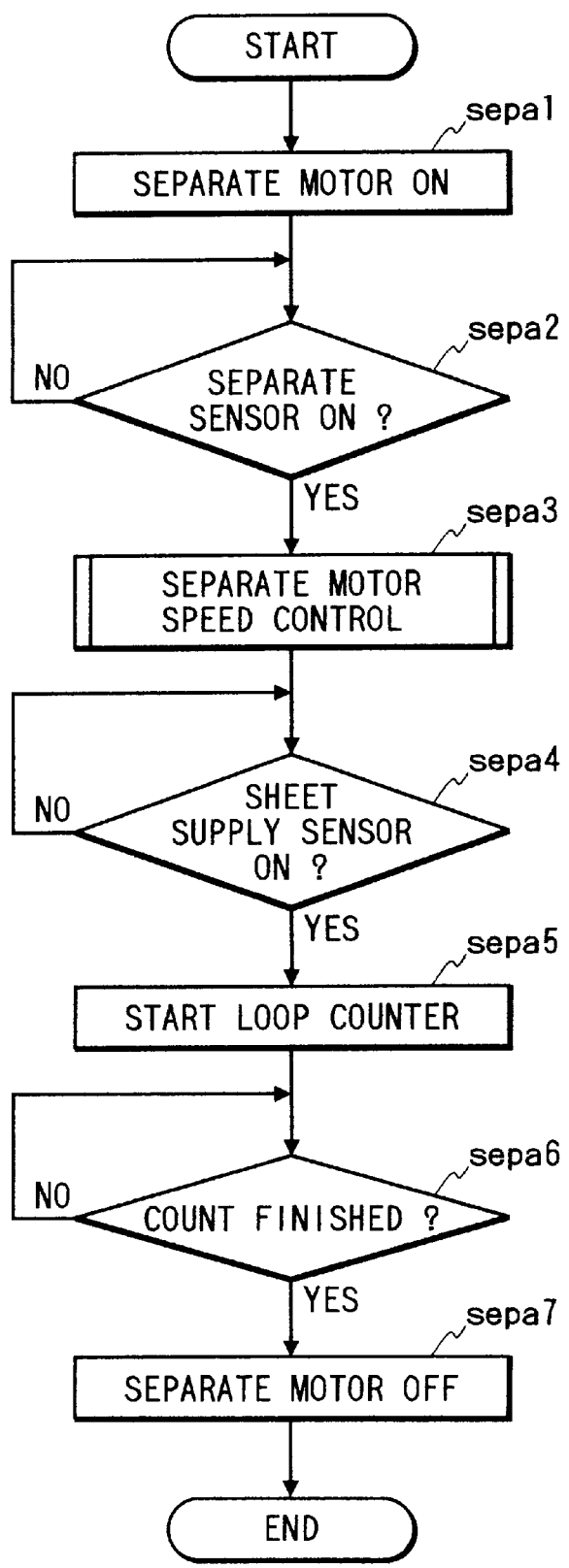
FIG. 34 is a flow chart of separation control.

Next, the separation treatment will be explained with reference to FIG. 34.

The separation motor 100 is turned ON (sepa 1) to rotate the sheet supply roller 5 (rested on the original stack), separation belt 6, separation/convey roller 8 and first sheet supply roller 16, thereby separating only the uppermost original from the original stack and conveying the separated original through the convey path (a). Thereafter, when the tip end of the original is detected by ON of the separation sensor 30 (sepa 2), the speed of the separation motor 100 is controlled (sepa 3) so as to finish the separation treatment within the predetermined time range, on the basis of the remaining convey distance for forming a predetermined loop in the original after the abutment of the tip end of the original against the second sheet supply roller 9 and the lapse time up to ON of the separation sensor 30. Thereafter, when the tip end of the original is detected by ON of the sheet supply sensor 35 (sepa 4), a separation loop counter for counting clock signals from a separation clock is started (sepa 5). When the count is finished (sepa 6), the separation motor 100 is turned OFF (sepa 7), so that the original is stopped in the condition that the predetermined loop is formed in the original after the abutment of the tip end of the original against the second sheet supply roller 9. In this way, any skew-feed of the original can be corrected.

Sheet Supply Treatment

Figures 35, 35A:
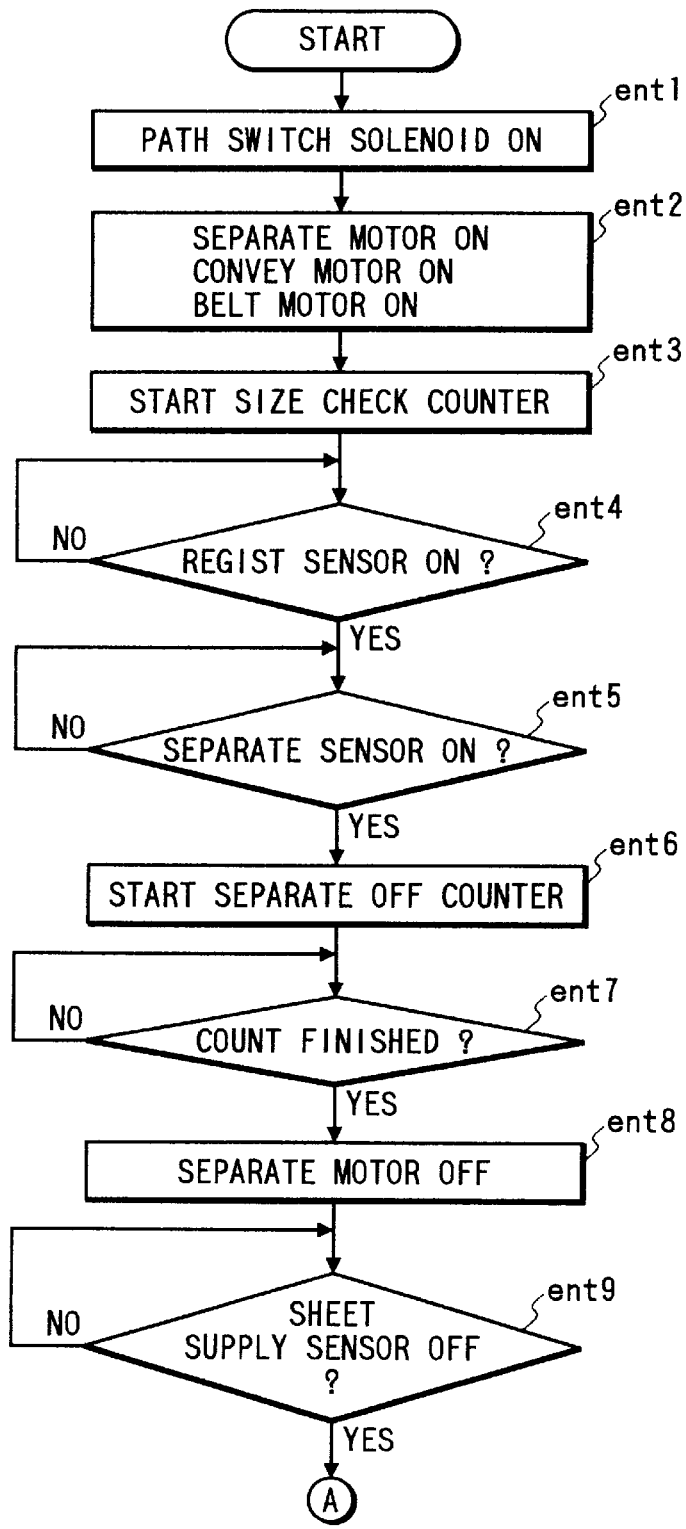
FIG. 35 is comprised of FIGS. 35A and 35B showing flow charts of sheet supply control.
Figure 35B:
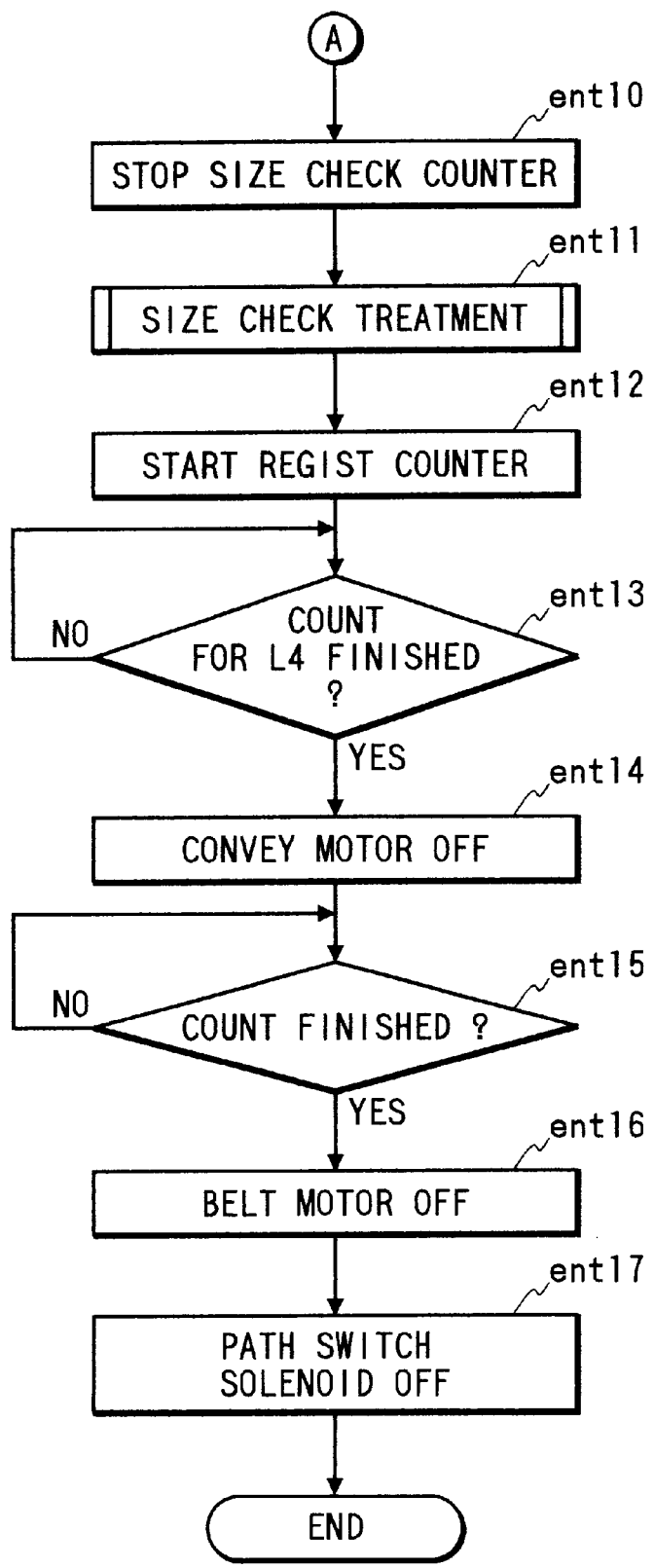

Next, the sheet supply treatment will be explained with reference to FIGS. 35A and 35B.

When the path switch solenoid 107 is in the OFF condition, since the reverse sheet supply flapper 22 is biased to permit the conveyance of the original into the sheet path (h) as shown by the solid line in FIG. 4, the path switch solenoid 107 is turned ON to switch the reverse sheet supply flapper 22 to the position shown by the dot and chain line in FIG. 4 (ent 1). Further, the separation motor 100, the convey motor 101 and the belt motor 102 are turned ON (ent 2) to drive the first sheet supply roller 16, the second sheet supply roller 9 and the wide belt 7 so as to convey the original abutting against the second sheet supply roller 9 and having the predetermined loop formed therein into the sheet paths (c), (d). At the same time, a size check counter for counting clock signals from a reverse clock is started (ent 3). Then, the fact that the original has been conveyed to the sheet path (c) is ascertained by detecting the tip end of the original by the regist sensor 39 (ent 4).

Figure 40:
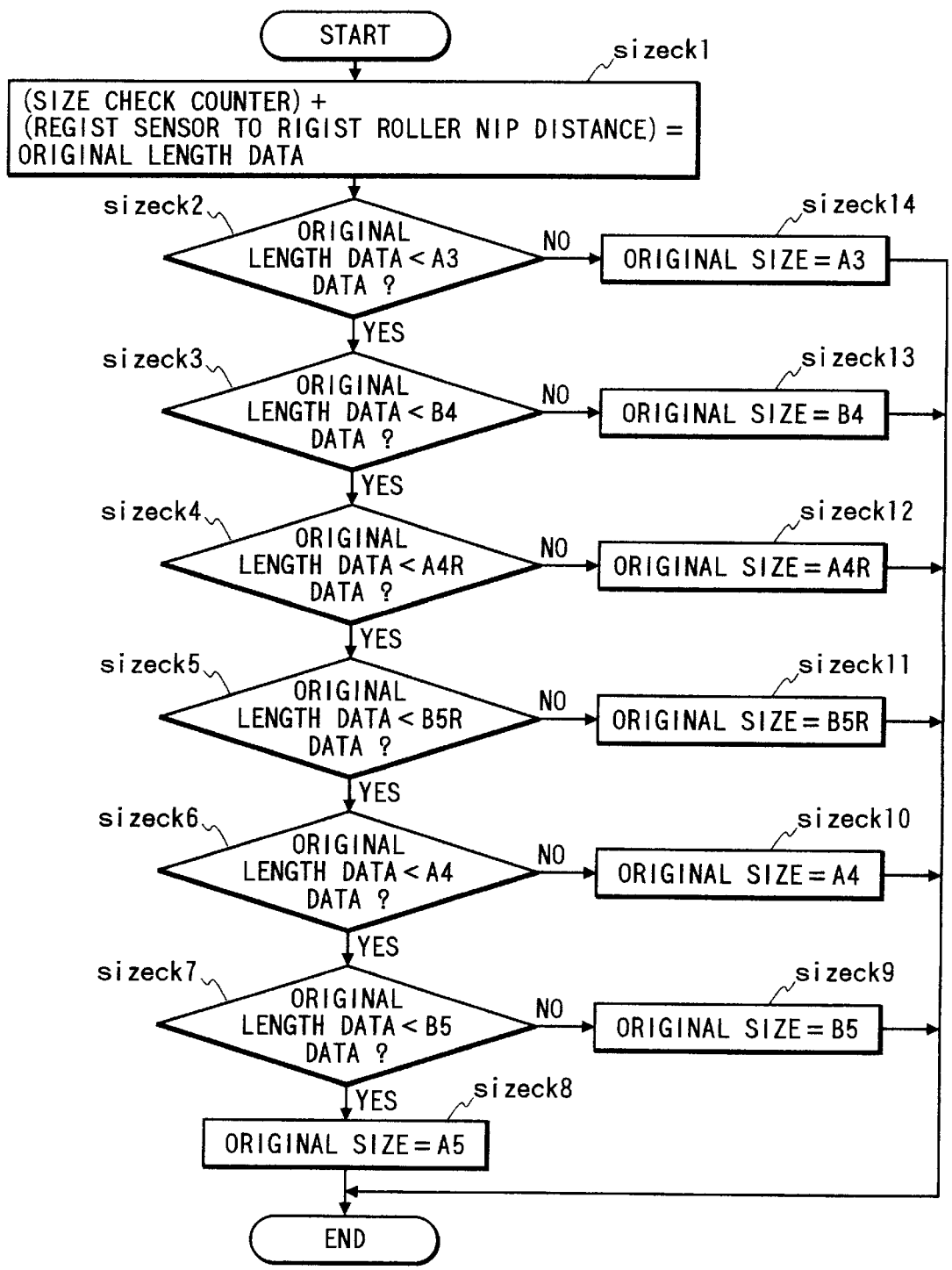
FIG. 40 is a flow chart of size check treatment.

Thereafter, when the fact that the trail end of the original leaves the separation sensor 30 is detected (ent 5), a separation off counter for counting clock signals from a separation clock is started (ent 6). When the count of clocks corresponding to the distance from the first sheet supply roller 16 to the separation sensor 30 is completed (ent 7), since the trail end of the original leaves the first sheet supply roller 16, the separation motor 100 is turned OFF to stop the first sheet supply roller 16 (ent 8). Thereafter, when the fact that the trail end of the original leaves the sheet supply sensor 35 is detected (ent 9), the size check counter is stopped (ent 10), and a size check treatment shown in FIG. 40 is performed on the basis of such data (ent 11). At the same time, a regist counter counted by a belt energizing clock is started (ent 12) to stop the original at the predetermined position on the platen 3. Thereafter, at the time when the clocks corresponding to the distance L4 from the sheet supply sensor 35 to the second sheet supply roller 9 were counted (ent 13), the convey motor 101 is turned OFF (ent 14), and, at the time when the count of the regist counter is completed (ent 15), the belt motor 102 is turned OFF (ent 16). Then, the path switch solenoid 107 is turned OFF (ent 17).

Pre-reverse Treatment

Figure 36B:
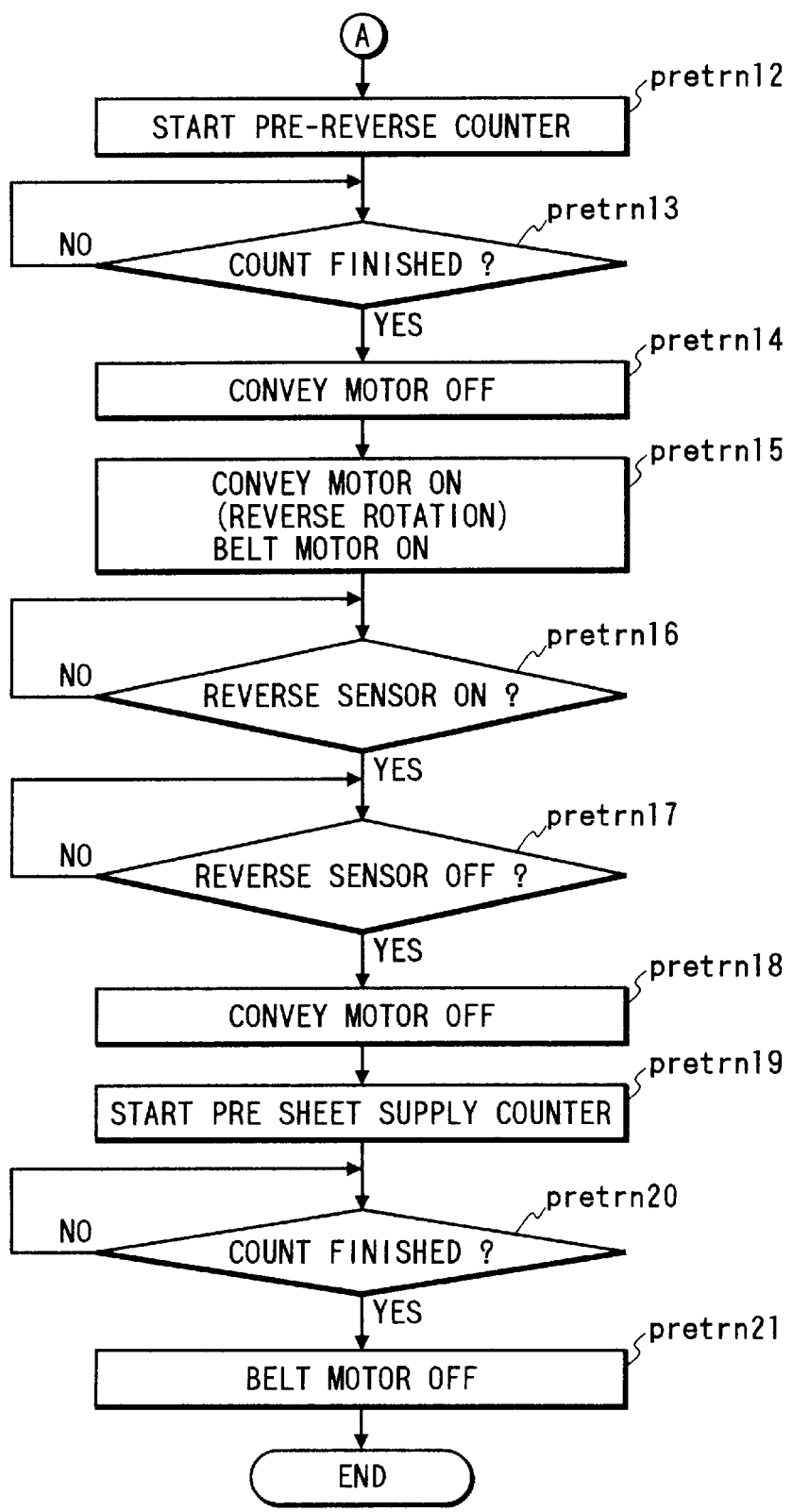
FIG. 36 is comprised of FIGS. 36A and 36B showing flow charts of original pre-reverse treatment.

Next, the pre-reverse treatment will be explained with reference to FIGS. 36A and 36B.

When the path switch solenoid 107 is in the OFF condition, since the reverse sheet supply flapper 22 is biased to permit the conveyance of the original into the sheet path (h) as shown by the solid line in FIG. 4, the separation motor 100 and the convey motor 101 are turned ON (pretrn 1) to drive the first sheet supply roller 16, second sheet supply roller 9, first reverse rotation roller 17 and second reverse rotation roller 18 so as to convey the original abutting against the second sheet supply roller 9 and nipped by the first sheet supply roller 16 into the sheet path (h). At the same time, a size check counter for counting clock signals from a reverse clock is started (pretrn 2). Then, the fact that the original has been conveyed to the sheet path (h) is ascertained by detecting the tip end of the original by the regist sensor 39 (pretrn 3).

Thereafter, when the fact that the trail end of the original leaves the separation sensor 30 is detected (pretrn 4), a separation off counter for counting clock signals from a separation clock is started (pretrn 5). When the count of clocks corresponding to the distance from the first sheet supply roller 16 to the separation sensor 30 is completed (pretrn 6), since the trail end of the original leaves the first sheet supply roller 16, the separation motor 100 is turned OFF to stop the first sheet supply roller 16 (pretrn 7). Thereafter, when the fact that the trail end of the original leaves the sheet supply sensor 35 is detected (pretrn 8), the size check counter is stopped (pretrn 9), and a size check treatment shown in FIG. 40 is performed on the basis of such data (pretrn 10). When the fact that the trail end of the original leaves the regist sensor 39 is detected (pretrn 11), a pre-reverse counter counted by a reverse energizing clock is started (pretrn 12) to stop the trail end of the original at a predetermined position beyond the sheet path (h). In this case, the reverse flapper 23 is biased to permit the conveyance of the original into the sheet path (i) as shown by the solid line in FIG. 4.

At the time when the count of the pre-reverse counter is completed (pretrn 13), the convey motor 101 is turned OFF (pretrn 14). When a predetermined time period is elapsed after the motor is turned OFF, the convey motor 101 is rotated in the reverse direction and the belt motor 102 is turned ON (pretrn 15) to convey the original to the sheet path (e). By detecting the fact that the tip end of the original leaves the reverse sensor 36 (pretrn 16), the fact that the original has been conveyed to the sheet path (e) is ascertained. When the fact that the trail end of the original leaves the reverse sensor 36 is detected (pretrn 17), the convey motor 101 is turned OFF (pretrn 18), and, at the same time, a pre-sheet supply counter counted by a belt energizing clock is started (pretrn 19) to stop the original at the predetermined position on the platen 3. At the time when the count of the pre-sheet supply counter is completed (pretrn 20), the belt motor 102 is turned OFF (pretrn 21).

Reverse Treatment

Next, the reverse treatment will be explained with reference to FIG. 37.

When the reverse flapper solenoid 108 is in the OFF condition, since the reverse flapper 23 is biased to permit the conveyance of the original into the sheet path (i) as shown by the solid line in FIG. 4, the reverse flapper solenoid 108 is turned ON to switch the reverse flapper 23 to the position shown by the dot and chain line in FIG. 4. Further, the path switch flapper solenoid 107 is turned ON (trn 1) to switch the reverse sheet supply flapper 23 and the sheet discharge flapper 25 to the positions shown by the dot and chain lines in FIG. 4. The belt motor 102 and the convey motor 101 are turned ON (trn 2) to drive the wide belt 7, second sheet supply roller 9, first reverse rotation roller 17 and second reverse rotation roller 18 so as to convey the original on the platen 3 to the sheet path (e).

When the fact that the tip end of the original leaves the reverse sensor 36 is detected (trn 3), a reverse counter counted by a belt energizing clock is started (trn 4) to stop and reversely rotate the belt motor 102 at the time when the tip end of the original reaches a predetermined position in the sheet paths (f), (g). At the time when the count of the reverse supply counter is completed (trn 5), the belt motor 102 is turned OFF (trn 6). When a predetermined time period is elapsed after the motor is turned OFF, the belt motor 102 is rotated in the reverse direction (trn 7). Meanwhile, since the convey motor 101 is energized to drive the first and second reverse rotation rollers 17, 18 and the second sheet supply roller 9, the original is being conveyed through the sheet paths (f), (g).

By detecting the fact that the tip end of the original leaves the sheet supply sensor 35 (trn 8), the fact that the original is being conveyed through the sheet path (g) is ascertained. At the time when the trail end of the original leaves the regist sensor 39 (trn 9), the convey motor 101 is turned OFF (trn 10). At the same time, a reverse sheet supply counter counted by a belt energizing clock is started (trn 11) to stop the original at the predetermined position on the platen 3. At the time when the count of the reverse sheet supply counter is completed (trn 12), the belt motor 102 is turned OFF (trn 13). The reverse flapper solenoid 108 is turned OFF to return the reverse flapper 23 to the position shown by the solid line in FIG. 4, and the path switch solenoid 107 is turned OFF to return the reverse sheet supply flapper 22 and the sheet discharge flapper 24 to the positions shown by the solid lines in FIG. 4 (trn 14).

In the step (trn 7), although the original is pulled in opposite directions by the first reverse rotation roller 17 and the wide belt 7, since the force of the nip of first reverse rotation roller 17 is stronger than the wide belt, the original is conveyed by the first reverse rotation roller. However, in case of an original having long dimension in the conveying direction, since the original is subjected to nip forces between urging rollers of the wide belt 7 and the platen, the original cannot follow the first reverse rotation roller 17. Thus, the timing for reversely rotating the belt motor 102 after its stoppage, i.e., the value of the reverse counter is controlled in dependence upon the length of the original in the conveying direction.

Sheet Discharge Treatment

Figure 38:
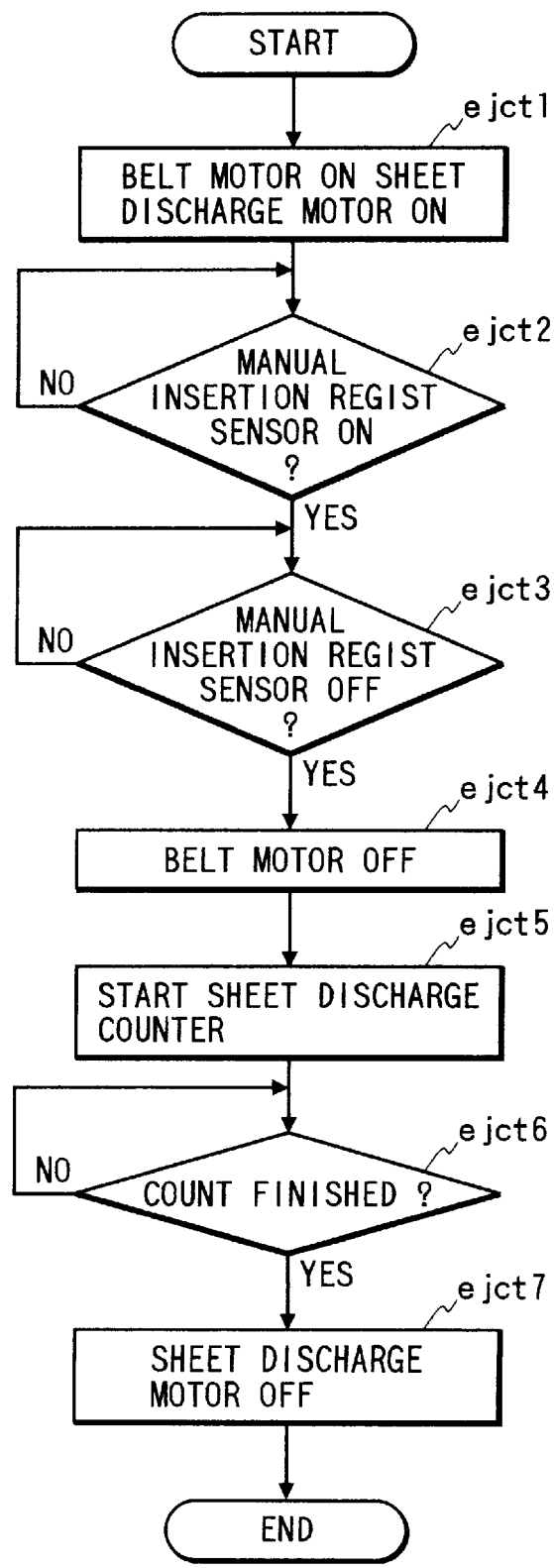
FIG. 38 is a flow chart of sheet discharge treatment.

Next, the sheet discharge treatment will be explained with reference to FIG. 38.

When the sheet discharge flapper solenoid 109 is in the OFF condition, since the sheet discharge flapper 26 is biased to position the tip end of the flapper below the platen as shown by the solid line in FIG. 4, the belt motor 102 and the sheet discharge motor 104 are turned ON (ejct 1) to drive the wide belt 7, manual insertion sheet supply roller 13 and sheet discharge rollers 12 to permit the conveyance of the original on the platen into the sheet paths (d), (j). By detecting the fact that the tip end of the original leaves the manual insertion regist sensor 37 (ejct 2), the fact that the original is being conveyed through the sheet path (j). At the time when the trail end of the original leaves the manual insertion regist sensor 37 (ejct 3), the belt motor 102 is turned OFF (ejct 4). At the same time, a sheet discharge counter for counting clock signals from a sheet discharge clock is started (ejct 5). When the set count of the sheet discharge counter is completed (ejct 6), the sheet discharge motor 104 is turned OFF (ejct 7). At this point, the original passed through the sheet path (j) and the sheet discharge rollers 12 has been discharged on the sheet discharge tray 10.

Manual Insertion Sheet Supply Treatment

Next, the manual insertion sheet supply treatment will be explained with reference to FIG. 41.

When the sheet discharge flapper solenoid 109 is in the OFF condition, the sheet discharge flapper 26 and the manual insertion shutter 28 are positioned at the positions shown by the solid lines in FIG. 4 so that the tip end of the sheet discharge flapper is disposed below the platen and the tip end of the original set on the manual insertion sheet supply portion abuts against the manual insertion shutter 28. Therefore, the sheet discharge flapper solenoid 109 is turned ON (ment 1) to switch the sheet discharge flapper 26 and the manual insertion shutter 28 to the positions shown by the dot and chain lines in FIG. 4. Then, the sheet discharge motor 104 is turned ON (ment 2) to rotate the manual insertion sheet supply roller 13 so as to convey the original through the sheet path (k).

Thereafter, when the tip end of the original is detected by ON of the manual insertion regist sensor 34 (ment 3), a manual insertion loop counter for counting clock signals from a sheet discharge clock is started (ment 4). When the set count of the manual insertion loop counter is completed (ment 5), the sheet discharge motor 104 is turned OFF (ment 6). In this condition, the tip end of the original abuts against the nip between the manual insertion regist rollers 11 and a predetermined loop is formed in the original. In this way, any skew-feed of the original is corrected.

Then, after the motor is turned OFF by a predetermined time period, the sheet discharge motor 104 and the belt motor 102 are turned ON (ment 7) to drive the manual insertion sheet supply roller 13, manual insertion regist rollers 11 and wide belt 7 so as to convey the original into the sheet paths (k), (d). At the same time, a size check counter for counting clock signals from a belt clock is started (ment 8). Further, a belt regist counter counted by a belt energizing clock is started (ment 9) to stop the original at the predetermined position on the platen 3.

Figure 41:
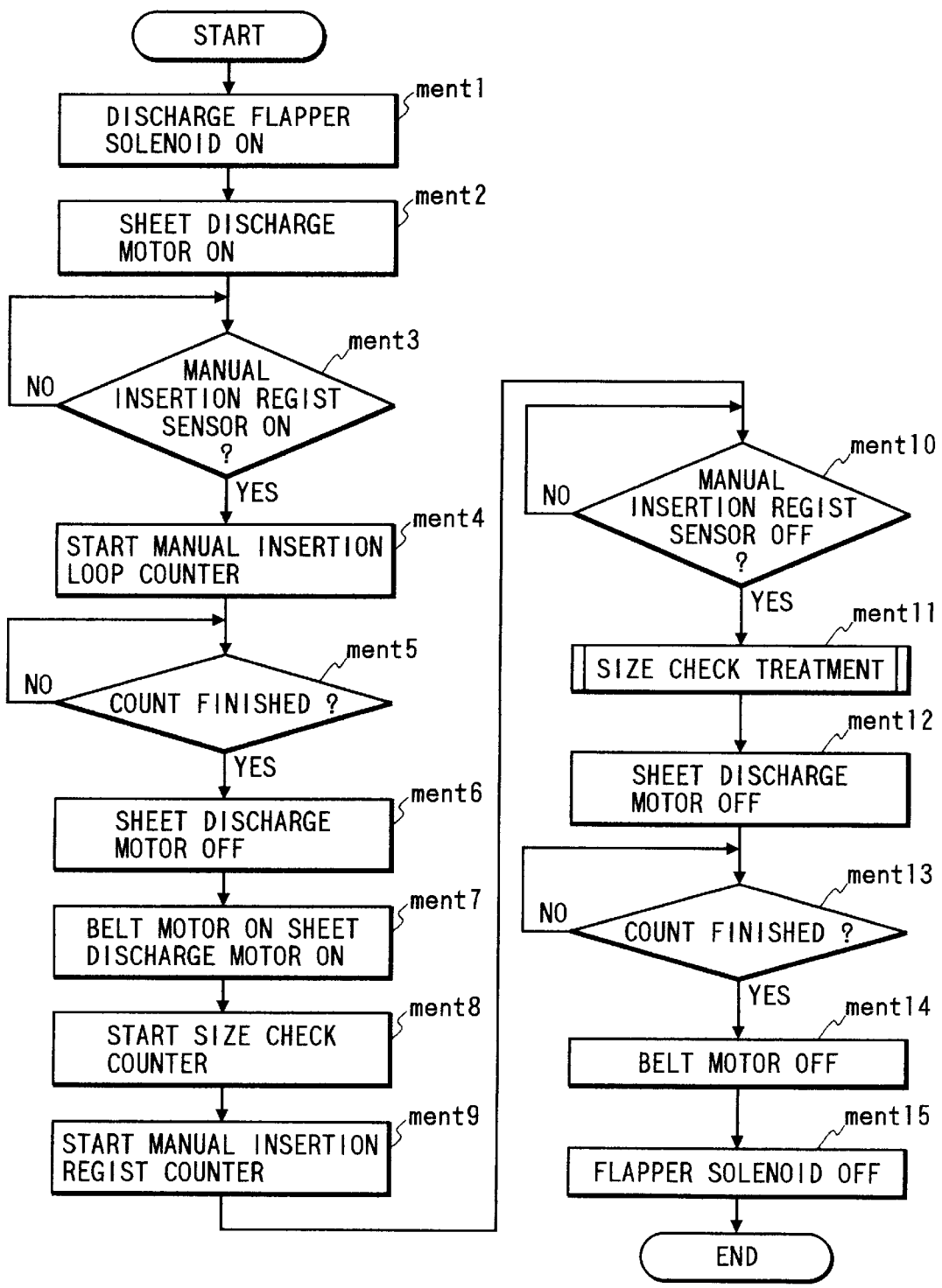
FIG. 41 is a flow chart of manual insertion treatment.

When the fact that the trail end of the original leaves the manual insertion regist sensor 34 by OFF of the manual insertion regist sensor 34 (ment 10), the size check counter is stopped, and a size check treatment shown in FIG. 41 is performed on the basis of such data (ment 11). At the same time, since the trail end of the original leaves the manual insertion sheet supply roller 13, the sheet discharge motor 104 is turned OFF (ment 12). Thereafter, at the time when the count of the manual insertion regist counter is completed (ment 13), the belt motor 102 is turned OFF (ment 14). Then, the sheet discharge flapper solenoid 109 is turned OFF.

Original Flow-reading Treatment

Figure 39:
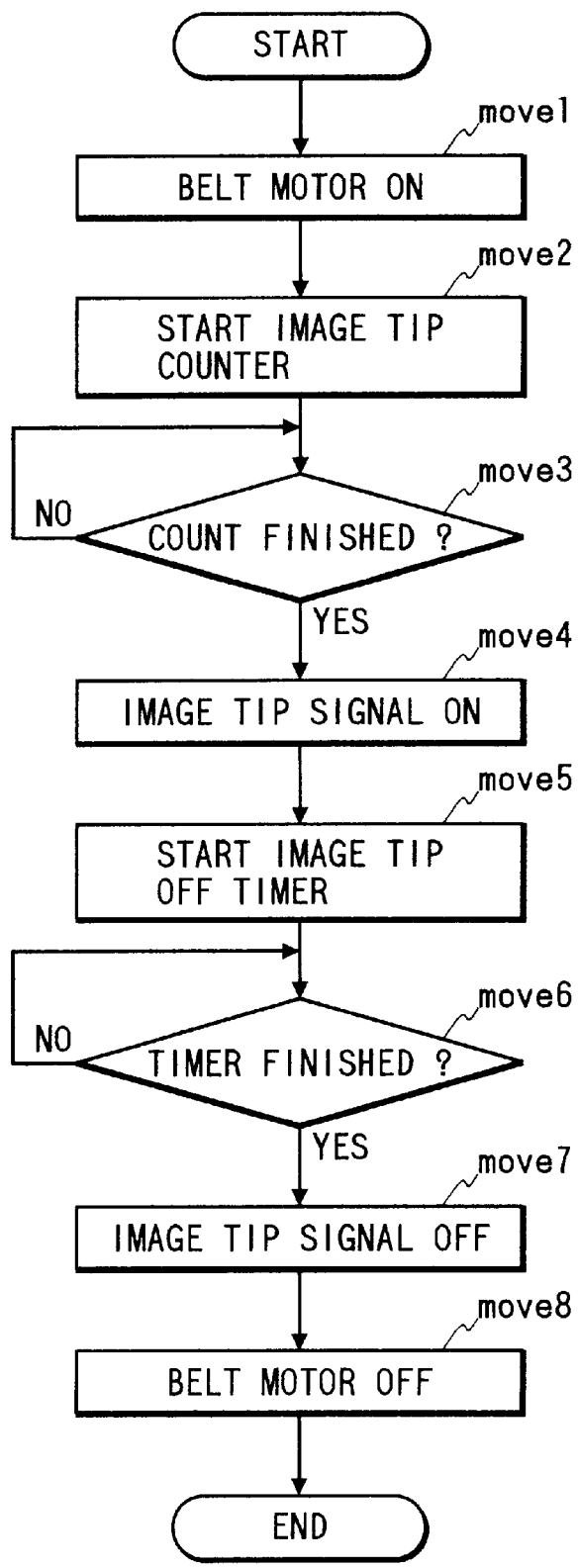
FIG. 39 is a flow chart of original flow-reading treatment.

Next, the original flow-reading treatment will be explained with reference to FIG. 39.

The belt motor 102 is turned ON (move 1) to drive the wide belt 7 so as to cause the fixed optical system of the copying machine to read the image on the original. At the same time, an image tip on counter counted by a belt energizing clock is started (move 2) to turn ON an image tip signal when the tip end of the original reaches a predetermined position. In this case, the speed of the belt motor is controlled constant speed by outputting energization clock signals on the basis of flow-reading speed data (V) received from the copying machine. Thereafter, at the time when the count of the image tip on counter is completed (move 3), the image tip signal is ON (sent to the copying machine) (move 4). After receiving the image tip signal, the copying machine calculates the time till the tip end of the original reaches the position of the optical system fixed in the flow-reading mode and performs the actual image reading. After a predetermined time period is elapsed, the image tip signal is OFF (move 5, 6, 7). Thereafter, when the trail end of the original leaves the reading position, the belt motor 102 is turned OFF (move 8).

The flow-reading speed data (V) may be equal to or different from the reading speed (V1) in the fixed-reading mode. In particular, when V>V1 is set, since the reading of the image of the original is completed for a time shorter than that in the normal fixed-reading mode, the copying speed can be improved by using the original conveying apparatus according to the present invention.

Size Check Treatment

Next, the size check treatment will be explained with reference to FIG. 40.

In the size check treatment, an actual original size (length in the conveying direction) is obtained by correction effected by adding a distance between the second sheet supply roller 9 and the sheet supply sensor 35 to the data from the size check counter. In this case, the original is conveyed by the second sheet supply roller 9 and the wide belt 7, and the convey amount is equal to the counted value obtained from the belt energizing clock. Thereafter, on the basis of the corrected size data, the original size such as A5, B5, A4, B5R, A4R, B4 or A3 is checked.

Figure 2:
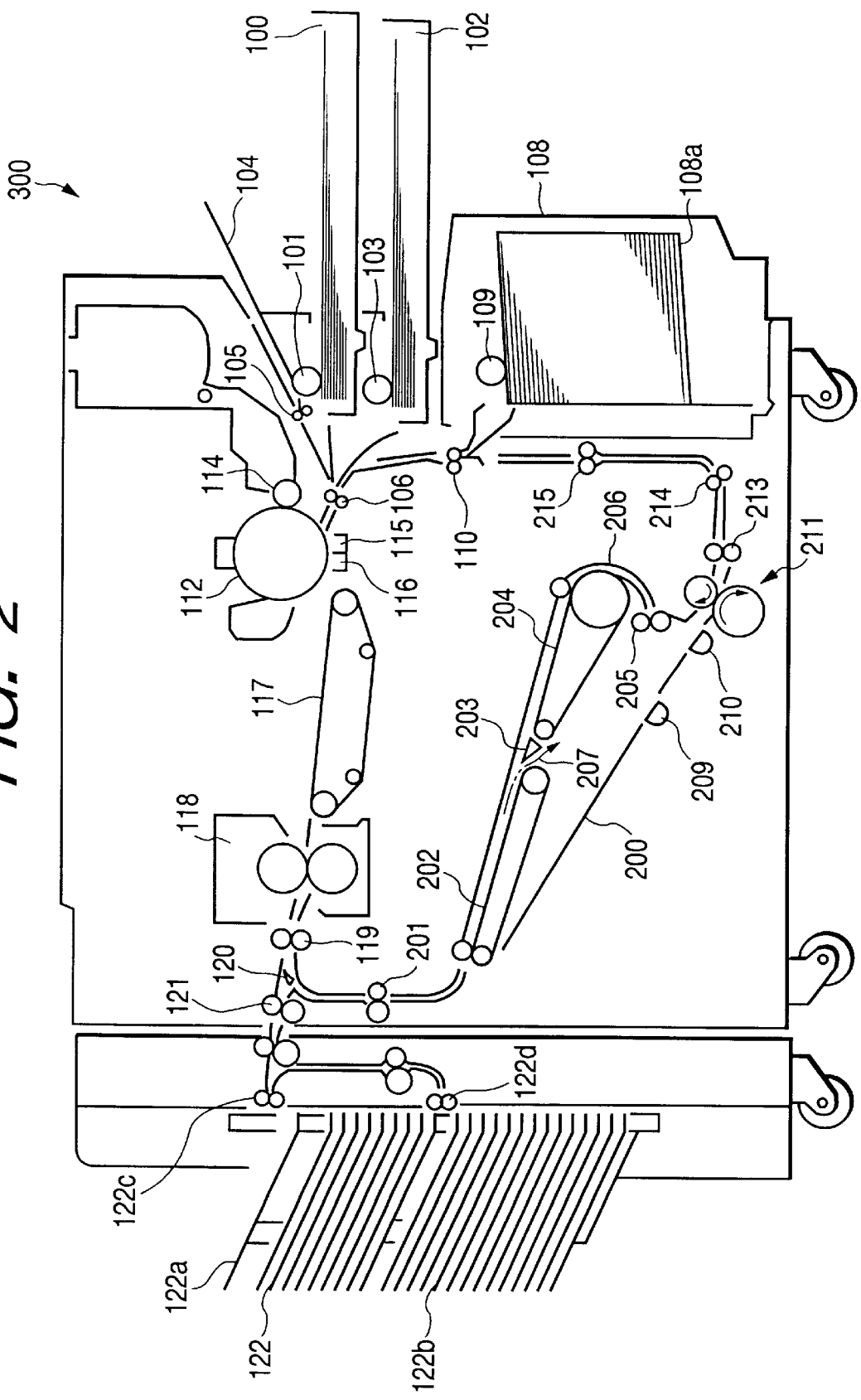
FIG. 2 is a sectional view showing an image forming portion 300 in FIG. 1 in detail.

Next, the printer portion as the image output portion 300 will be explained with reference to FIG. 2.

Sheets contained in an upper cassette 100 are supplied and separated one by one by separation pawls and a sheet supply roller 101, and the separated sheet is directed to a pair of regist rollers 106. Sheets contained in a lower cassette 102 are supplied and separated one by one by separation pawls and a sheet supply roller 103, and the separated sheet is directed to the pair of regist rollers 106. Further, a sheet set on a manual insertion guide 104 can be directed to pair of regist rollers 106 through rollers 105. A sheet stacking device (deck type) 108 is provided with an intermediate plate 108a lifted and lowered by a motor (not shown), and sheets stacked on the intermediate plate are supplied and separated one by one by separation pawls and a sheet supply roller 109, and the separated sheet is directed to the pair of convey rollers 110.

A photosensitive drum 112, a reading optical system 113, a developing device 114, a transfer charger 115 and a separation charger 116 constitute an image forming portion. The reference numeral 117 denotes a convey belt for conveying the sheet on which an image was formed; 118 denotes a fixing device; 119 denotes a pair of convey rollers; and 120 denotes a flapper.

The sheet on which the image was formed is directed to a pair of discharge rollers 121 by the flapper 120 and is discharged into a sorter 122. The sorter 122 includes a non-sort tray 122a, sort bin trays 122b, a pair of non-sort tray discharge rollers 122c, and a pair of sort bin tray discharge rollers 122d. the non-sort tray and the sort bin trays can be lifted and lowered to sort the sheets. In place of the sorter, a sheet discharge tray may be used.

Regarding the single original rested on the platen 3, in accordance with the set number of copies, the image is formed on the photosensitive drum repeatedly, and the sheet is supplied from either the cassette 100 or the cassette 102 or the deck 108 whenever the image is formed on the photosensitive drum. The alignment between the image on the photosensitive drum and the sheet is effected by the pair of regist rollers 106. When the desired number of copies are formed, the original is discharged from the platen, and the next original is positioned on the platen. Thereafter, the same operations are repeated.

When image are formed on both surfaces of the sheet or when images are formed on the same surface of the sheet in a superimposed fashion multi copy, the sheets on which the image were formed are temporarily stocked on an intermediate tray 200. The reference numeral 201 denotes a pair of convey rollers; 202 denotes a convey belt; 203 denotes a flapper; 204 denotes a convey belt; and 205 denotes a pair of convey rollers. In case of the both-face copy mode, the sheet is directed onto the intermediate tray 200 through a path 206. In this case, the sheets are stacked with imaged surfaces facing upwardly. In case of the multi copy mode, the sheets are directed onto the intermediate tray 200 through a path 207. In this case, the sheets are stacked with imaged surfaces facing downwardly.

The sheets stacked on the intermediate tray 200 are separated one by one from a lowermost one by the action of auxiliary rollers 209, 210 and a pair of reversible separation rollers 211, and the separated sheet is re-supplied. The re-supplied sheet is directed to the image forming portion through convey rollers 213, 214, 215, pair of rollers 110 and pair of regist rollers 106. After the image formation, the sheet is discharged in the same manner as mentioned above.

Regarding the single original rested on the platen 3, in accordance with the set number of copies, the images are formed on one-faces of the respective sheets, and the sheets are then stacked on the intermediate tray 200. Thereafter, the original on the platen is turned over and then is directed onto the platen again. Then, the image of the original is read by plural times corresponding to the number of copies. The read image is formed on the sheet re-supplied from the intermediate tray 200 whenever the reading is effected. Thereafter, the sheets are sorted in the page order by the sorter 122.

On the other hand, whenever the originals are circulated by the automatic original supplying apparatus, one set of copies can be obtained. According to this method, even when a plural sets of copies are formed, since the copy groups with the page order can be obtained, the sorter can be omitted. When the both-face copying operation is performed by using this method, the images on both surfaces of a first original are successively read and the read images are formed on both surfaces of a first sheet which is in turn discharged. Then, the same sequence is repeated to a second original and a second sheet. By repeating this operation, the sorted copy groups having images on both surfaces can be obtained.

As mentioned above, according to the present invention, since the reverse path for reversing the original before it is directed onto the platen and the reverse path for reversing the original from the platen are commonly used in part, an original conveying apparatus capable of reversing the original at high speed can be made compact. Further, since the paths are commonly used, the apparatus can be made cheaper, and, since there are non-common parts, a high speed reverse convey path can be realized regardless of the size of the original.

What is claimed is:

1. An original conveying apparatus in which originals stacked on an original tray are separated one by one by a separation means to be conveyed to a reading portion for reading an image, and then is discharged, comprising:

an original travel direction reverse path, disposed between said separation means and said reading portion, for reversing a travel direction of an original without turning over a front face and a rear face of the original;

a turn-over path for turning over the front face and the rear face of the original discharged from said reading portion and for directing it to said reading portion again; and a control means for continuously effecting, for the respective original, a first image reading mode in which the travel direction of the original is reversed in said original travel direction reverse path before being conveyed to said reading portion and then the image is read, and a second image reading mode in which the original face is turned over in said original travel direction reverse path after the image of the original was read at said reading portion so that the image is read.

2. An original conveying apparatus in which originals stacked on an original tray are separated one by one by a separation means, comprising:

a first convey path for a first convey mode in which a travel direction of a separated original is reversed without turning over a front face and a rear face of the original in a reverse path before the original is conveyed to a reading portion for reading an image of the original and the reversed original is conveyed to said reading portion; and a second convey path for a second convey mode in which a front face and rear face of the original discharged from said reading portion is turned over in a turn-over path and is conveyed to said reading portion again:

wherein said reverse path and said turn-over path are commonly used in part.

3. An original conveying apparatus according to claim 1, wherein said original travel direction reverse path directs the original to said reading portion after the travel direction of the original is reversed.

4. An original conveying apparatus according to claim 3, wherein said original travel direction reverse path has an upwardly curved portion extending in a direction away from said reading portion, and an introduction portion for the reversed original to said reading portion.

5. An original conveying apparatus according to claim 4, wherein said turn-over path has a loop portion for turning over the original discharged from said reading portion and for directing it to said reading portion again.

6. An original conveying apparatus according to claim 5, wherein a portion of said loop portion forms a part of said original travel direction reverse path.

7. An original conveying apparatus according to claim 6, wherein said portion is said introduction portion.

8. An original conveying apparatus according to claim 1, further comprising another control means for driving a rotary member of said reading portion in a predetermined direction when the turn-over treatment is effected, and for driving said rotary member in an opposite direction when the turned-over original is conveyed to said reading portion.

9. An original conveying apparatus according to claim 8, further comprising an original detection means disposed in said turn-over path to detect the passage of the original, and a count means for starting count on the basis of a signal from said original detection means, so that said another control means drives said rotary member in said opposite direction on the basis of a signal from said count means.

10. An original conveying apparatus according to claim 9, further comprising a size detection means for detecting a size of the original in a conveying direction, so that said another control means controls a drive timing of said rotary member in said opposite direction on the basis of a signal from said size detection means.

11. An image forming apparatus comprising:

an original conveying apparatus according to claim 1;

a reading means for reading an image on the original set at said reading portion by said original conveying apparatus; and an image forming means for forming the image read by said reading means on a sheet.

* * * * *

UNITED STATES PATENT AND TRADEMARK OFFICE
CERTIFICATE OF CORRECTION

PATENT NO. : 6,021,305

DATED : February 1, 2000

INVENTOR(S): CHIKARA SATO, ET AL.          Page 1 of 3

It is certified that error appears in the above-identified patent and that said Letters Patent is hereby corrected as shown below:

In the Drawings:
SHEET NO. 42:
Figure 40, "RIGIST" should read --REGIST--.

COLUMN 2:
Line 21, "since" should be deleted; and
Line 28, "one" should read --the first--.

COLUMN 3:
Line 12, "reverse" should read --reverse paths--; and
Line 61, "are" should read --which are--.

COLUMN 4:
Line 36, "uppermost" should read --the uppermost--; and
Line 67, "width-wise" should read --widthwise--.

COLUMN 6:
Line 62, "reversed the" should read --reversed in the--.

COLUMN 8:
Line 7, "conveyed" should read --conveyed to--; and
Line 19, "positioned" should read --position--.

COLUMN 12:
Line 29, "conveyed" should read --conveyed by--.

UNITED STATES PATENT AND TRADEMARK OFFICE
CERTIFICATE OF CORRECTION

PATENT NO. : 6,021,305

DATED : February 1, 2000

INVENTOR(S): CHIKARA SATO, ET AL.

It is certified that error appears in the above-identified patent and that said Letters Patent is hereby corrected as shown below:

COLUMN 13:
Line 22, "that" should read --than--; and
Line 61, "only" should read --only by--.

COLUMN 14:
Line 14, "waited." should read --awaited--.

COLUMN 15:
Line 25, "enter" should read --enters--;
Line 29, "waiting" should read --awaiting--.

COLUMN 17:
Line 9, "waiting" should read --awaiting--; and
Line 41, "up the" should read --up to the--.

COLUMN 26:
Line 31, "to pair" should read --to a pair--.

COLUMN 27:
Line 6, "In case" should read --In the case--; and
Line 9, "In case" should read --In the case--.

UNITED STATES PATENT AND TRADEMARK OFFICE
CERTIFICATE OF CORRECTION

PATENT NO. : 6,021,305

DATED : February 1, 2000

INVENTOR(S): CHIKARA SATO, ET AL.

It is certified that error appears in the above-identified patent and that said Letters Patent is hereby corrected as shown below:

COLUMN 28:
Line 11, "original travel" should be deleted; and
Line 12, "direction reverse" should read --turnover--.

Signed and Sealed this

First Day of May, 2001

Attest:

NICHOLAS P. GODICI

*Attesting Officer*   *Acting Director of the United States Patent and Trademark Office*